Aug. 7, 1945.     J. MUELLER     2,381,361
TABULATING AND ACCOUNTING MACHINE
Filed Feb. 1, 1940     31 Sheets—Sheet 3
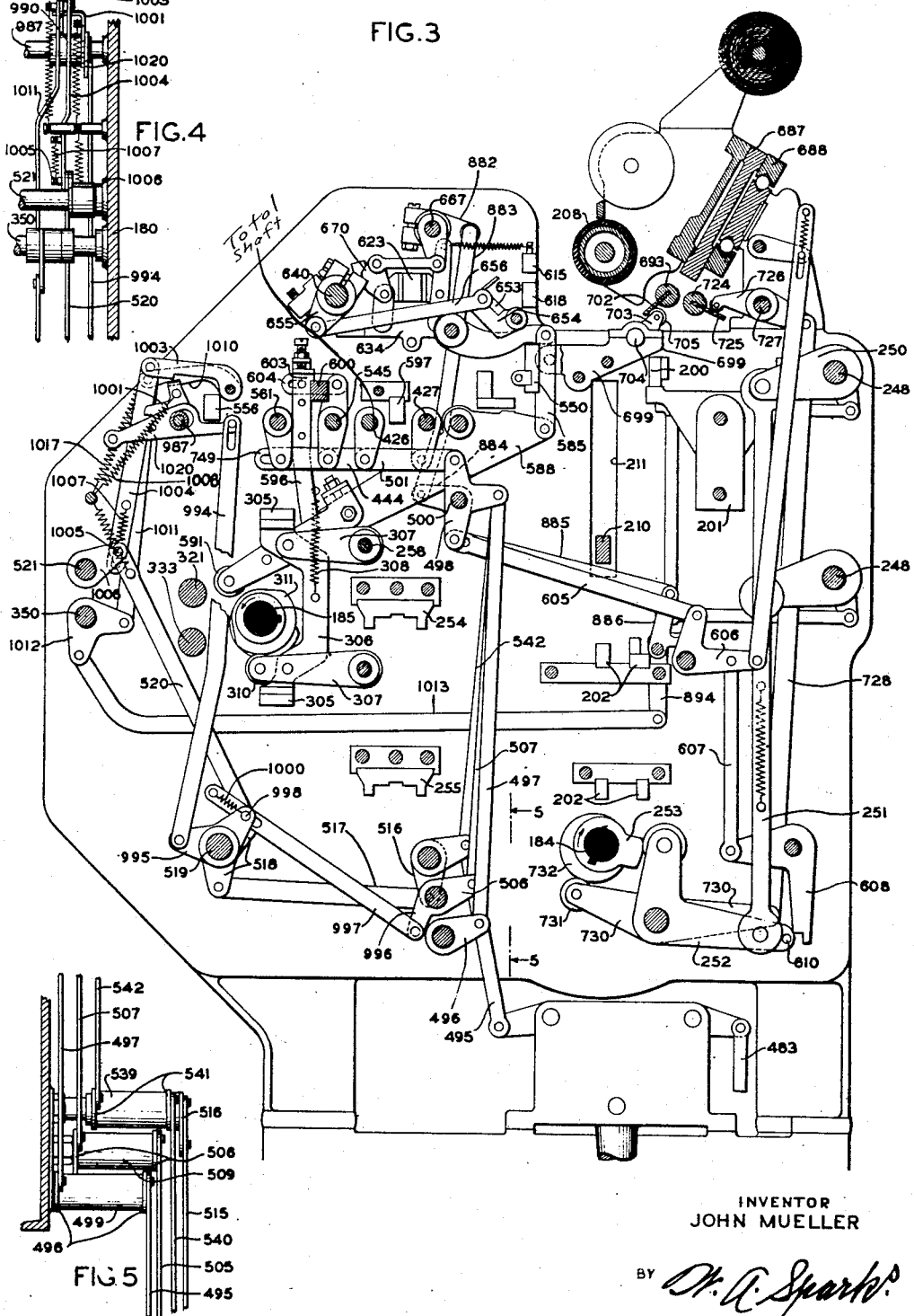
FIG.3
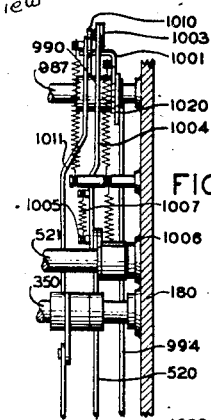
FIG.4
FIG.5
INVENTOR
JOHN MUELLER
BY *W. A. Sparks*
ATTORNEY Aug. 7, 1945.　　　J. MUELLER　　　2,381,361
TABULATING AND ACCOUNTING MACHINE Filed Feb. 1, 1940　　　31 Sheets-Sheet 5

Zero Couplers

INVENTOR
JOHN MUELLER
BY H. R. Sparks
ATTORNEY

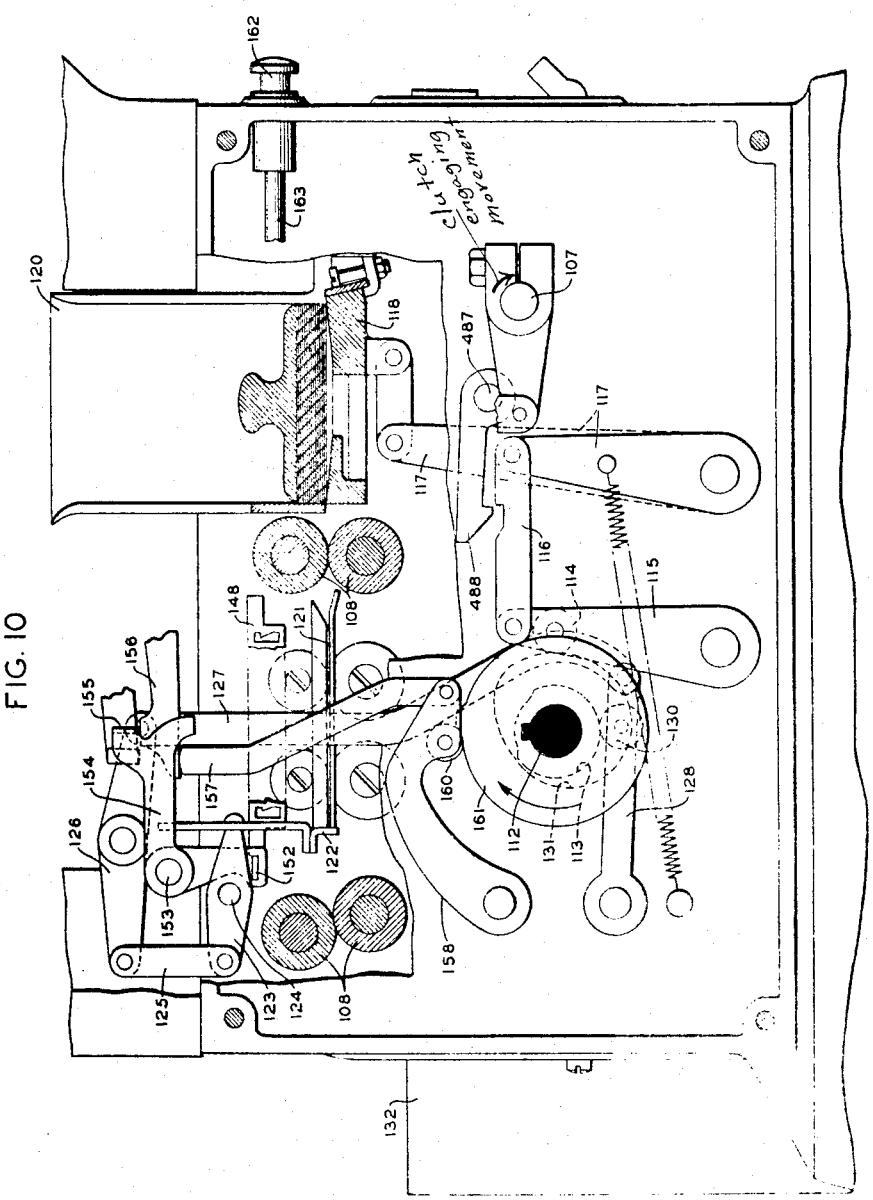

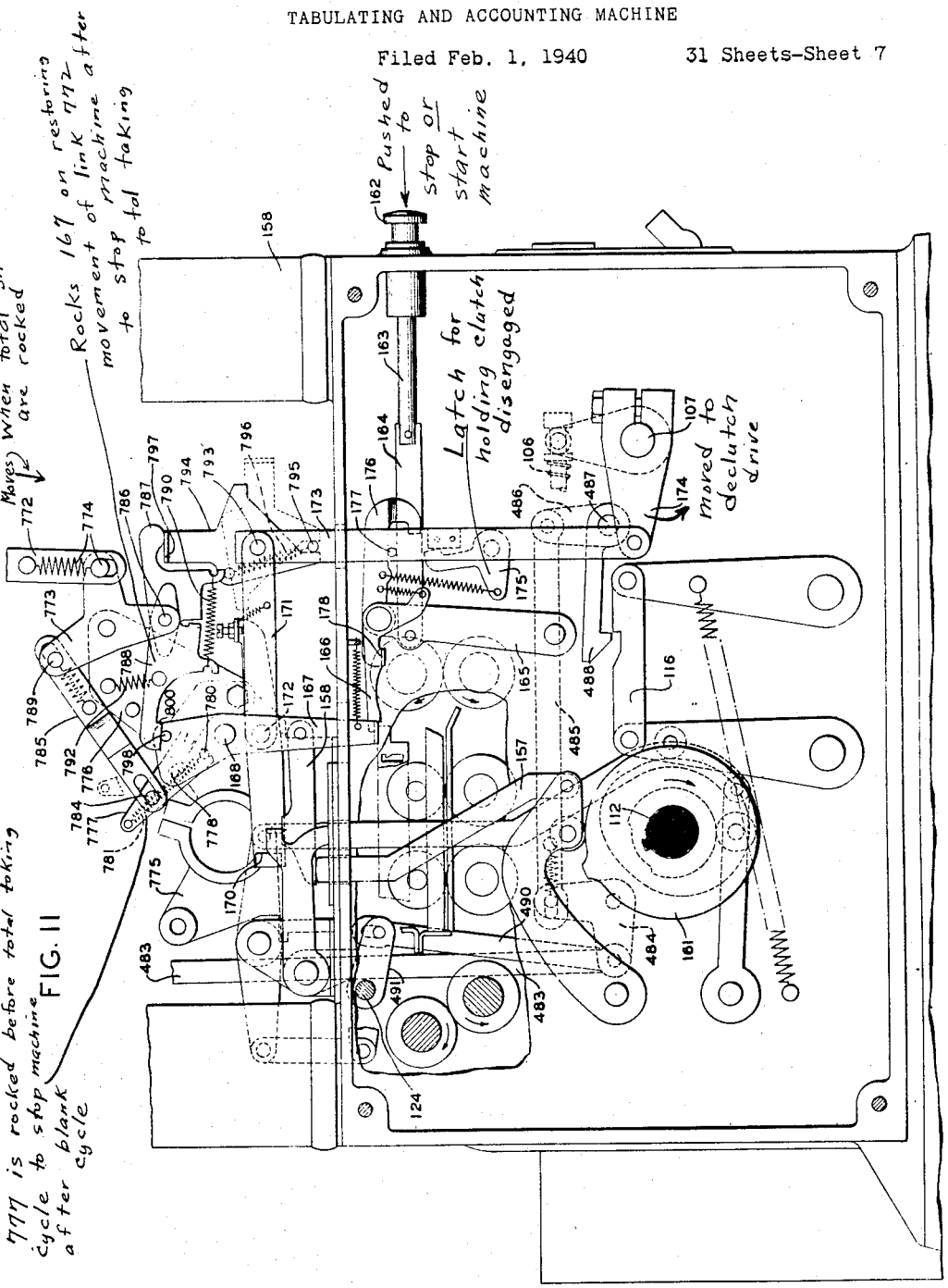

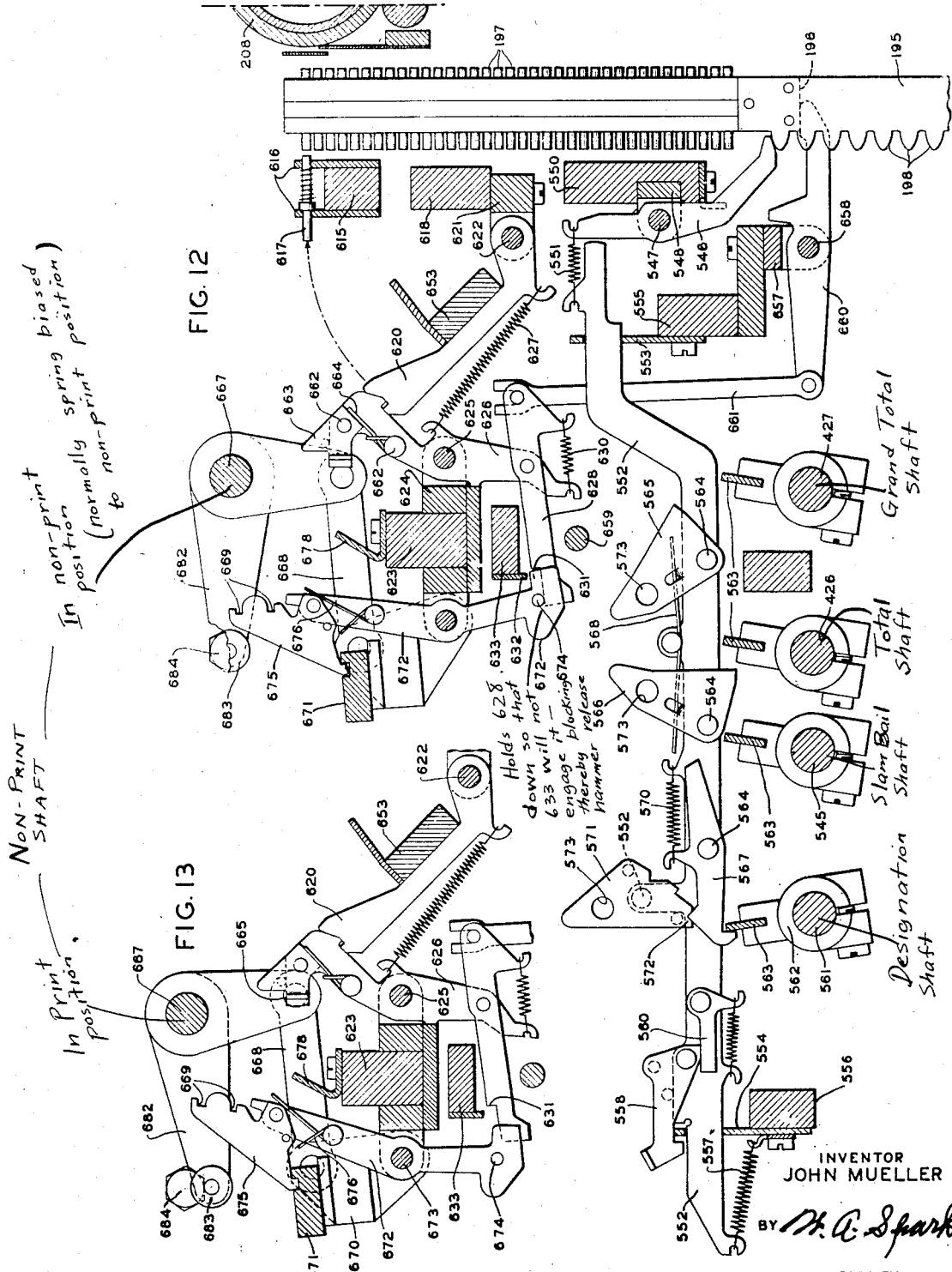

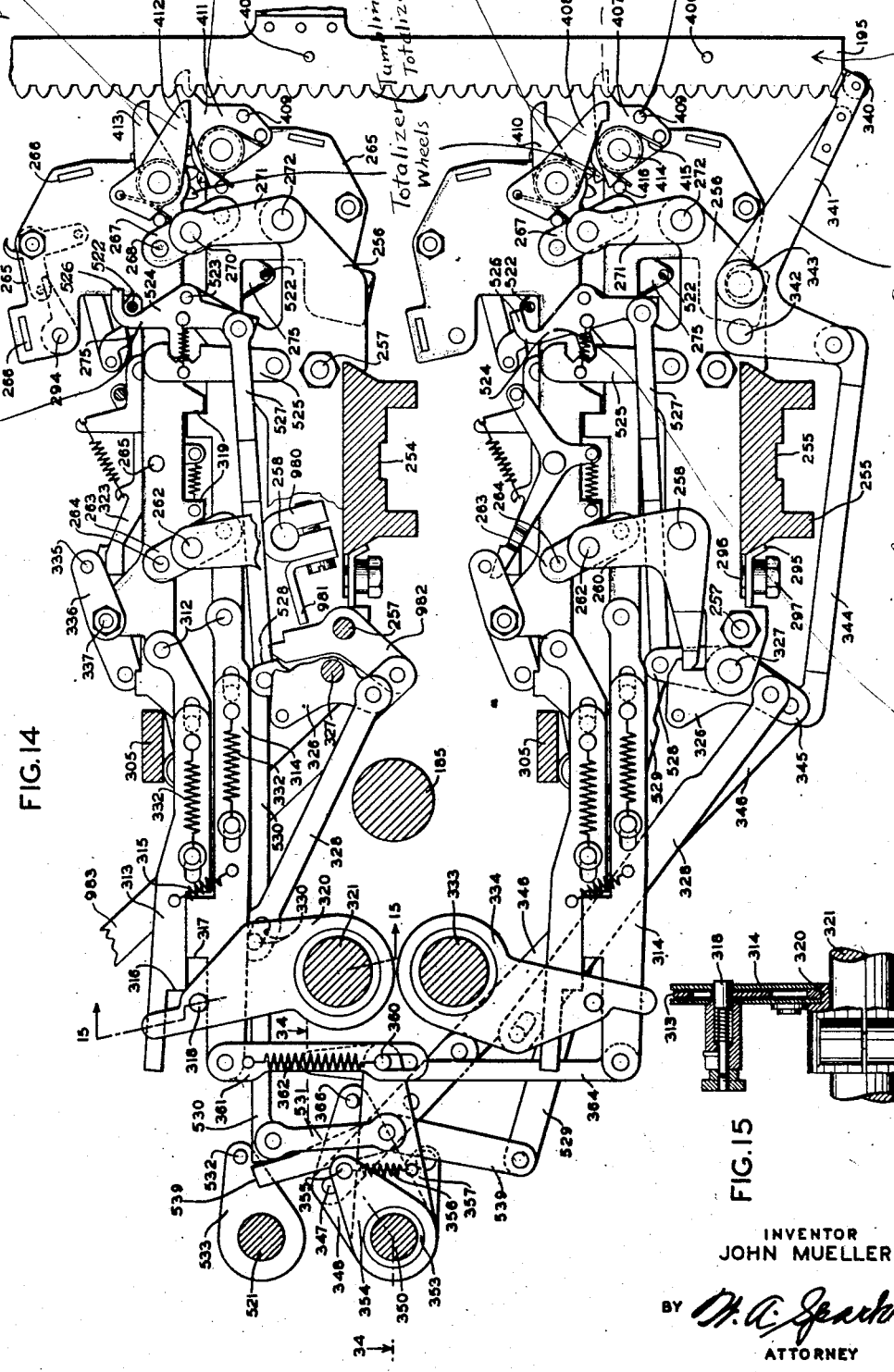

INVENTOR
JOHN MUELLER

Aug. 7, 1945.     J. MUELLER     2,381,361
TABULATING AND ACCOUNTING MACHINE
Filed Feb. 1, 1940     31 Sheets-Sheet 12

INVENTOR
JOHN MUELLER
BY *H. A. Spark*
ATTORNEY

Aug. 7, 1945.   J. MUELLER   2,381,361
TABULATING AND ACCOUNTING MACHINE
Filed Feb. 1, 1940    31 Sheets-Sheet 14

INVENTOR
JOHN MUELLER
BY *H. A. Sparks*
ATTORNEY

Aug. 7, 1945.                    J. MUELLER                    2,381,361
                       TABULATING AND ACCOUNTING MACHINE
                  Filed Feb. 1, 1940              31 Sheets-Sheet 15
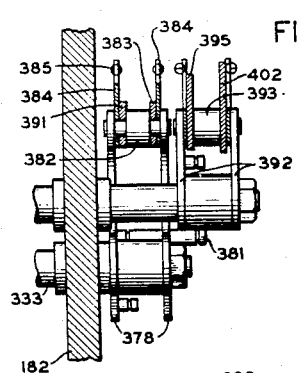
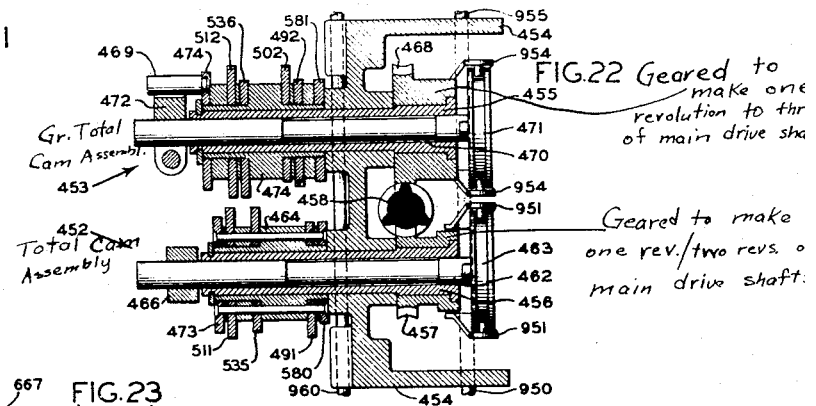
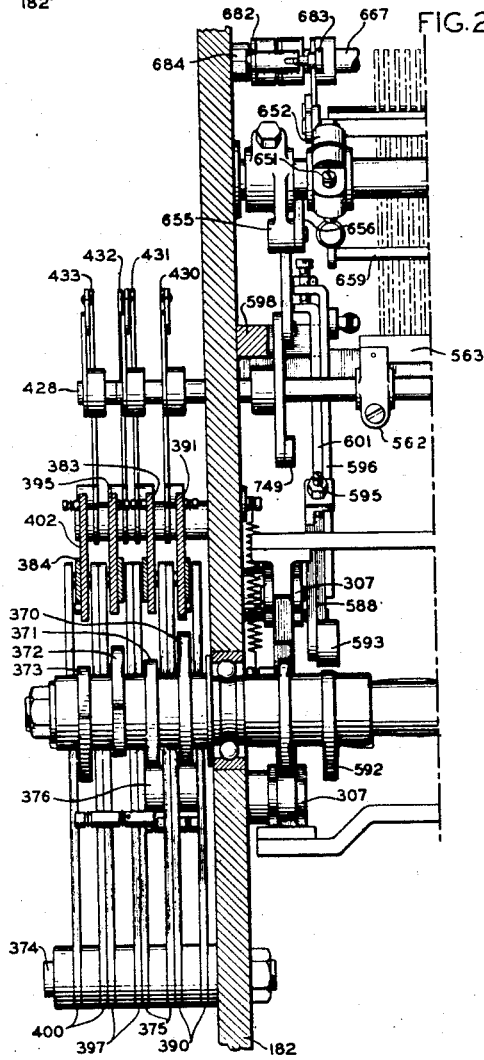
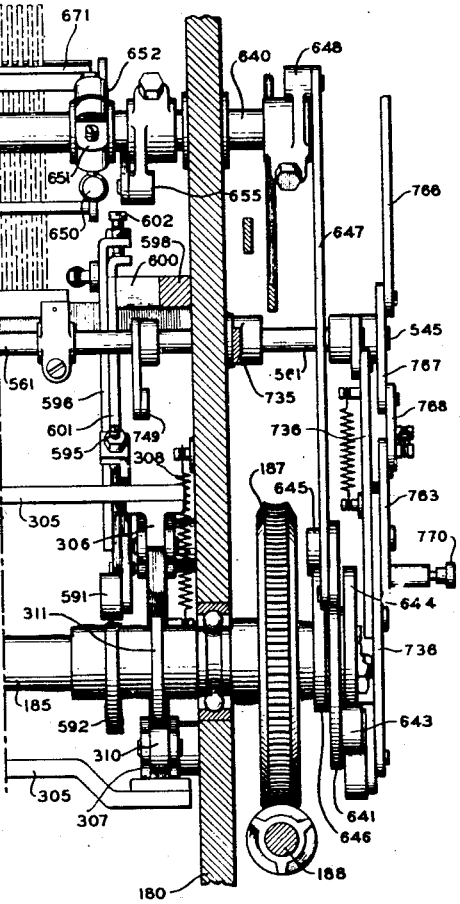
INVENTOR.
JOHN MUELLER
BY *H. A. Sparks*
ATTORNEY

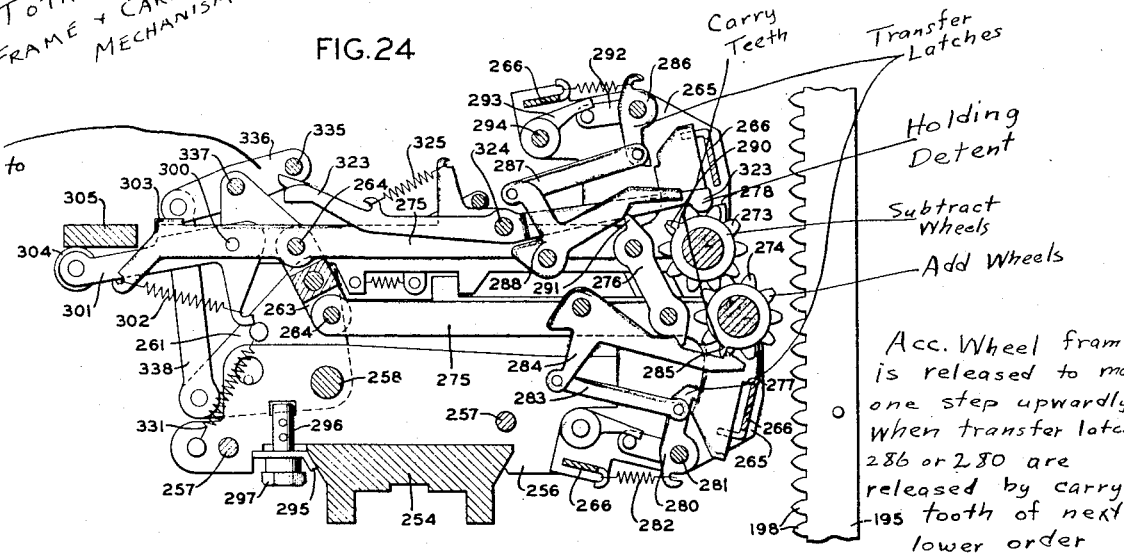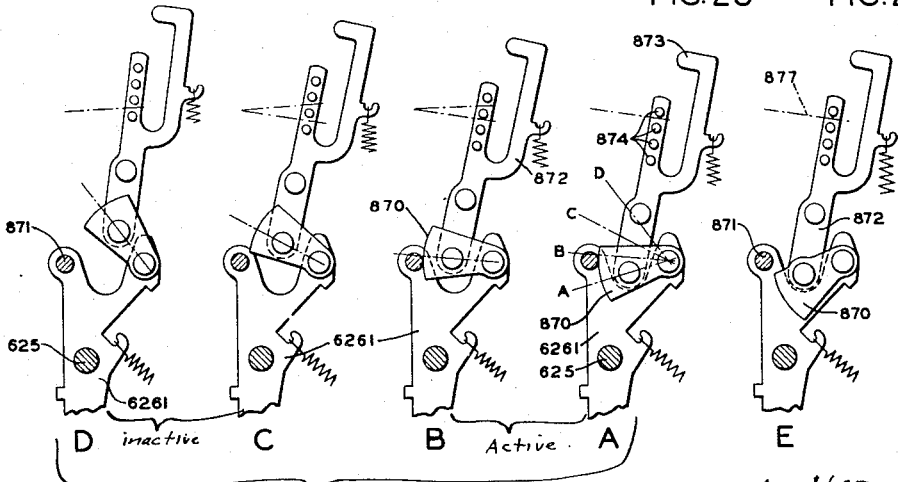

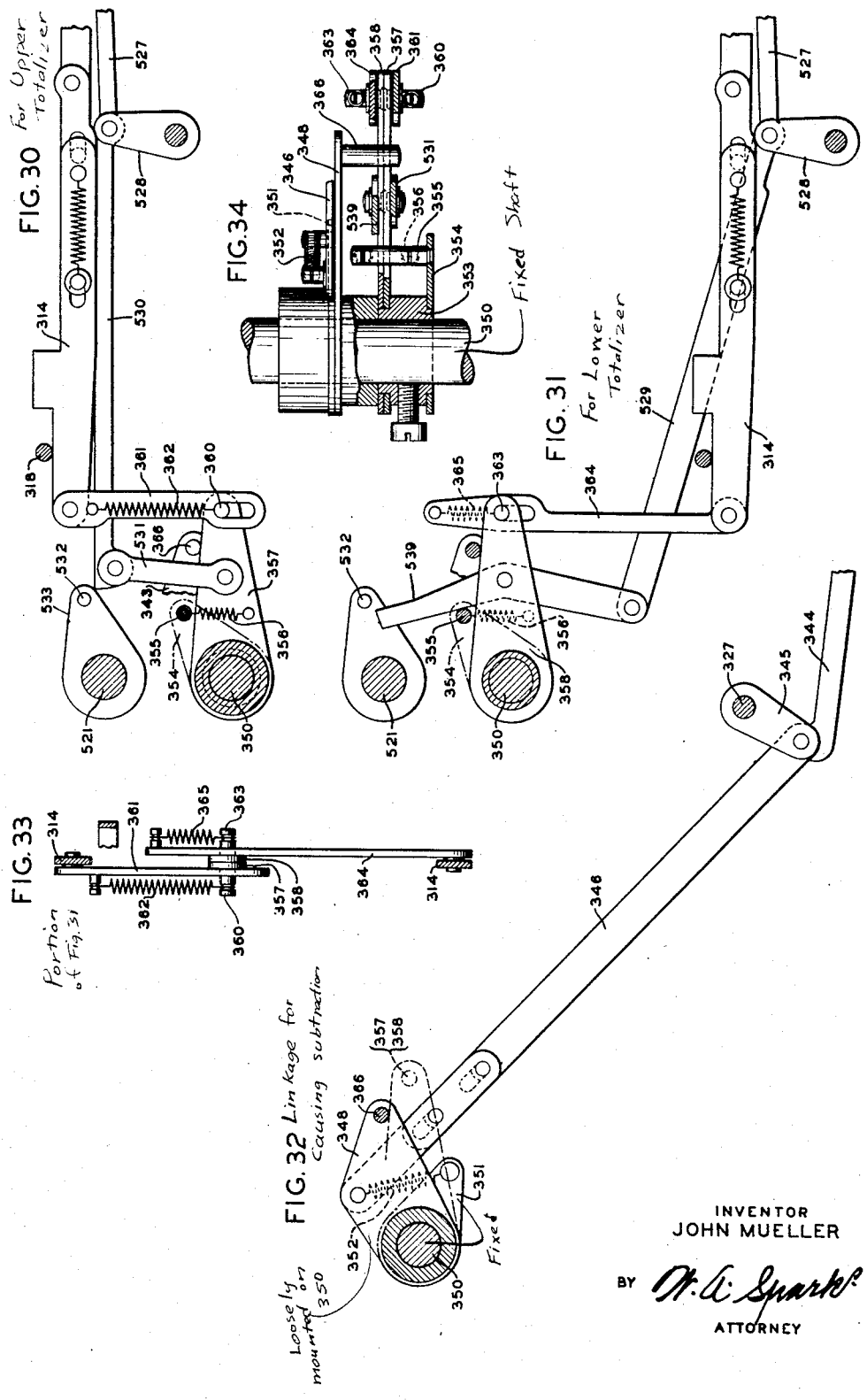

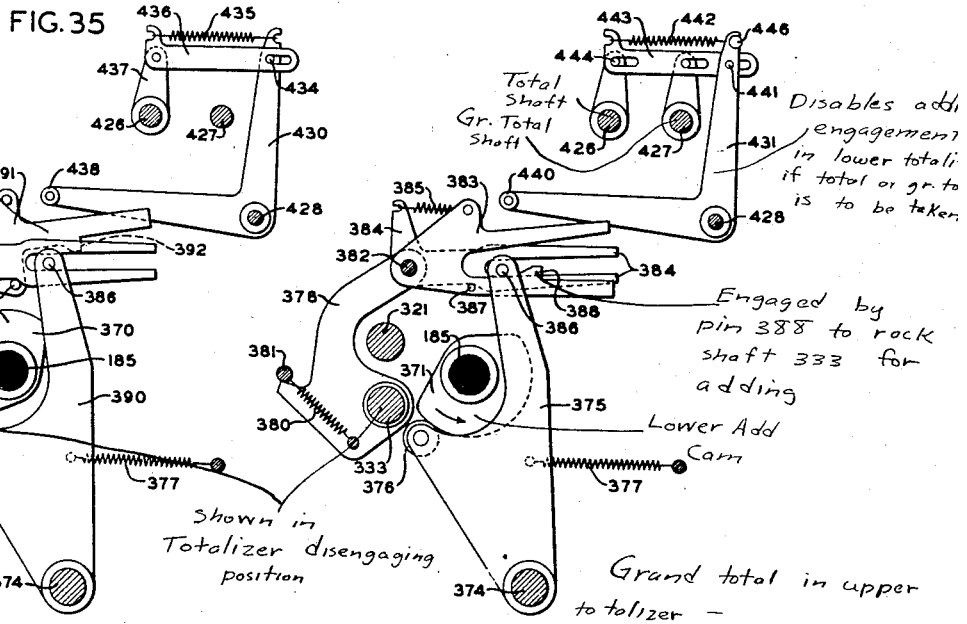
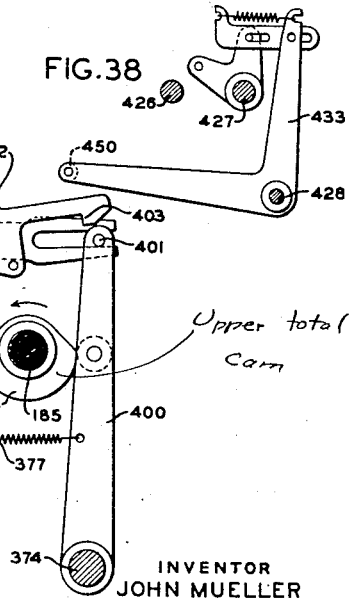
Aug. 7, 1945.     J. MUELLER     2,381,361
TABULATING AND ACCOUNTING MACHINE
Filed Feb. 1, 1940     31 Sheets-Sheet 18
INVENTOR
JOHN MUELLER
ATTORNEY

235. REGISTERS.
61.9

Aug. 7, 1945.   J. MUELLER   2,381,361
TABULATING AND ACCOUNTING MACHINE
Filed Feb. 1, 1940   31 Sheets-Sheet 19

Cams and Cam followers for Total Taking Control Unit

FIG. 39

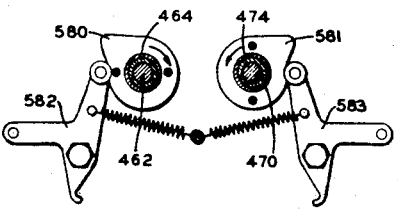

Cams for disengaging total unit clutch

STOP

Rocks shaft 426 to control group total. See Figs 36 + 51

FIG. 40

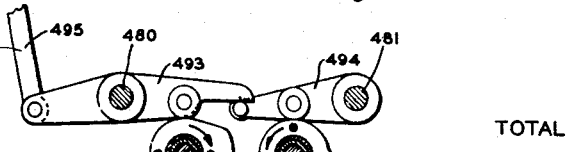

TOTAL

Rocks shaft 427 by means shown in Fig. 54, to cause a grand total taking operation

FIG. 41

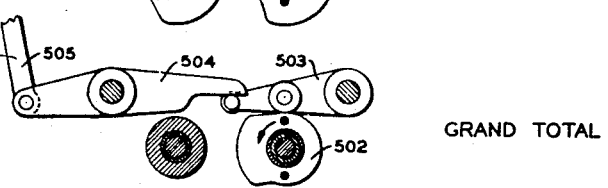

GRAND TOTAL

Operates slam bail shaft 545 by linkage of Fig. 52

FIG. 42

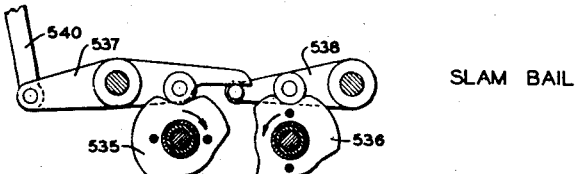

SLAM BAIL

FIG. 43

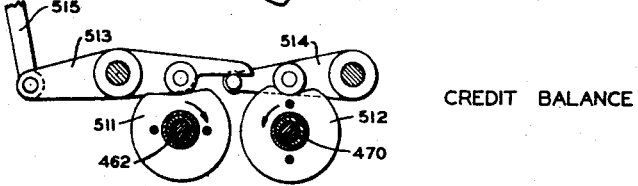

CREDIT BALANCE

FIG. 44

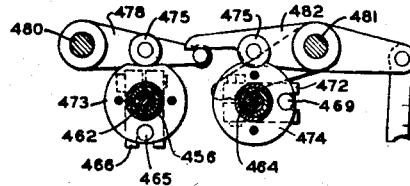

CARD FEED

Operates picker latch + card stop

↑ Total Cam Assembly   ↑ Grand Total Assembly

INVENTOR
JOHN MUELLER
BY H. A. Sparks
ATTORNEY

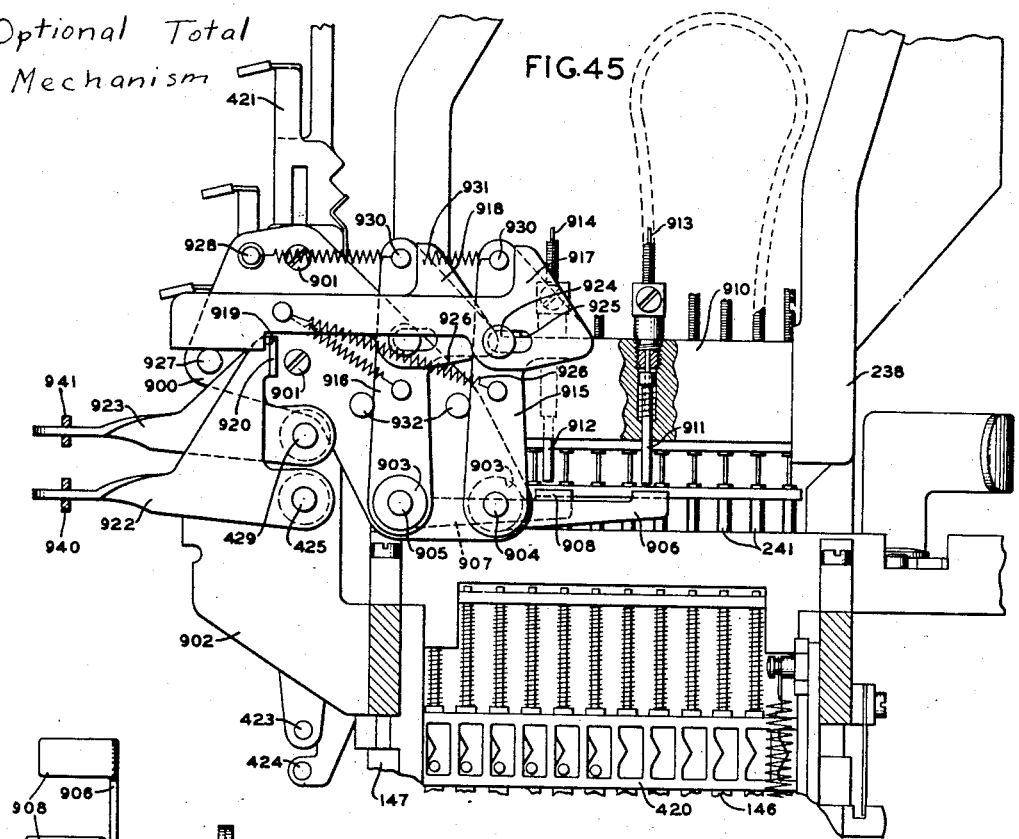

Aug. 7, 1945.  J. MUELLER  2,381,361
TABULATING AND ACCOUNTING MACHINE
Filed Feb. 1, 1940  31 Sheets-Sheet 21
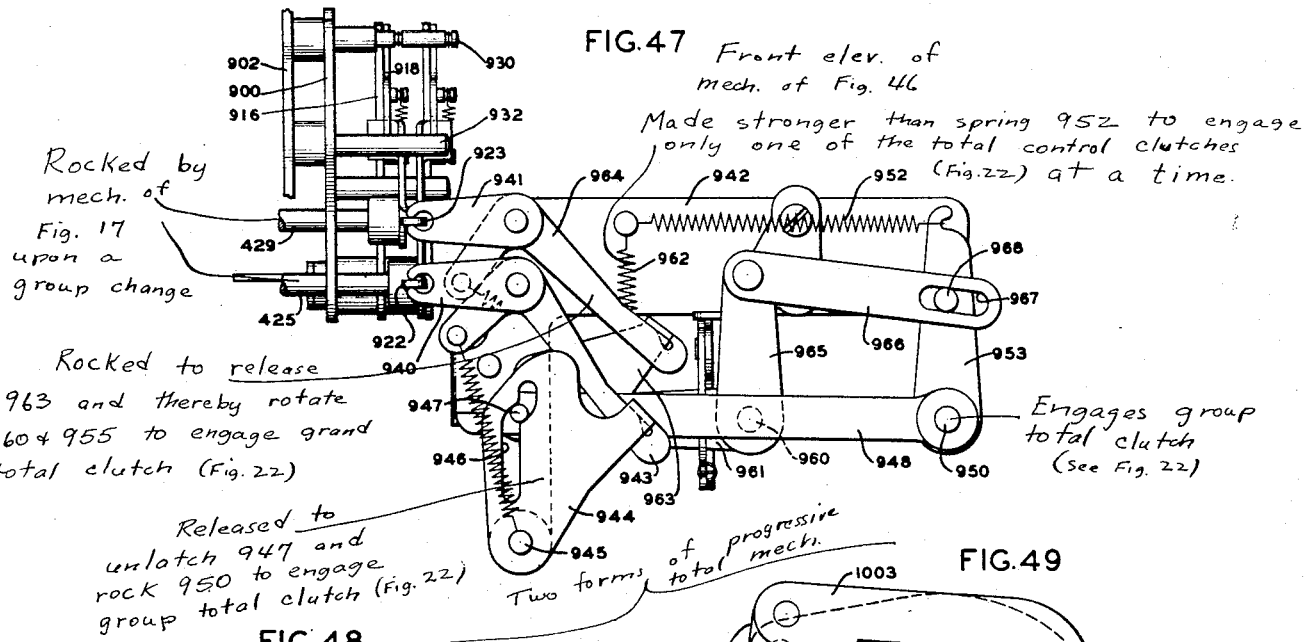
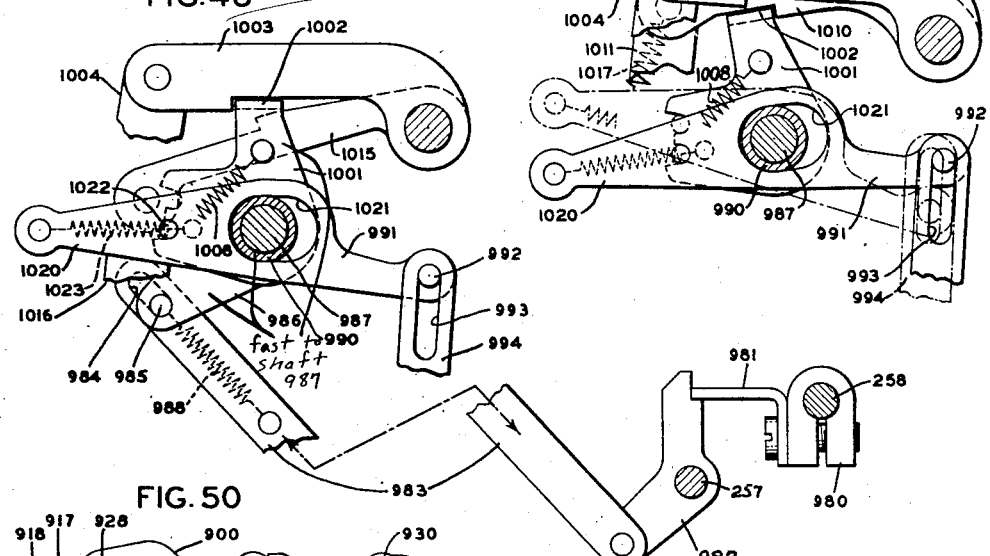
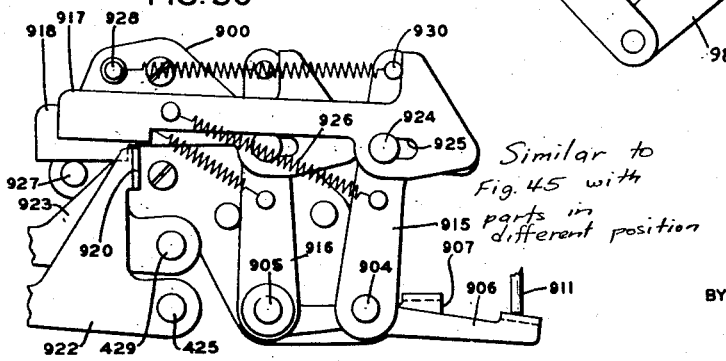
INVENTOR
JOHN MUELLER
BY W. A. Sparks
ATTORNEY

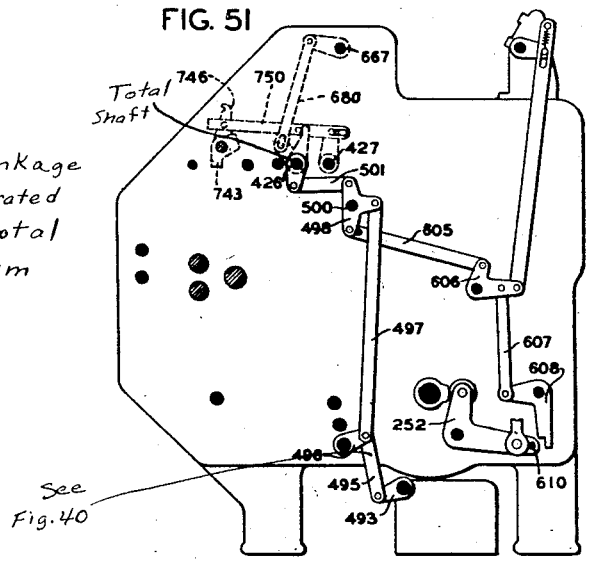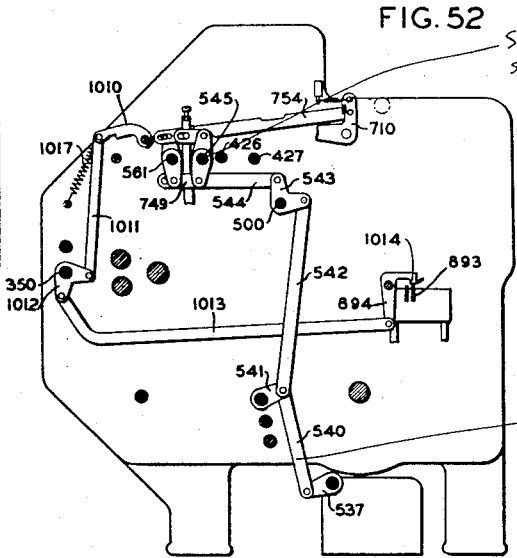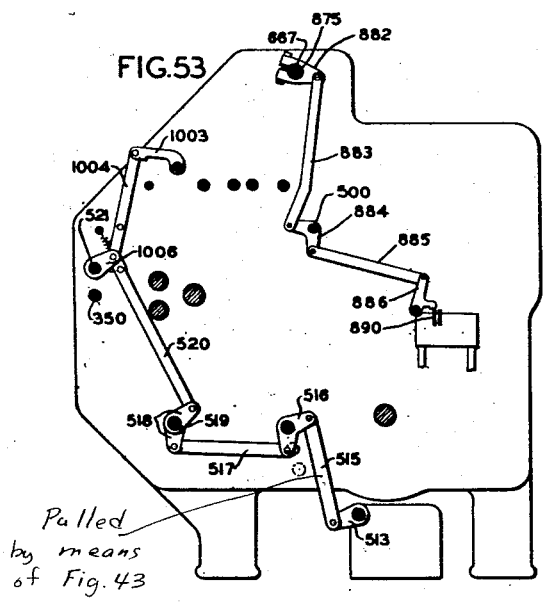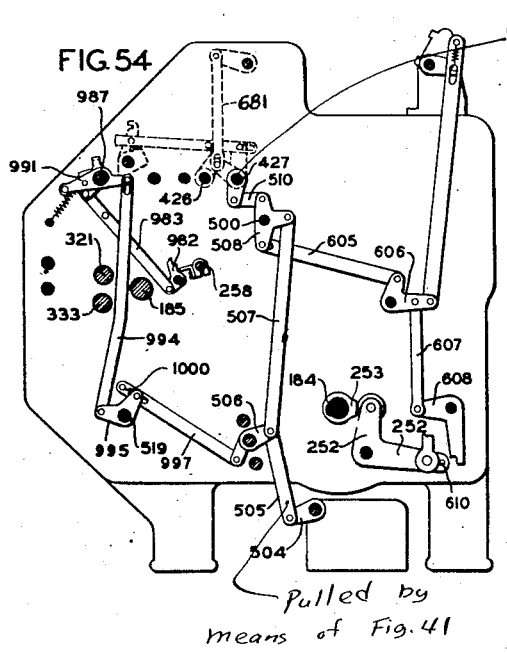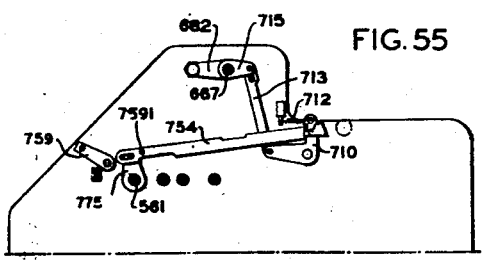

Aug. 7, 1945.   J. MUELLER   2,381,361
TABULATING AND ACCOUNTING MACHINE
Filed Feb. 1, 1940   31 Sheets—Sheet 23
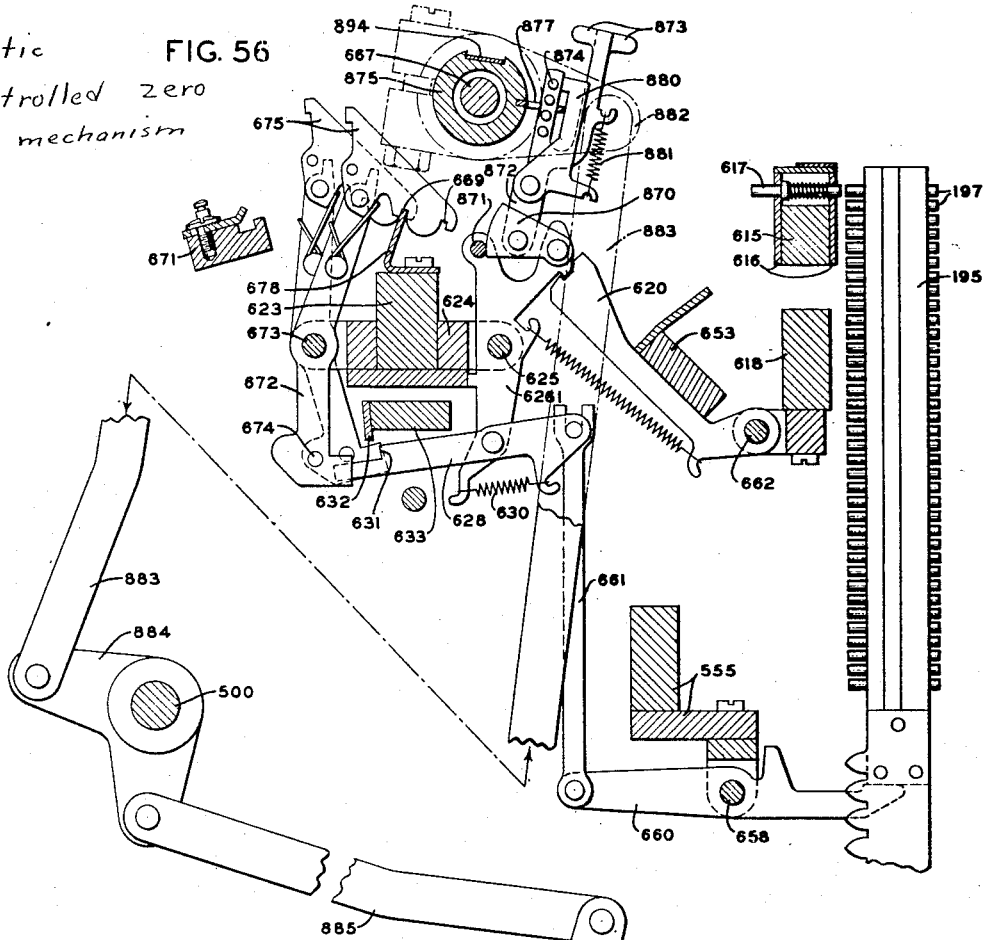
Automatic Card controlled zero Coupler mechanism
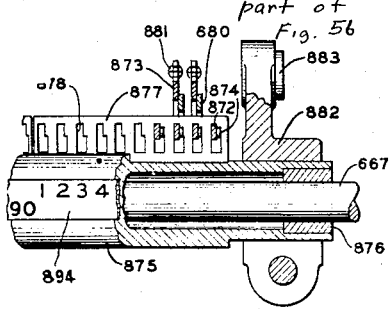
FIG. 57 Upper part of Fig. 56
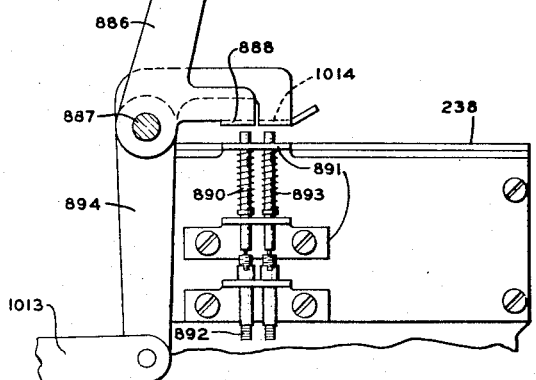
INVENTOR
JOHN MUELLER
BY *H. A. Sparks*
ATTORNEY Aug. 7, 1945.   J. MUELLER   2,381,361
TABULATING AND ACCOUNTING MACHINE
Filed Feb. 1, 1940   31 Sheets-Sheet 24
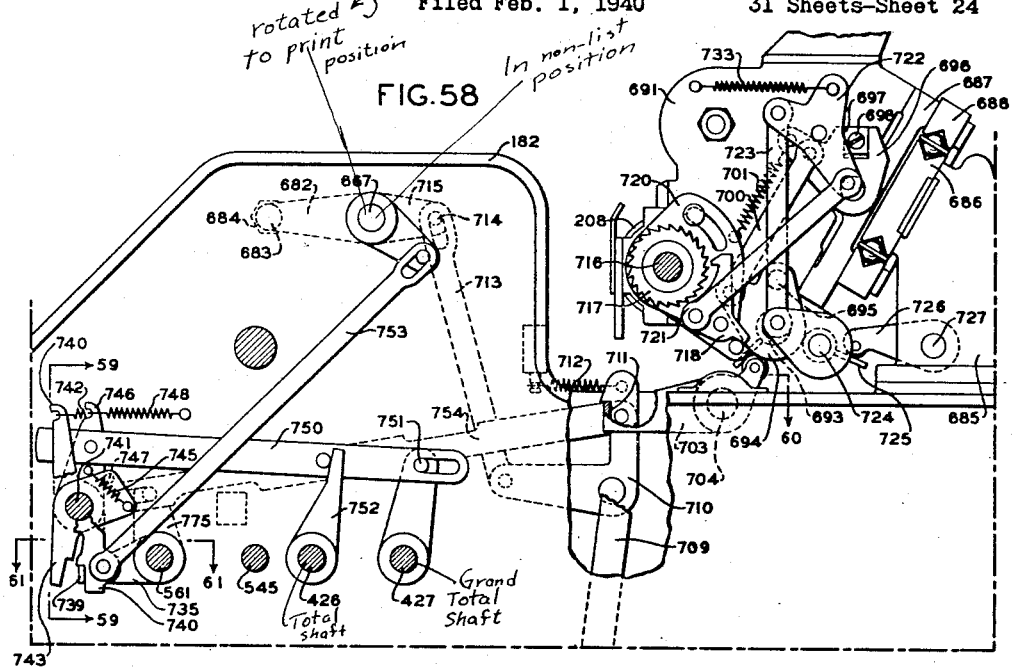
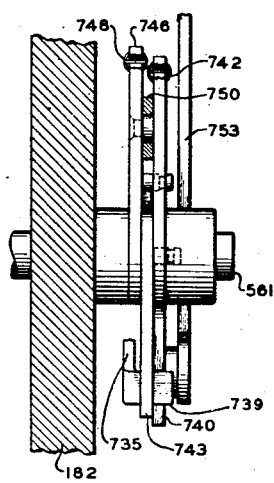
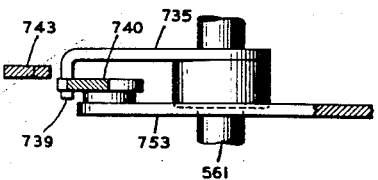
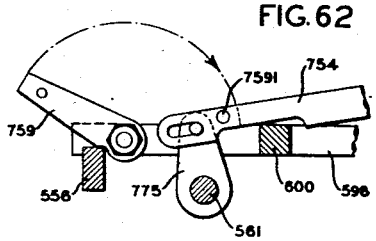
INVENTOR
JOHN MUELLER
BY W. A. Spark
ATTORNEY

235. REGISTERS.
61.9

Examiner

Aug. 7, 1945.   J. MUELLER   2,381,361
TABULATING AND ACCOUNTING MACHINE
Filed Feb. 1, 1940   31 Sheets-Sheet 25

Escapement for control of designation shaft for non-list operation ↓

Similar Views showing Listing set up ↓

NON LIST

LIST

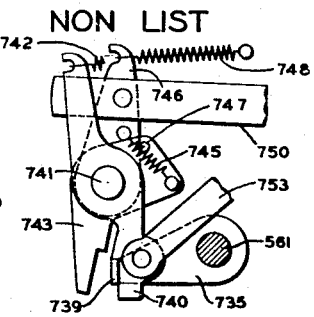
FIG. 63

A
ADD CYCLE
EXCEPT THE FIRST

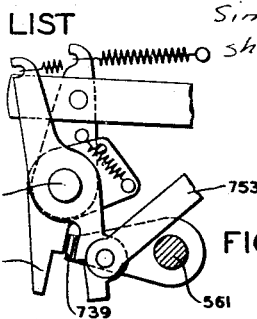
FIG. 69

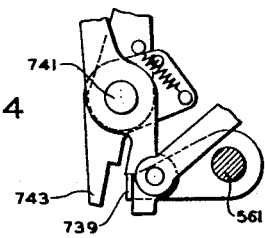
FIG. 64

B
IDLE CYCLE
HELD BY
SLAM BAIL SHAFT

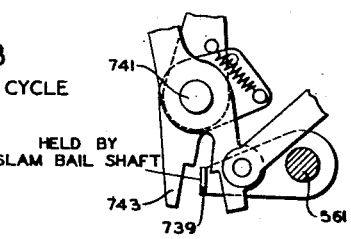
FIG. 70

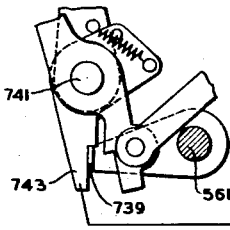
FIG. 65

C
TOTAL AND
GRAND TOTAL CYCLE
HELD BY TOTAL
OR G. T. SHAFT

FIG. 71

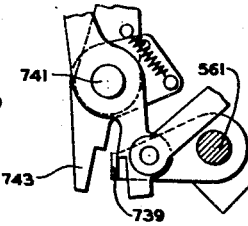
FIG. 66

D
LATTER PART OF
TOTAL OR G. T. CYCLE
HELD BY
SLAM BAIL SHAFT

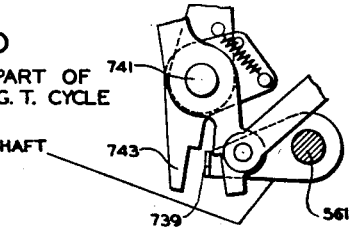
FIG. 72

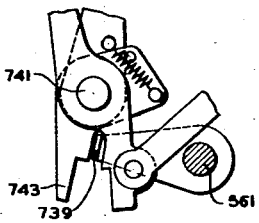
FIG. 67

E
FIRST CARD

FIG. 73

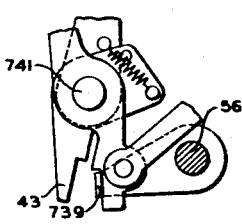
FIG. 68

F
RESTORED BY
CAM SHAFT

INVENTOR
JOHN MUELLER
BY *Oh. C. Sparks*
ATTORNEY

Aug. 7, 1945.    J. MUELLER    2,381,361
TABULATING AND ACCOUNTING MACHINE
Filed Feb. 1, 1940    31 Sheets-Sheet 26

*Different machine set-ups — principally of slam bail and type hammer mechanisms*

DESIGNATION

PRINT ON IDLE CYCLE

INVENTOR
JOHN MUELLER
BY *N. A. Sparks*
ATTORNEY

Aug. 7, 1945.   J. MUELLER   2,381,361
TABULATING AND ACCOUNTING MACHINE
Filed Feb. 1, 1940   31 Sheets-Sheet 27
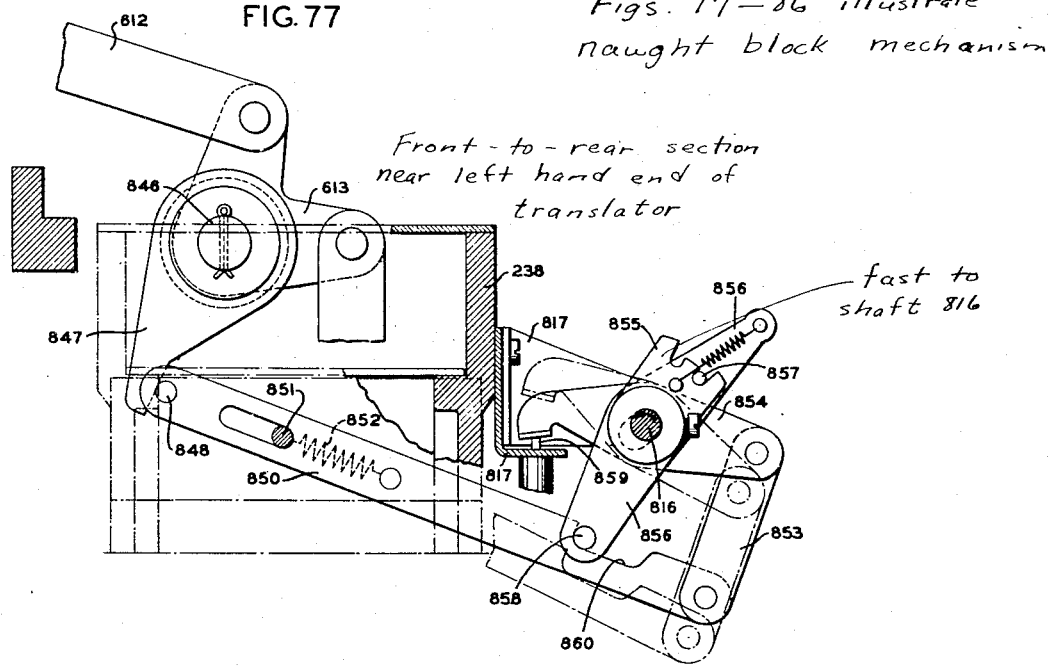
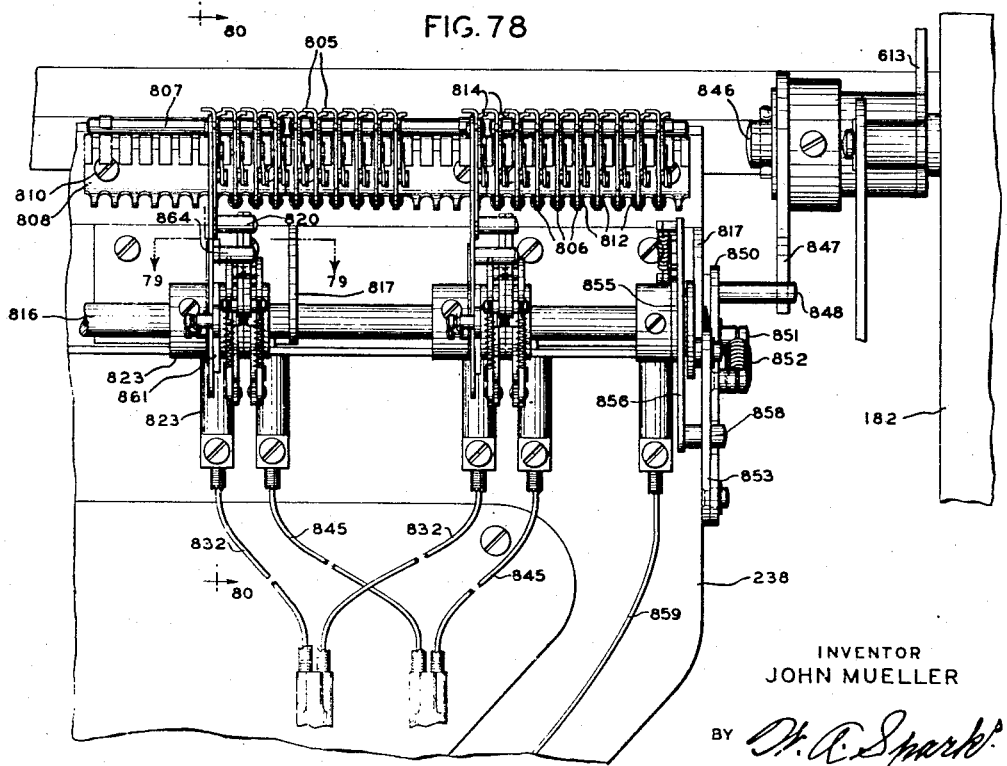
INVENTOR
JOHN MUELLER
BY H. A. Spark
ATTORNEY Aug. 7, 1945.   J. MUELLER   2,381,361
TABULATING AND ACCOUNTING MACHINE
Filed Feb. 1, 1940   31 Sheets-Sheet 28
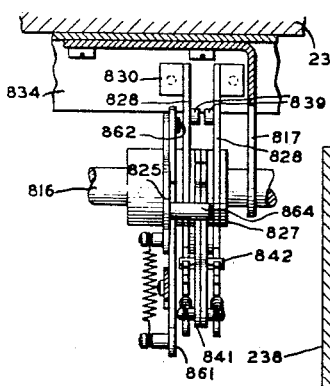
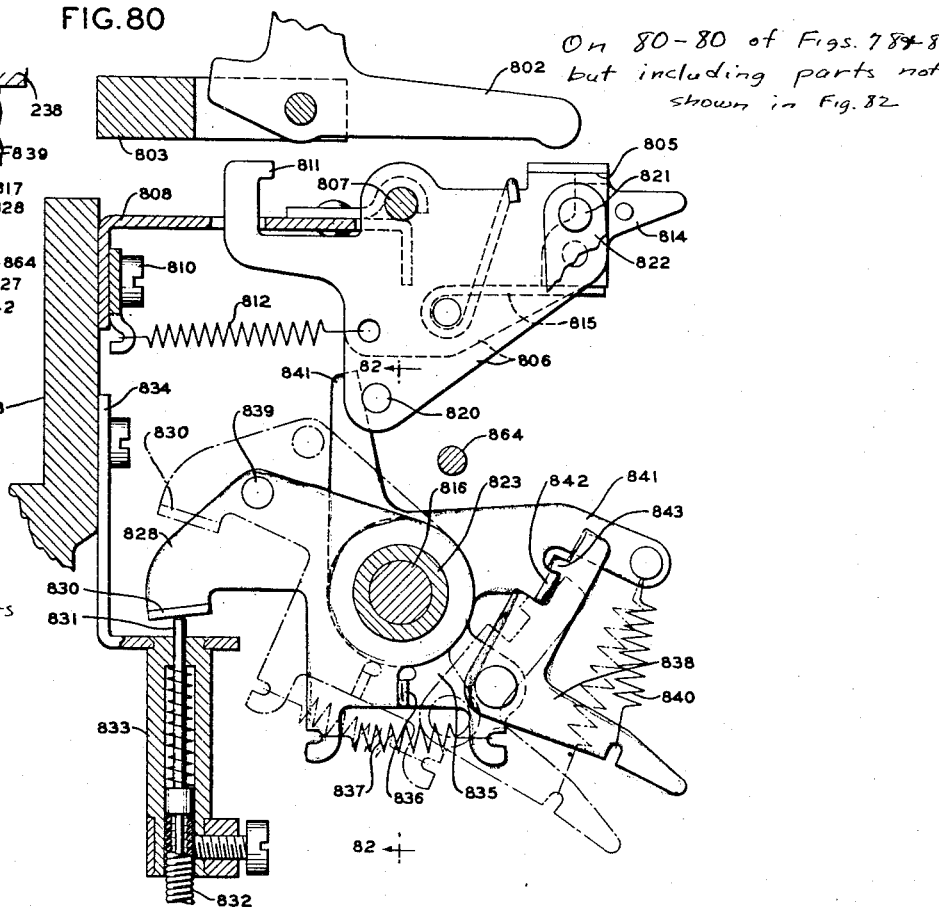
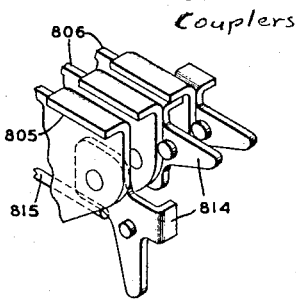
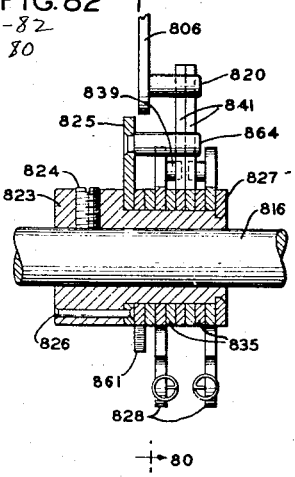
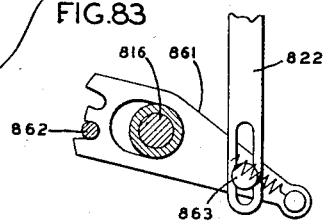
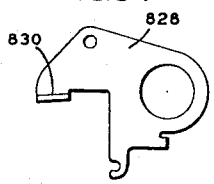
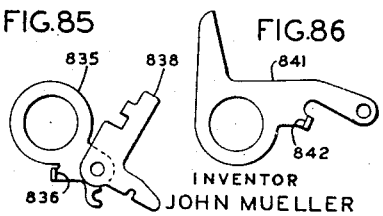
INVENTOR
JOHN MUELLER
BY
ATTORNEY Aug. 7, 1945.   J. MUELLER   2,381,361
TABULATING AND ACCOUNTING MACHINE
Filed Feb. 1, 1940   31 Sheets-Sheet 29

INVENTOR
JOHN MUELLER

Aug. 7, 1945.     J. MUELLER     2,381,361

TABULATING AND ACCOUNTING MACHINE

Filed Feb. 1, 1940     31 Sheets-Sheet 30

INVENTOR
JOHN MUELLER
BY *W. A. Sparks*
ATTORNEY

Aug. 7, 1945.        J. MUELLER            2,381,361
           TABULATING AND ACCOUNTING MACHINE
           Filed Feb. 1, 1940      31 Sheets-Sheet 31

INVENTOR
JOHN MUELLER
BY W. A. Sparks
ATTORNEY

Patented Aug. 7, 1945

2,381,361

UNITED STATES PATENT OFFICE 2,381,361

TABULATING AND ACCOUNTING MACHINE

John Mueller, North Bergen, N. J., assignor to Remington Rand Inc., Buffalo, N. Y., a corporation of Delaware Application February 1, 1940, Serial No. 316,739

14 Claims. (Cl. 235—61.9)

This invention relates primarily to record controlled tabulating machines though some of its features are applicable to machines not controlled by records, and some of them to record controlled machines which are not tabulators. The invention is shown applied to a machine of the sort described in the application for Letters Patent of W. W. Lasker, Jr., executor of the will of W. W. Lasker, and John Mueller, filed November 13, 1937, S. N. 174,354, now Patent No. 2,323,816, issued July 6, 1943; and, as so applied, it consists chiefly of improvements on or additions to the mechanism of that machine. Some of the features of the invention are outlined below.

The machine preferably includes a continuous series of type bars each provided with both numeral and alphabet types, and provision is made for two tiers of totalizers, so that, if desired, two totalizers may be actuated by racks integral with any desired succession of said type bars. The totalizers of both tiers are now controlled from the same pair of control shafts, instead of from two pairs as in the former construction.

Provision is made for printing characters to designate different operations of the totalizers such as subtraction. and positive and negative totals and grand totals, by the regular alphabet characters on the type bars, instead of by special types mounted in the type bars used for that purpose. This enables those particular type bars to be used, when desired, in conjunction with the other type bars, for the printing of a line of text including words.

The type hammer mechanism has been entirely redesigned and improved. This mechanism includes a continuous series of couplers settable by hand wherever desired to connect any hammer control to the next hammer to its right so as to print significant zeros. Means are provided, preferably record controlled, for temporarily disabling all of these couplers, or, if preferred, only selected couplers, so as to print text in column positions which had been set for the printing of numbers. The couplers are automatically restored to their original settings when a card is sensed which had not the special hole for disabling them.

Improved means are provided for aligning the type bars when printing totals. This utilizes the so-called "slam bail" or "holding pawl" construction of the Lasker and Mueller patent.

Said "slam bail" or "holding pawl" construction is also utilized in the mechanism for controlling the printing of alphabet and other designations. The present invention includes improvements in this designation control mechanism, both with respect to its mechanical construction and to its usefulness.

Mechanism has been added which may be set by hand to cause the machine to stop automatically either after each total printing cycle or after each blank cycle preparatory to the printing of totals, or at both times or at neither time, as desired. This mechanism greatly facilitates the use of the machine in certain classes of work, especially where it is necessary to make some change in the paper between groups of cards.

Naught block mechanism has been provided, of improved construction and capable of considerable flexibility in its application.

Improved means are provided for taking optional totals and grand totals, that is, for taking such totals under the control of total cards. This means is such that special holes for the taking of totals and of grand totals may be located at any desired positions on the card.

Means are also provided for taking progressive totals (totals without clearing) under the control of a total card.

Means are provided whereby the printing of total characters may be prevented in those instances where the machine performs a total taking operation, but where the totalizer was already clear.

The invention also includes minor improvements as will appear from the folowing description.

The invention has for its principal object to improve the mechanical construction of the machine and to facilitate the performance of its functions and to effect functions and modes of operation not possible, or not so readily achieved, by the former machine, in respect to the matters above outlined. In some instances certain of the features above mentioned may be combined one with another to give new or improved results.

To the above and other ends, the invention consists of certain features of construction and certain combinations and arrangements of parts, all of which will be fully described herein and particularly pointed out in the claims. A specific instance of the invention is illustrated in the accompanying drawings, wherein Fig. 1 is a general vertical section of the machine;

Fig. 3 is a view in vertical section just inside the right-hand frame plate;

Fig. 4 is a fragmentary front view of a portion of Fig. 3;

Fig. 5 is a view from the rear on the line 5—5 of Fig. 3;

Fig. 10 is a left-hand elevation of the base section of the machine, with parts in section and parts broken away;

Fig. 11 is a similar view but showing parts not shown in Fig. 10;

Fig 12 is a sectional view of the upper part of the head section showing the type hammer and slam bail mechanism;

Fig. 13 is a view similar to a portion of Fig. 12, but showing the hammer mechanism set for non-list;

Fig. 14 is a front to rear vertical section showing the totalizers and some of the cooperating parts;

Fig. 15 is a detail in section on the line 15—15 of Fig. 14;

Fig. 21 is a fragmentary vertical transverse sectional view on the line 21—21 of Fig. 7 and looking toward the front;

Fig. 22 is a top view of the total taking control unit in horizontal section through the axes of the cam shafts;

Fig. 23 is a transverse sectional view on the line 23—23 of Fig. 2 and looking toward the rear;

Fig. 24 is a vertical sectional view of one of the totalizers;

Figure 1:
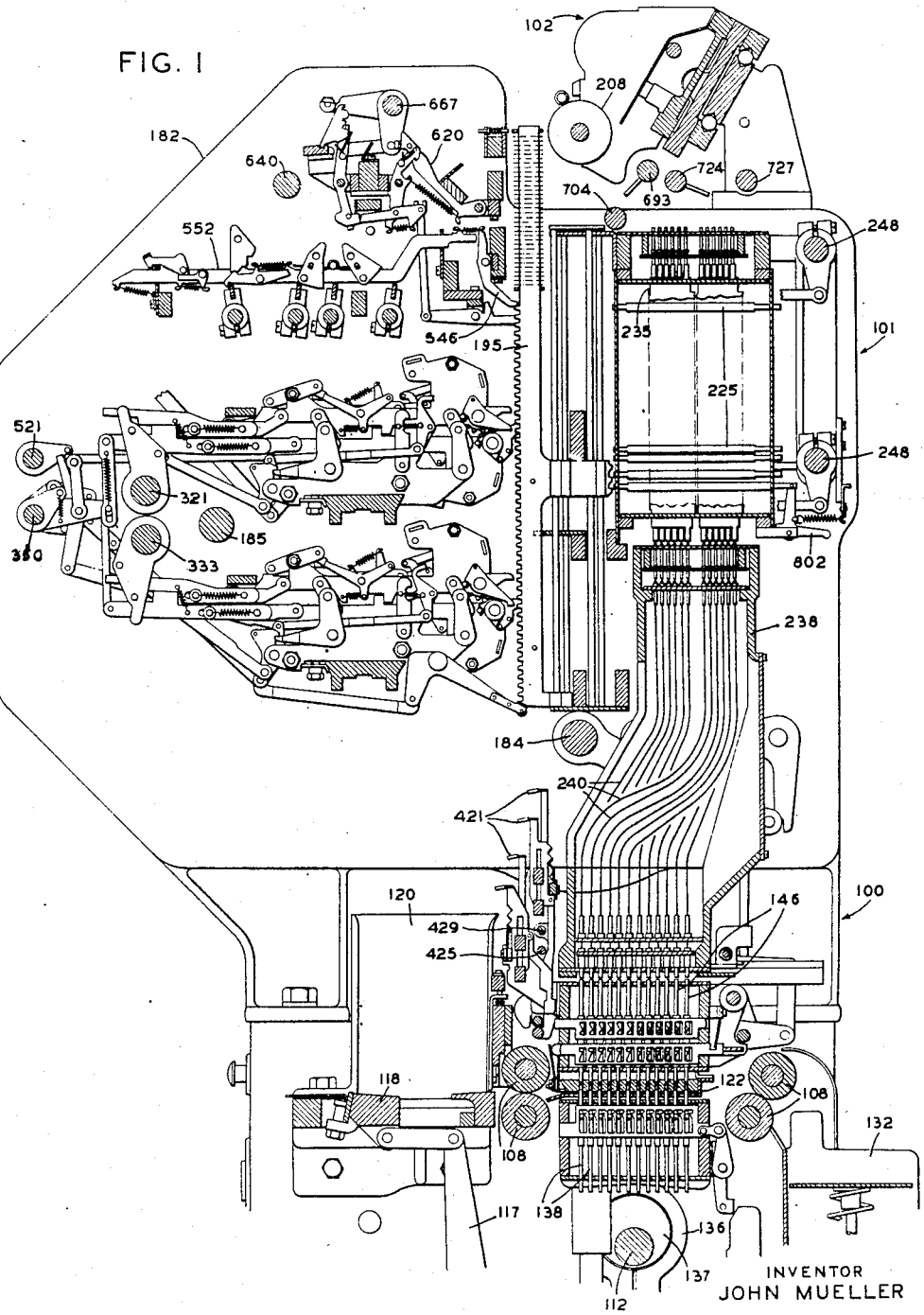
Figure 2:
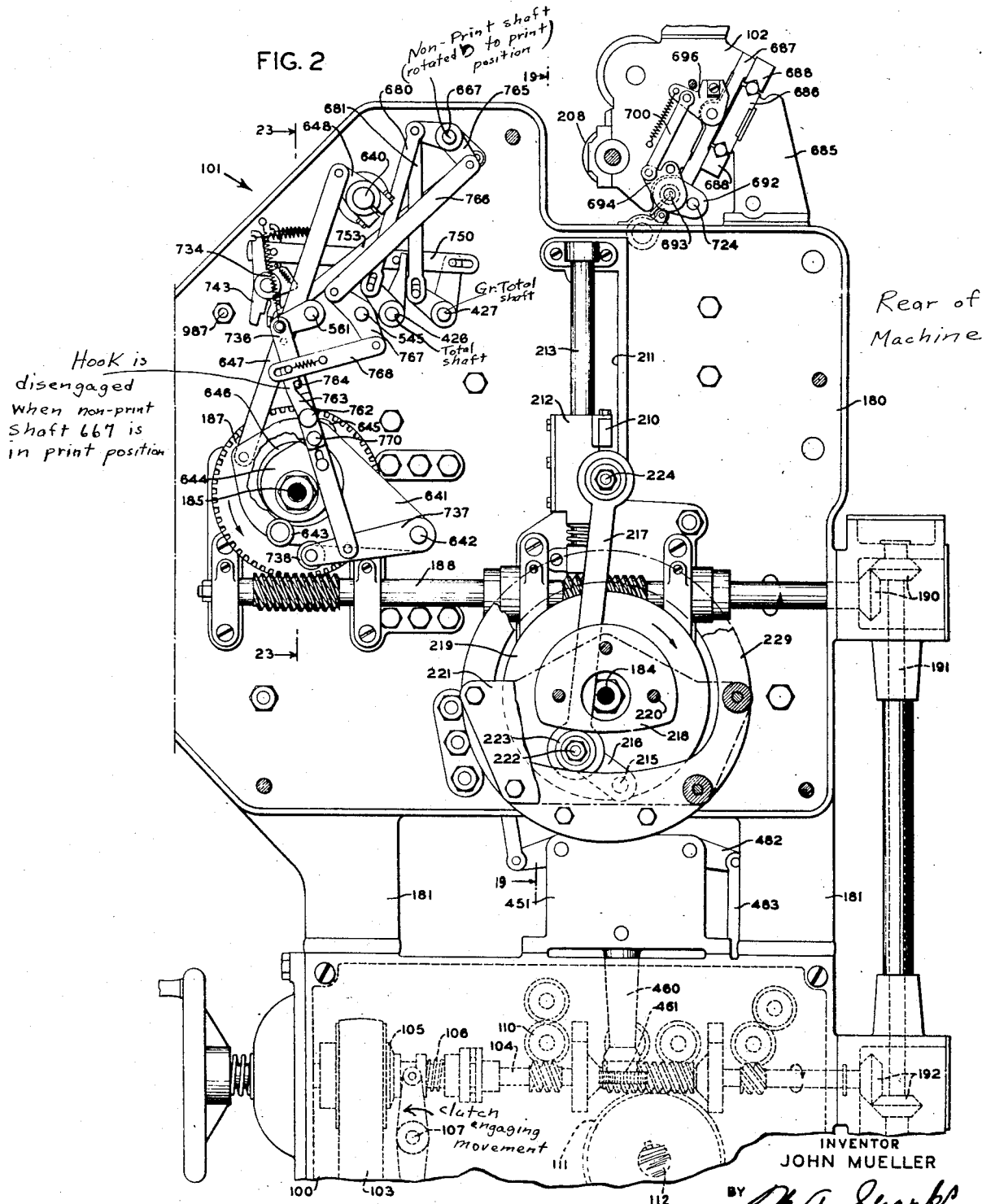
Fig. 2 is a right-hand end elevation.
Figure 6:
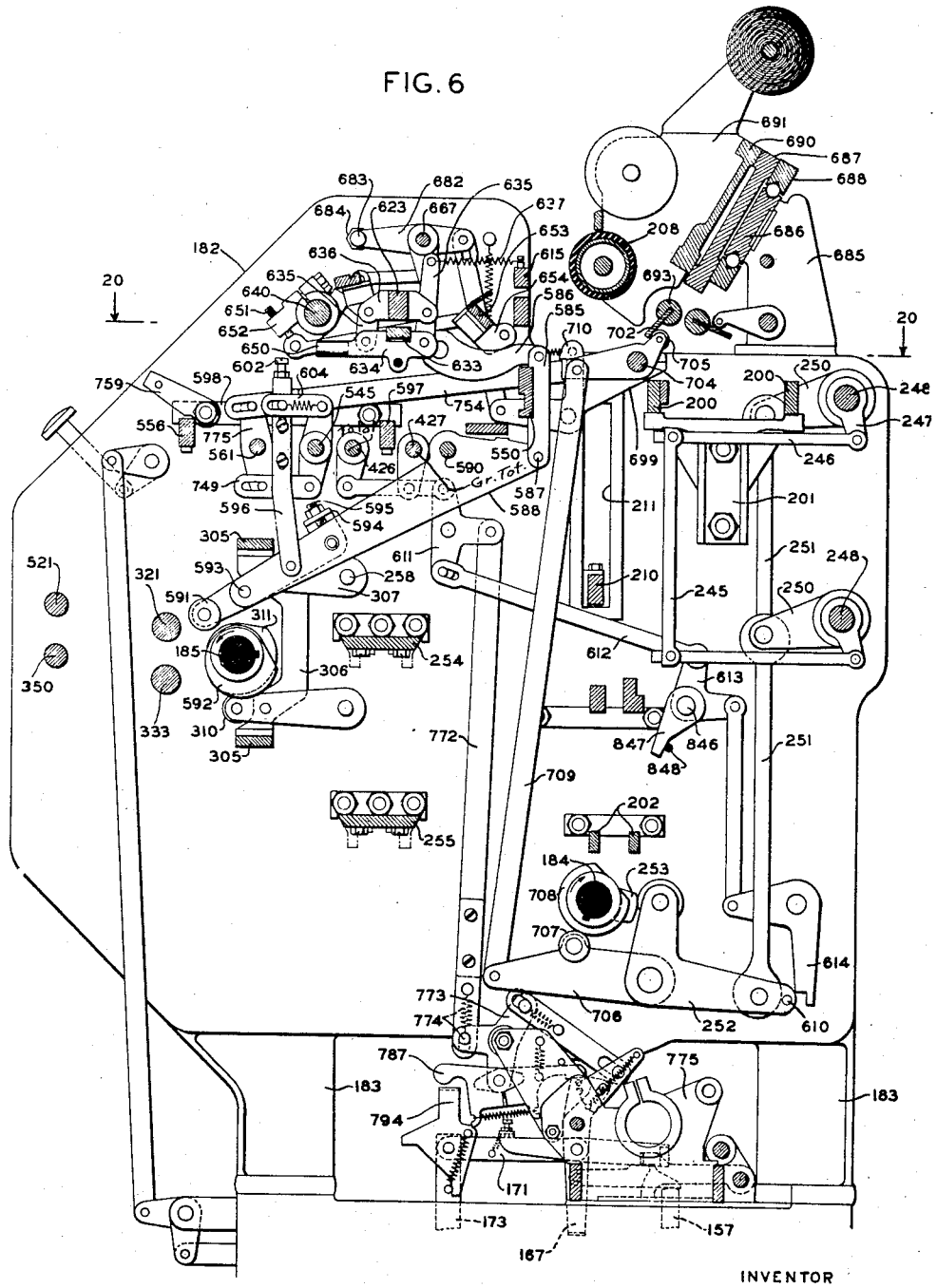
Fig 6 is an elevation as viewed from the right and showing the mechanism inside the left-hand frame plate, cross bars and shafts being shown in section.
Figure 74:
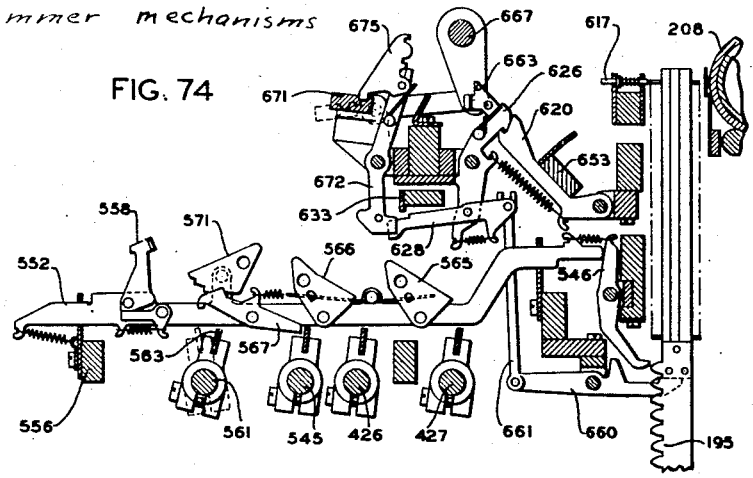
Figure 75:
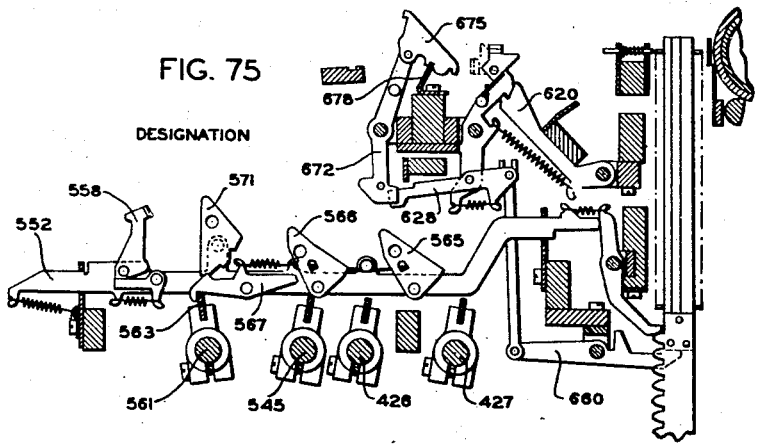
Figure 76:
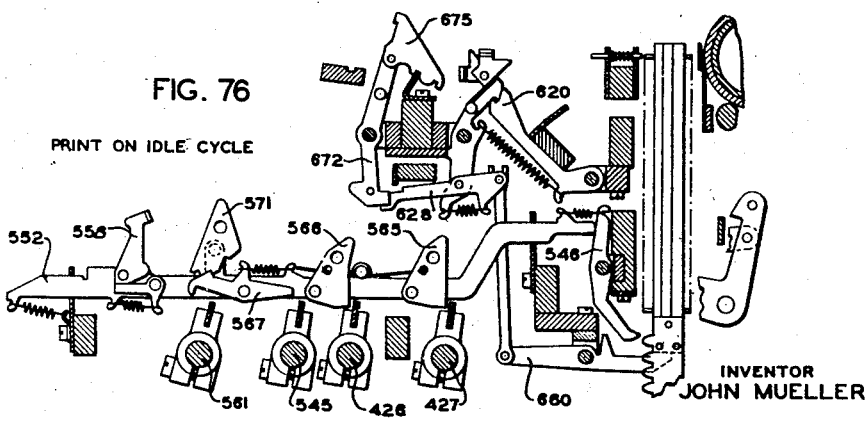
Figure 87:
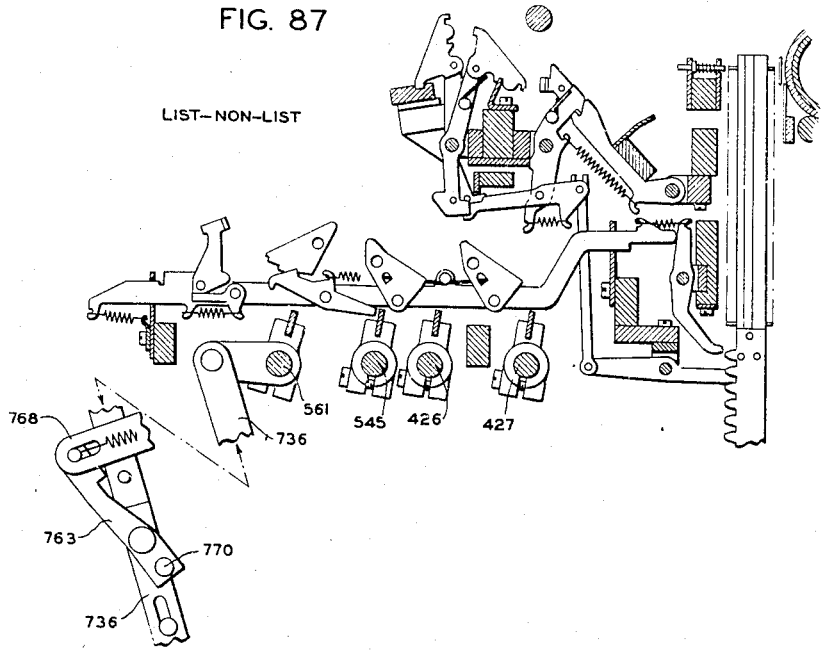
Figure 88:
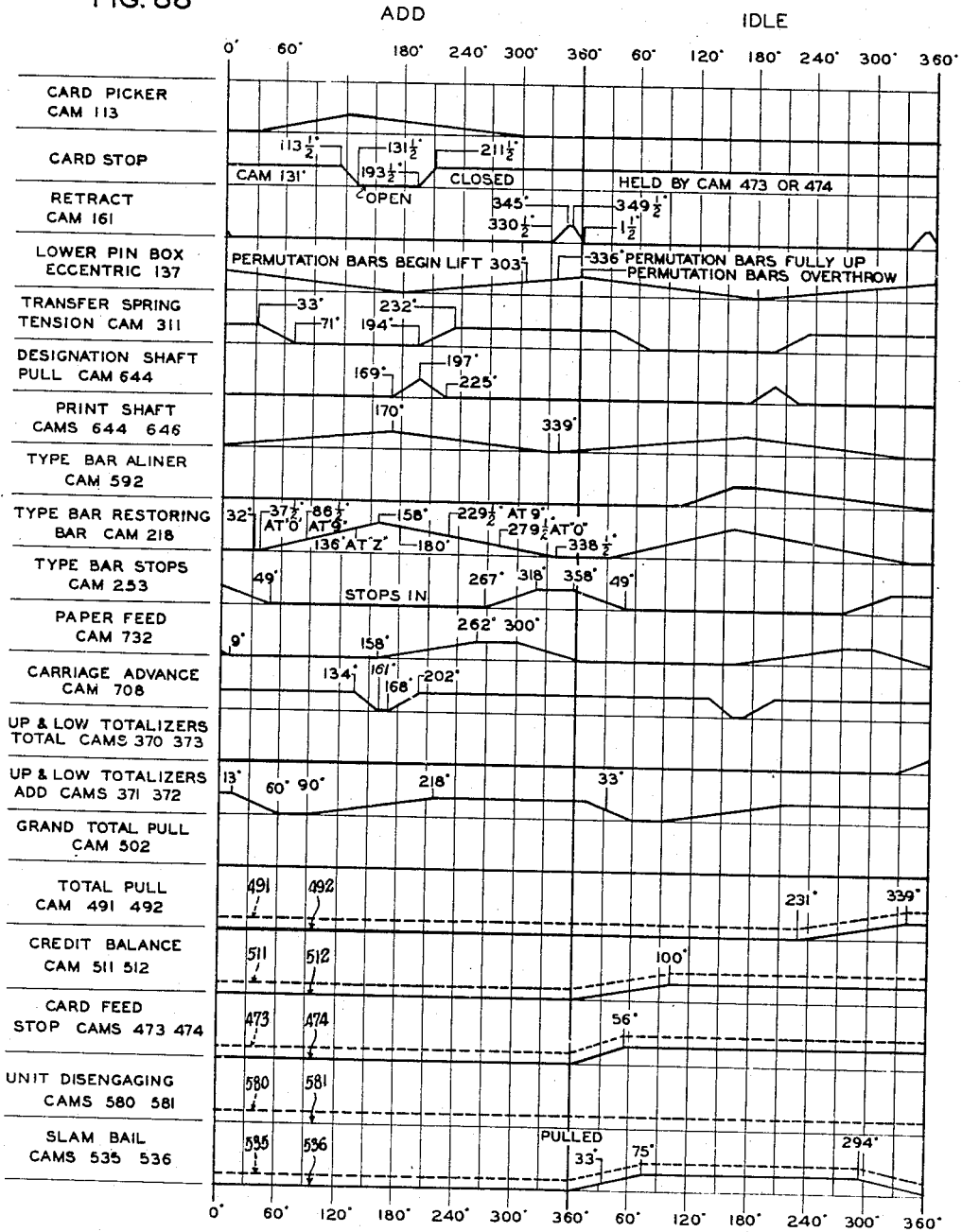
Figure 89:
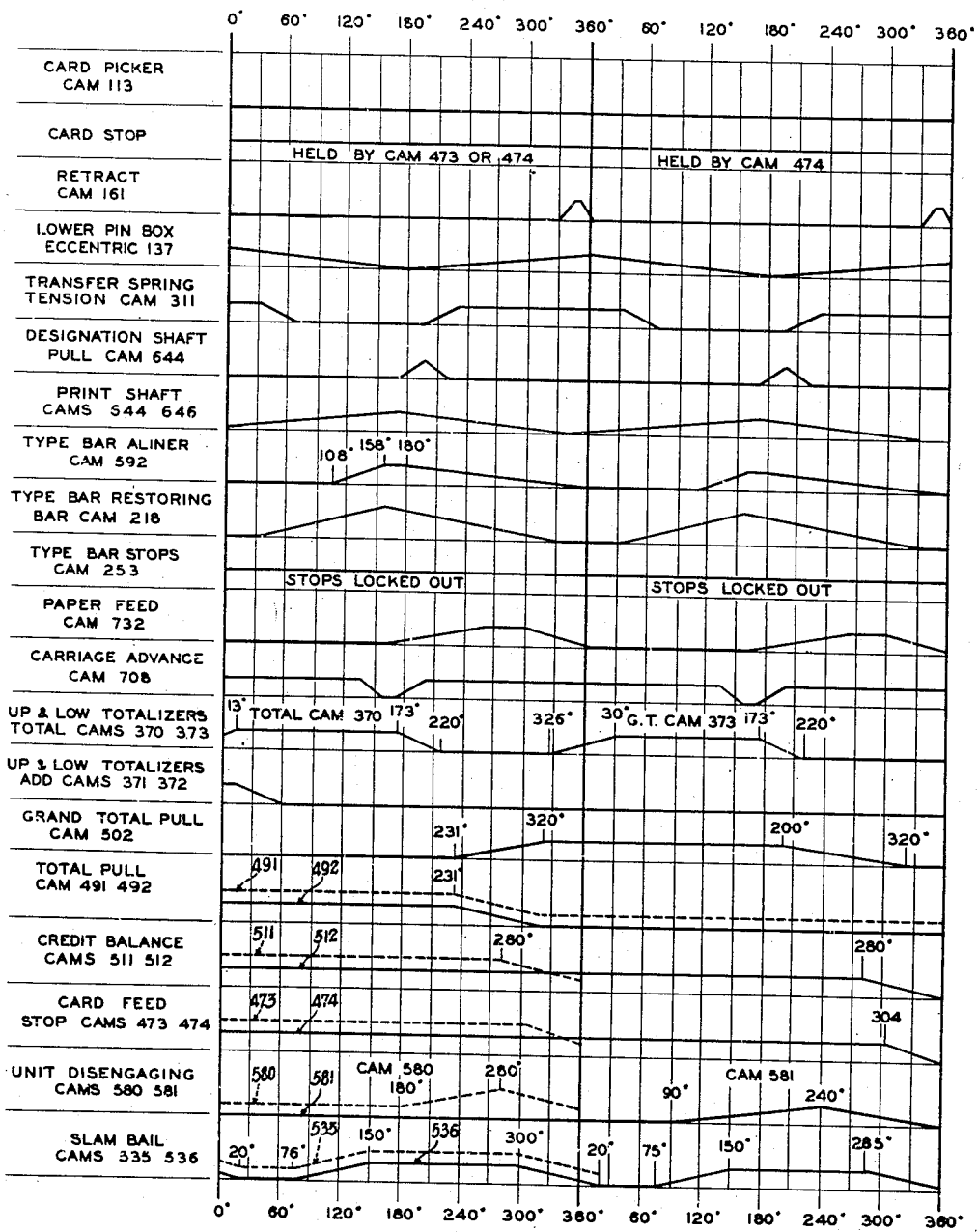

Figs. 25, 26, 27, and 28 are fragmentary views illustrating a zero coupler in different adjustments;

Fig. 29 is a similar view of another zero coupler;

Figs. 30–34 are fragmentary views illustrating portions of the mechanism for setting a totalizer for subtraction. Fig. 30 shows mechanism associated with an upper totalizer and Fig. 31 that associated with a lower totalizer, for automatically taking a negative total. Fig. 32 shows part of the linkage for causing an item to be subtracted. Fig. 33 is a fragmentary front view of a portion of Fig. 31. Fig. 34 is a section on a larger scale on the lines 34—34 of Fig. 14;

Figs. 35–38 are right-hand side views of the cams and associated mechanisms for engaging the totalizers with and disengaging them from their actuators;

Figs. 39–44 are fragmentary views of the cams and cam followers of the total taking control unit;

Fig. 45 is a right-hand end view, partly in section and partly broken away, of portions of the translator and set pin box and illustrating the optional total mechanism;

Fig. 46 is a plan view of the optional total mechanism and of portions of the total control unit;

Fig. 47 is a front elevation of the mechanism of Fig. 46;

Figs. 48 and 49 are fragmentary right-hand side elevations partly in section and partly broken away, illustrating portions of two forms of progressive total control mechanism, the parts being in different positions in the two views;

Fig. 50 is a view similar to a portion of Fig. 45 showing parts in another position;

Figs. 51–55 are small diagrammatic views similar to portions of Fig. 3 and each showing one or more chains of linkage segregated from the others;

Fig. 56 is a fragmentary sectional view showing the automatic card controlled zero coupler mechanism;

Fig. 57 is a fragmentary detail plan view of the upper part of Fig. 56, partly in section;

Fig. 58 is a view on a larger scale of a portion of Fig. 2, and also showing some of the carriage and line space mechanism;

Fig. 59 is a fragmentary front view partly in section on the line 59—59 of Fig. 58, but on a larger scale;

Fig. 60 is a fragmentary plan view of a detail;

Fig. 61 is a fragmentary plan view in section on the line 61—61 of Fig. 58;

Fig. 62 is a fragmentary right-hand elevation, partly in section, of a portion of Fig. 6;

Figs. 63–68 are fragmentary views of the escapement for the control of the designation shaft, the parts being shown in the different views in the successive positions they occupy in the non-list set-up of the machine;

Figs. 69–73 are similar views illustrating the operation in the list set-up;

Figs. 74–76 are fragmentary diagrammatic views illustrating different set-ups of the mechanism, mostly of the slam bail and type hammer mechanisms;

Figs. 77–86 are views illustrating the naught block mechanism;

Fig. 77 is a fragmentary view in front-to-rear vertical section near the left-hand end of the translator;

Fig. 78 is a partial rear elevation;

Fig. 79 is a fragmentary plan view in section on the line 79—79 of Fig. 78;

Fig. 80 is an enlarged view in vertical section on the line 80–80 of Figs. 78 and 82; but including parts not shown in Fig. 82;

Fig. 81 is a fragmentary isometric view showing certain couplers;

Fig. 82 is a sectional view from the rear, on the line 82—82 of Fig. 80;

Figs. 83–86 are details of parts in Fig. 80;

Fig. 87 is a view similar to Figs. 74–76 but showing another set-up;

Figs. 88 and 89 together constitute a timing diagram of the machine.

The machine chosen as an illustrative instance of the invention and shown in the accompanying drawings, is like that described in the Patent No. 2,323,816 to W. W. Lasker, Jr., executor of the will of W. W. Lasker, deceased, and John Mueller, for Accounting and tabulating machine, dated July 6, 1943, but with certain modifications and improvements, and with certain additions to said machine, all of which will be fully described herein. Except as particularly described, the machine may be the same as that of the said prior patent. Said machine is made in two principal parts, a base section 100 and a head section 101, the latter supporting a paper carriage 102 (Fig. 2.)

*Base section*

The base section 100, except as described to the contrary, in the said prior patent and herein, is, or may be, the same as is described in the patent to Lasker, No. 2,044,119, dated June 16, 1936, and which has been in use in the Powers tabulating machines for a number of years. A continuously running motor is connected by a belt 103 (Fig. 2) with a pulley loose on a worm shaft 104 to which it may be connected at any time by means of a clutch 105 comprising discs pressed into engagement by a compression spring 106 acting on a grooved collar controlled by an arm on a rock shaft 107. When the clutch goes into engagement the shaft 107 is rocked counter-clockwise in Fig. 2 and clockwise in Fig. 10. The shaft 104 carries worms, which drive various card feed rolls 108 (Fig. 10) by means of gearing 110 (Fig. 2). A worm on this shaft also drives a worm wheel 111 fast on the main base drive shaft 112 of the machine. This shaft near its left-hand end (Fig. 10) has three principal cams 113, 131 and 161. Cam 131 acts on roller 114 to rock an arm 115 which is connected through a linkage 116, 117 with the card picker 118, which feeds cards one at a time from the hopper 120 to the feed rolls. From said feed rolls cards are fed into a sensing chamber 121, where they are arrested by a card stop 122 in order to be sensed. This stop consists of an angle bar with uprights secured to its ends, said uprights being articulated with levers 123 fast on a rock shaft 124, one of said levers being connected by a link 125 and lever 126 with a depending link 127, which at its lower end is pivoted to a lever 128, carrying a follower roller 130 pressed by a spring against the cam 113 on the shaft 112. This cam consists of two concentric parts, one higher than the other and connected by inclines, and it holds the card stop 122 closed except for a sufficient period in which to permit the just sensed card to be fed out to the receptacle 132 as another card is fed in its place into the card chamber.

The sensing pin box 135 (Fig. 17) is of the usual kind reciprocated by two pitmans 136 actuated by eccentrics 137 on the main base shaft 112. This pin box carries the usual sensing pins 138, spring-pressed upward to pass through any holes they may find in the card in the chamber 121, said pins controlled by the usual locking plates 140 acting on lugs 141 on the pins. These plates are all strung on a rod 142 which is reciprocated by levers 143 fast on a rock shaft 144 and one of which levers has a depending arm carrying a follower roller 145 cooperating with a stationary cam in the well known manner, that is to say, so as to leave the pins 135 free of the latch plates until the pin box has risen sufficiently high for such pins as find holes to have passed a short distance through the card. The roll then runs off of the cam, permitting a spring to move all of the plates leftward in Fig. 17, locking such pins as have found holes so that the further upward movement of the pin box may positively actuate set pins 146. The stationary set-pin box 147 contains said set pins 146 and the means for controlling them. These set pins are pressed down by springs and are adapted when elevated to be individually locked up by latch plates 148 acting on lugs or studs 150 on the several pins. The present machine is arranged for sensing 90-column cards and there are, therefore, two of these latch plates 148 for each column of pins, one plate cooperating only with the forward six pins, and the other only with the rear six pins. These plates are moved to latching position by springs 151. They are released at suitable times by a so-called "retract" mechanism comprising a bail bar 152, whose arms are fast on a shaft 153, which may be rocked to release the set pins at the proper time in each tabulating cycle by means shown in Fig. 10. At or near its left-hand end the shaft 153 has fast thereon an arm 154 having an ear 155 overlying the free end of a pivoted arm 156. Suitably guided for vertical motion beneath the arm 156 is a plunger 157 pivoted at its lower end to a lever 158 carrying a follower roller 160 running on a cam 161 fast on the main shaft 112. This cam is concentric except at one point so disposed that at about the end of the cycle it causes a slight counter-clockwise rocking of the arm 158, which through the plunger 157 and arm 156 rocks the arm 154 and shaft 153 counter-clockwise, releasing the pins 146 from the latch bars 148 momentarily.

Means for starting and stopping the machine is described in Patent No. 2,044,119. It includes a finger button 162 (Fig. 11) projecting from the left-hand box-like frame member of the base. This button is on the end of plunger 163 to which is pivoted a link 164 pivoted to a spring-returned lever 165, which, at its upper end, has pivoted thereto a pusher or pawl 166, the rear end of which is adapted to engage a flange formed off from the lower end of an arm 167 fast on a certain rock shaft 168 in the upper part of the base mechanism. The interponent lever 158 above described is pivoted to the arm 167 in such wise that when by pushing in the button 162, the link 166 swings with said arm rearward, it moves the interponent 158 toward the rear of the machine, where its upper edge comes under a lug 170 on the side of a lever 171 pivoted at 172 and having its forward end pivoted to a long push link 173. The latter at its lower end is pivoted to an arm 174 projecting rearward from the clutch controlling shaft 107 hereinbefore described, which shaft extends into the box-like left-hand frame member. In Fig. 11 the parts are shown in the positions they occupy when the machine is running. If then the button 162 be pushed in and held in then when the cam 161 moves the link 157 upward and rocks the interponent 158, the latter will swing the lever 171 clockwise, pushing down on the link 173 and rocking the shaft 107 to disengage the clutch. The clutch is then latched in disengaged position by a latch 175 engaging over a lug on the link 173. Pivoted to the upper end of the lever 165 is another link 176 whose forward end rests on a pin 177 projecting from the link 173. The rear end of this link 176 has a lug 178 formed off therefrom and lying underneath the lower edge of the pusher 166. The construction is such that, when the link 173 is in its upper position with the clutch engaged, the pin 177 holds the forward end of the link 176 up and allows the pawl 166 to drop to the operative position shown. But, when the link 173 is pushed to its lower position releasing the clutch, then the link 176 rocks clockwise raising the rear end of the pawl 166 out of range of the ear on the end of the lever 167. At the same time a shoulder on the forward end of the link 176 drops down in front of the upper end of the latch 175. The construction is such that if now with the clutch disengaged the button be again pushed in, the pawl 166 will not swing the lever 167 but, on the contrary, the link 176 will disengage the latch 175, allowing the spring 106 to reengage the clutch. This mechanism is well known in the art. As described in the Patent 2,044,119, means are provided for operating the lever 167 automatically at certain times to stop the machine, and novel means for this purpose will be described hereinafter.

*Head section*

Figure 19:
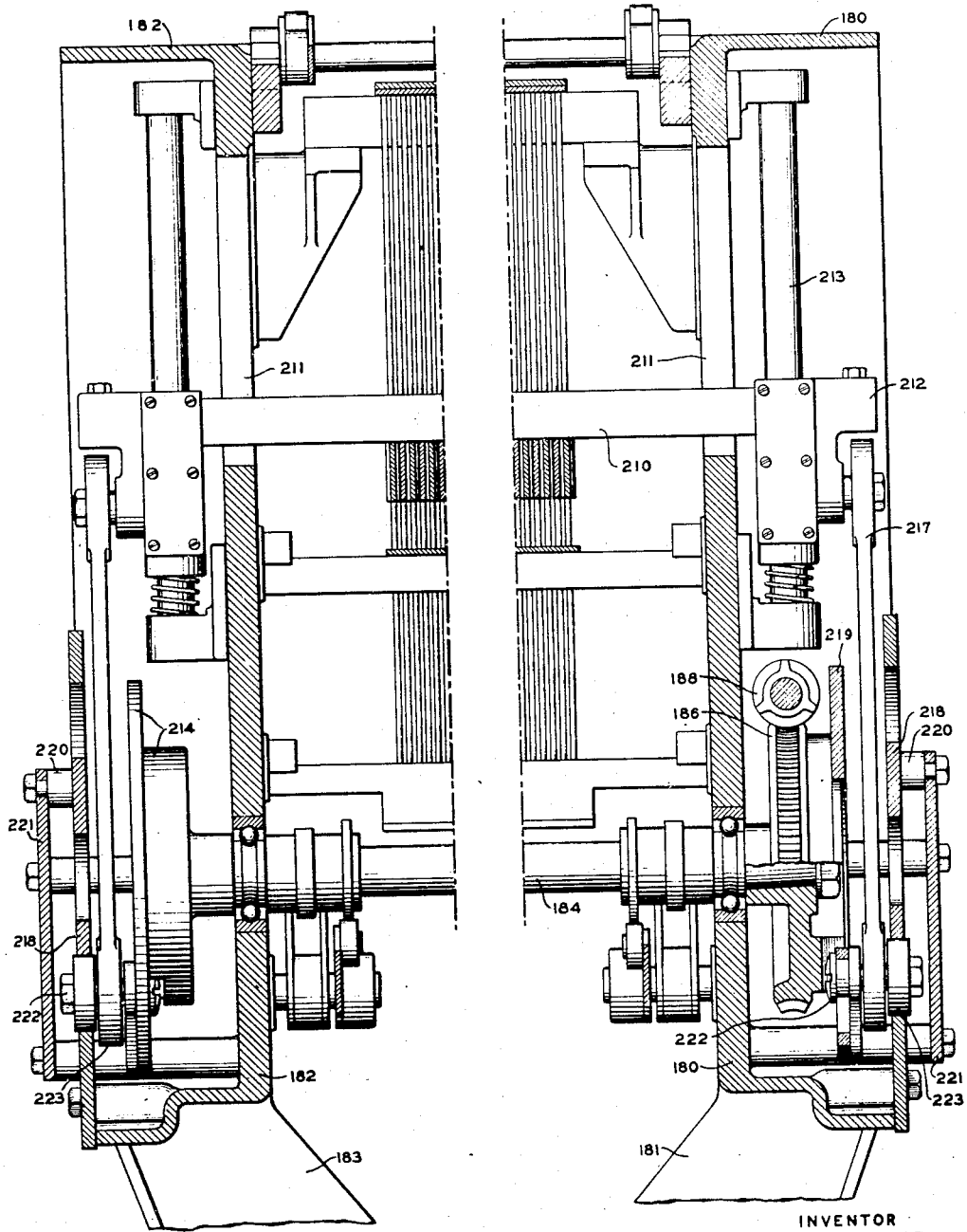
Fig. 19 is an irregular transverse vertical section partly on the line 19—19 of Fig. 2 and partly through the axis of the rear drive shaft and looking toward the rear.

The head section of the machine is, except for the changes and additions hereinafter described, the same as that described in the Lasker and Mueller patent hereinbefore referred to. Its framing (Fig. 19) consists of two main members, namely, a right-hand main frame member 180 and a left-hand member 182, each made in the form of a sort of box with sides consisting of flanges projecting rightward and leftward respectively from the vertical web of the member. The right-hand member has integral with it two legs 181 resting on the right-hand frame member of the base and, as indicated in Fig. 19, sloping upward and outward because the head section is wider laterally than the base. The left-hand frame member 182 (Figs. 6 and 7) is substantially the left-handed counter-part of the member 180, and is supported on integral legs 183. The power-drive for the mechanism of the head section includes two main drive shafts, namely, a rear and lower shaft 184 (Figs. 2, 19, and 23) and a forward and upper shaft 185. These carry respectively worm wheels 186 and 187, which are driven by a worm shaft 188 in the right-hand frame member 180. This shaft lies beneath the front and above the rear drive shaft, and it projects through the rear flange of the frame 180 where it is driven by mitre gears 190 from a shaft 191 which at its lower end is driven by mitre gears 192 from the base worm shaft 104. The gearing is such that each of the shafts 184 and 185 makes a rotation in the same time as the base main shaft 112.

*Type and actuator bars*

Figure 16:
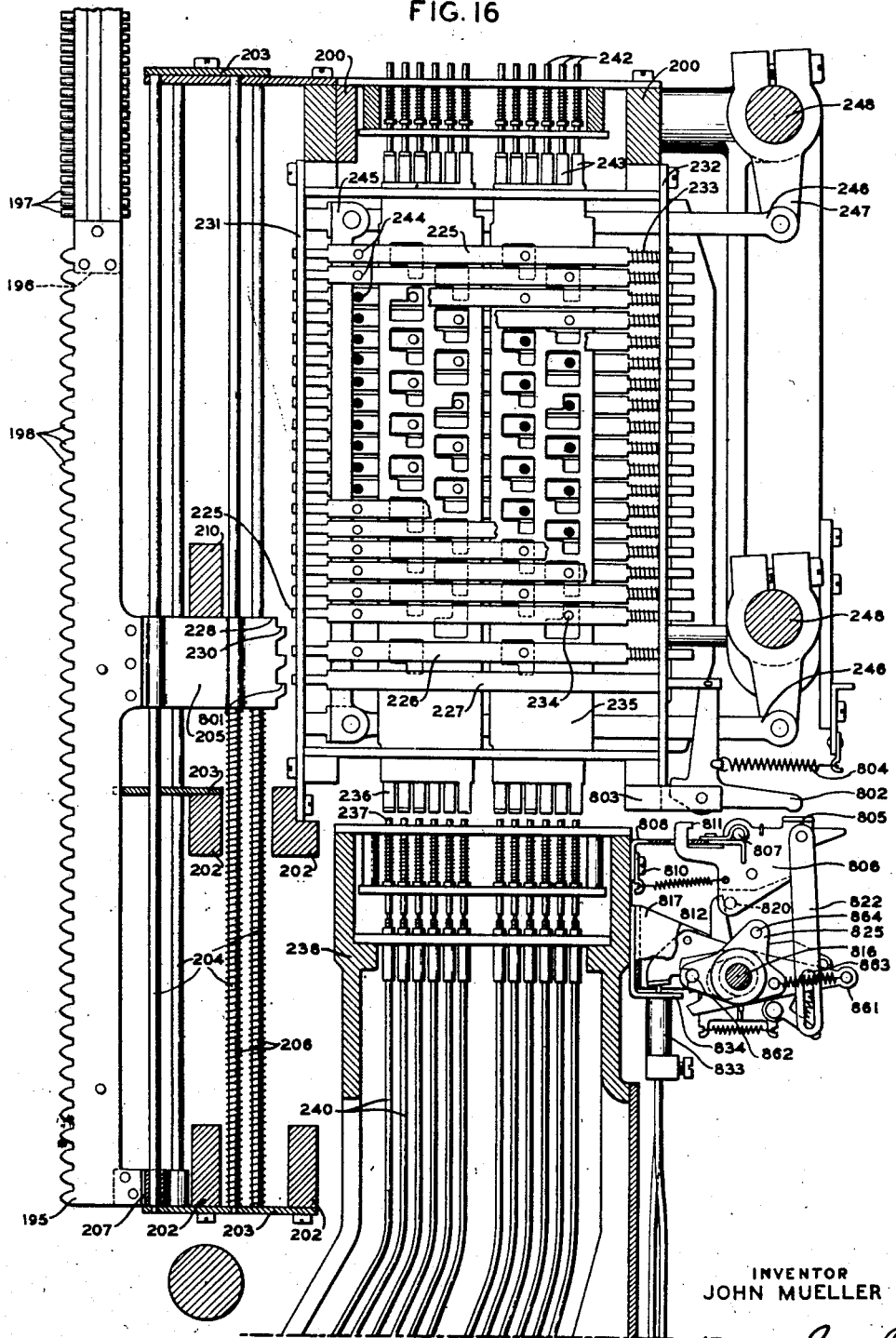
Fig. 16 is a partial sectional view showing the differential stop mechanism, a portion of the translator, and some associated devices.

The denominational differential members of the machine consist of long vertical bars 195 (Figs. 12, 14 and 16), each having at its top a thickened piece 196, which supports and guides alphabetical and numerical types 197. The front edge of each bar 195 below the types is made with rack teeth 198, the spacing of which is double that of the types 197. These rack teeth may actuate totalizers (Fig. 14) as will be described. As best shown in Fig. 6, two cross frame bars 200 are supported at their ends by brackets 201 fastened to the main frame members 180 and 182. Also several other cross bars 202 are supported by said end frames. As best shown in Fig. 16, horizontal plates 203 are supported by these cross bars and they, in turn, support a set of vertical rods 204. Each of the rack bars 195 has projecting rearward therefrom a branch or bracket 205 guided on two of the rods 204, one of which is surrounded by a compression spring 206 to elevate the bar. In order to make space the rods 204 are arranged in two staggered sets, the type bar shown in Fig. 16 being guided on two of the rods, i. e., the left-hand one of each pair and the next type bar at each side of it being guided on the right-hand rods of each pair. Each of the bars 195 near its lower end also has a bracket 207 surrounding one of the rods 204 and guided by it. The construction is such that the differential bars are capable of up and down movements slightly in excess of the length of the set of types 197, which brings the latter, one at a time, into printing position before a platen 208.

The type bars are drawn down to their normal bottom position by a reciprocating restoring bar 210 which (Fig. 2 and 3) extends through long vertical slots 211 in the webs of the main frame members 180 and 182. At each of its ends (Figs. 2 and 7) the bar 210 is secured to a block 212 sliding up and down on a guide rod 213 secured to the outer face of the web of the main frame member 180 or 182. The rigid structure comprising the bar 210 and blocks 212 is reciprocated at its ends by crank discs fastened on the shaft 184. The right-hand crank disc 219 (Figs. 2 and 19) is integral with the worm wheel 186, and the left-hand one is an independent disc 214. Pivoted to each eccentric crank disc at 215 is a short link 216 to the free end of which is pivoted a pitman 217 extending to the block 212 to which it is pivoted. The link 216 permits the lower pivot of the pitman a limited amount of motion radially of the crank disc and this motion is controlled by a stationary cam disc or guide plate 218 which is secured by posts 220 to a frame plate 221 which, in turn, is supported by posts from the main frame 180 to 182. This guide disc 218 is concentric of the shaft 184 throughout the greater part of its periphery, but its bottom edge is made on the arc of a circle having the lowermost position of the upper pivot point of the pitman 217 as its center. The wrist pin 222 on link 216 is extended inward into an opening in the cam disc which limits its radial motion. It is also extended outward and has journaled thereon a follower roller 223, which rolls on the periphery of the plate 218. The construction is such that, beginning with the normal position, shown in Fig. 2, the shaft turning clockwise, the first part of the motion of the wrist pin 222 will be concentric with the upper pivot 224 of the pitman and the bar 210 will remain stationary. When, however, the roll 223 runs off of the lower part of the guide plate and on to its concentric edge, the pitman then forces the restoring bar upward and down again after the ordinary fashion of a pitman driven by a crank shaft. When said restoring bar reaches its normal position, the roller 223 runs off of the concentric part of the disc 218 and on to the lower arc thereof so that during the whole fraction of the rotation taken up by said lower arc the restoring bar is stationary in its bottom position. This is, of course, to give time for the transfer operation and other operations in adding numbers. In the present instance the disc 218 is supplemented by a corresponding fixed ring 229 so as to guide the roller 223 positively in a slot.

*Type bar stops and decoding mechanism*

The stops which arrest the differential bars 195 in their several operated positions cooperate with the rear portions of the brackets 205. There are 36 types 197 on each bar and the corresponding 36 positions of the bar are determined by 18 stop bars 225 (Fig. 16), each of said stops having two operative positions. Below the 18 stops 225 are shown two additional stops, one, 226, being a zero stop, and the other, 227, a special stop, which will be described hereinafter.

When any stop 225 is projected forward to its full extent, it is in the path of the topmost shoulder 228 of the bracket 205, but, if projected only partially, it will arrest a tooth 230 projecting from said bracket. The vertical distance between the two shoulders 228 and 230 is equal to the space from one type 197 to the next. If, for example, the lower stop 225 be projected its full extent it will retain the type bar in its lowermost or zero position, but if it be projected only halfway, it will allow the bar to rise one space so as to bring the second type 197 to printing position. When the next stop 225 above the lowermost one is projected its full distance into the path of shoulder 228 it will allow the type bar to rise two type spaces which, as above mentioned, would be equal to one tooth space of the rack teeth 198. This will bring the third type to printing position to print a "1."

The stops 225 are guided at their ends in frames each comprising a front plate 231 and a rear plate 232, the stops being influenced by springs 233 tending to project them to active position. Each stop 225 has a pin 234 projecting therefrom into holes in a stack of six code plates 235, said code plates being controlled from the punched cards according to a six point code. In order to economize space these stacks of code plates 235 are arranged in pairs, one stack directly in front of another. In Fig. 16 the pins 234 of the stops nearest the observer project into the rear set of plates 235. The next set of stops beyond the set shown have their pins 234 projecting toward the observer into holes in the forward set of plates 235. Each of these plates has a toe 236 projecting downward, said toes being arranged as shown in a front to rear series, where they are in position to be elevated by pins 237 in the upper part of a translator 238. This translator also comprises a series of Bowden cables 240 which actuate the pins 237. At their lower ends (Fig. 17) these Bowden cables stand over pins 241 guided in the lower part of the translator 238 and each standing over one of the set pins 146 hereinbefore described.

The construction is such that when one of the sensing pins 138 finds a hole in a card, it will lift the corresponding set pin 146 which will actuate the corresponding Bowden wire 240, which through pin 237 will shift the corresponding code plate 235 up. These code plates are pressed down by spring-pressed pins 242 acting on fingers 243 projecting upward from the several plates 235.

Each of the stop bars 225 has near its forward end a pin or lug 244 projecting inward and just in front of the row of pins is a vertical restoring or retract bar 245 which at its top and bottom is pivoted to long links 246 pivoted to arms 247 projecting downward from two rock shafts 248 in the rear of the machine. The stops are all forced back to inactive position as shown in Fig. 16 by counter-clockwise rotation of these shafts and are released at the proper time by clockwise rotation. As will be understood from Fig. 6, each of the shafts 248 has on at least one end thereof an arm 250 and said arms are connected by links 251 with a bell-crank 252. The upright arm of said bell-crank carries a follower roller cooperating with a cam 253 on the rear drive shaft 184. At the proper time in the cycle, this cam retracts all of the stops 225 and it frees them at the proper time in each cycle.

It will, of course, be understood that Bowden cables are flexible and a cable controlled on its lower end by any set pin 241 can have its upper end located under any desired one of the pins 237.

Figure 18:
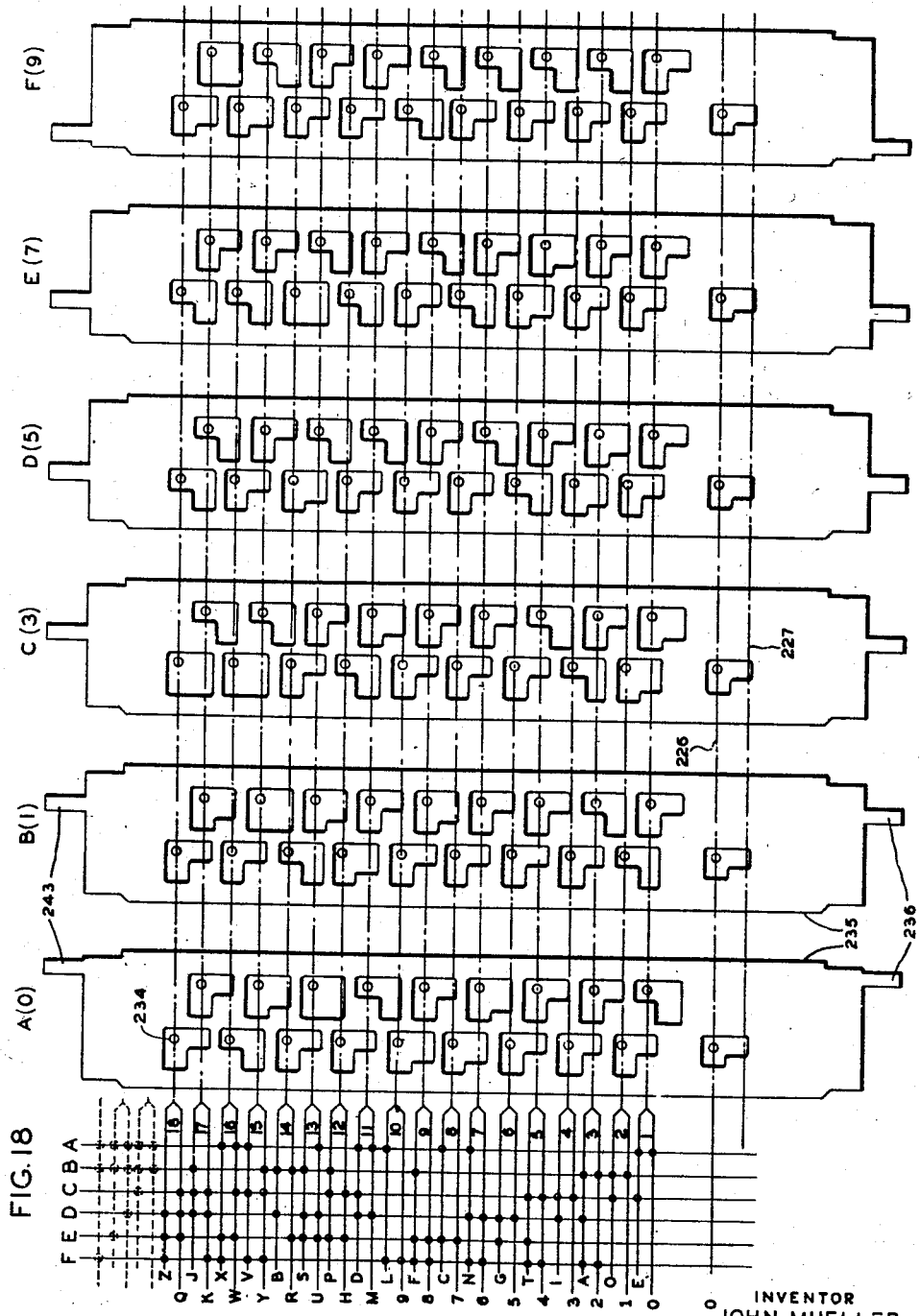
Fig. 18 is a diagrammatic view of the code interpreting plates.

The code used in the present machine is identical with that fully described in the Lasker and Mueller patent except that the lowermost stop 227 in the present machine is not controlled by the code plates 235, but is controlled by special novel mechanism. In Fig. 18 the six code bars of a set are shown separately and in the diagram at the left is shown the style of punching of the card. It will be perceived that each pin 234 projects through holes in all six of the plates, and that these holes are of several different shapes. Taking the left-hand or "A" bar in this figure, it will be noted that the topmost hole is of such a form as to permit the pin 234 and, therefore, the stop 225, to move leftward its full extent when the bar 235 is in its normal lower position, but to lock the pin and prevent any movement of the topmost stop 225 if this bar is raised. Facing this topmost stop to the right, it will be seen that the hole in the "B" bar is the same, so that the topmost stop will not be advanced if either the "A" bar or the "B" bar is elevated. In the "C" bar, the hole is square so as to permit the top to advance whether or not this bar is elevated. In the "D" bar the hole is of such shape as normally to lock the stop, but if the "D" bar be raised, it will leave the stop free to advance to its fullest extent as far as this bar is concerned. The same description applies to the "E" bar. The "F" bar, however, is of another shape. Normally, it would permit the full advance of the stop, but if the "F" bar be raised, it will permit the stop to make only a half step and will, therefore, cause the stop to arrest the type bar by the shoulder 230 instead of by the shoulder 228. A little study of this bar in connection with its code will show that the letter "Q" will be printed if bars C, D, and E are raised. To raise D and E alone would release the stop so that it could advance fully. But this would also release the 6th stop 225 to print a "G," and the upper stop would, therefore, be ineffective. The "C" bar 235 is, therefore, raised to lock the said 6th stop. The combination DEF prints a "Z," the "F" bar locking the 6th stop and limiting the uppermost stop to a half advance.

This whole code interpreting system is more fully described and is claimed in the Lasker and Mueller patent. It may be added that the lowermost holes in the bars 235, which control the zero stop 226, are each shaped so that if no bar at all is raised, this stop 226 may advance a half space, but, if any one of these bars be raised, this zero stop will be locked out. This stop will be advanced to arrest a second tooth on the piece 205 and prevent any elevation of the type bar in any column where no hole is punched.

Totalizers

In order to support the totalizers to be operated by the rack bars 195, two transverse frame bars or supports, namely, an upper bar 254 and the lower bar 255, are supported at their ends on the main frame members 180 and 182 in the manner indicated in Fig. 6, or in any suitable manner.

The totalizers employed are, with slight exceptions which will be explained, fully described and are claimed in the Lasker and Mueller patent. As best shown in Figs. 14 and 24, each of these totalizers has a stationary frame comprising right and left-hand frame plates 256 rigidly connected together by shouldered bolts 257. A rock shaft 258 passing through both of these plates has a bell-crank 260 fast on its right-hand end and another bell-crank 261 fast on its left-hand end. Pivoted in upstanding arms of these bell-cranks are the trunnions 262 of a block 263 extending from one of said bell-cranks to the other and slotted at its upper and lower edges to constitute two combs through each of which passes a pivot rod 264, on which certain levers are pivoted and are guided by the slots of the combs. In the outside or end slots of the upper comb there are pivoted the right-hand and left-hand side plates 265 of an auxiliary frame which frame also includes certain cross plates 266 rigidly connecting the two frame plates toward their rear ends. The construction is such that the frame thus constituted is pivoted on the rod 264. A similar frame, but upside-down of the first, has its side plates 265 pivoted in the end slots of the lower comb 263. Near their rear ends the two right-hand frame plates 265 (upper and lower) are loosely connected by means of a link 267 pivoted to the plates 265 at 268, and the upper and lower left-hand frame plates are similarly connected. The links 267 are parallel to the comb block or bar 263 and their pivots 268 are the same distance apart as the pivot rods 264. The upper and lower auxiliary frames are, therefore, connected together into a linkage in the form of a parallelogram. In Fig. 14 the lower frame is shown extending further toward the rear than the upper frame, but by rocking the block 263 clockwise about its pivot 262, this relationship may be reversed, the lower auxiliary frame being drawn forward and the upper one projected rearward. Each of the links 267 has a trunnion 270 by which it is pivoted to a supporting link 271 pivoted at 272 to the stationary frame plate 256, this link 271 being parallel with and equal in length to the upstanding arms of the bell-cranks 260 and 261. The construction is such that, in whichever of their two relative positions the frames 265 may be at the time, both auxiliary frames can be moved bodily rearward together by swinging the bell-cranks 260 and 261 clockwise and carrying the links 271 with them. In Figs. 14 and 24 the totalizers are shown set for addition with the lower frame projected farther rearward and they are shown out of mesh with the racks. If it is desired to subtract a number, the comb block 263 will first be rocked clockwise about its pivot 262 to project the upper frame toward the racks 195 and to withdraw the lower frame and then both frames will be moved together by swinging the bell-cranks 260—261 so as to bring the upper register wheels into mesh with the racks.

Each totalizer comprises a suitable number of upper or subtracting wheels 273 and lower adding wheels 274 constantly in mesh as shown in Fig. 24. Each of these wheels is mounted on the rear end of a lever 275, said levers for the upper wheels being guided in slots in the upper edge of comb block 263 and pivoted on the upper rod 264. Each of the lower levers 275 is similarly pivoted and guided to the lower part of the block. The construction is such that, when the block 263 is rocked about its pivotal axis as above described, the totalizer wheels will partake of the relative fore and aft movements of the frames 265.

In each denomination, the two levers 275 are connected together by a link 276 pivoted at its ends to the two levers, said link being parallel with the link 267 and with the block 263. This independent link causes the register wheels when they are relatively shifted for addition and subtraction, to roll one on the other, their axes being maintained at all times at a uniform distance apart. The construction is also such that any pair of levers 275 may move upward from its normal position shown in Fig. 24 to the extent of one tooth space, in order to transfer or carry the tens. Each upper lever 275 is extended upward at its rear end and is guided in a suitable comb formed off from one of the frame plates 266 and the reverse construction applies also to each lower lever 275. In the normal position a shoulder 277 on the lower lever 275 rests on the upper edge of a frame plate 266 and the upper lever 275 is also made with a shoulder 278 normally standing below the lower edge of the adjacent frame plate 266 a distance equal to one tooth space of the rack 195. These levers are at the proper times put under spring tension tending to rock them counter-clockwise and are normally held down by the latches forming parts of the transfer mechanism. When one wheel turns from 9 to 0, it trips the latch of the adjacent pair of levers 275 allowing that pair to jump up one tooth space and turn the wheels an additional step. In all of these movements the two levers 275 are constrained to move in harmony by their connecting link 276. When the parts are set for addition, as shown in Fig. 24, the lower levers 275 are engaged by transfer latches 280 pivoted on a cross rod 281 mounted in the auxiliary frame plates 265, said latches having springs 282. Each latch 280 is connected by a link 283 with a bell-crank transfer pawl 284 pivoted to the lower lever 275 in position to be operated by a transfer tooth 285 on the appropriate register wheel. The construction is such that during addition on the down stroke of the racks, when one of these wheels turns from 9 to 0, the tooth 285 rocks the pawl 284, and withdraws the latch 280 for the next higher pair of levers 275. In total taking operation, where the total is positive, the pawl 284 arrests the counter-clockwise rotation of the register wheels at zero.

The transfer mechanism used in subtraction cooperates with the upper register wheels 273. This comprises in each denomination a latch 286 spring-pressed into engagement with a shouldered notch in the upper lever 275 and withdrawn by a link 287 connected to a bell-crank transfer pawl 288 pivoted to the lever 275 and adapted to cooperate with the transfer tooth 290 on the register wheel. Each link 276 has at each of its ends a tooth 291, said teeth adapted to cooperate cam-fashion with inclined shoulders on the proximate edges of the lower transfer pawl 284 and the upper transfer pawl 288, in suchwise that, when the parts are set for addition, as shown in Fig. 24, the upper tooth 291 forces the pawl 288 upward away from the register wheel and pulls the latch 286 out of engagement leaving the transfer mechanism entirely under the control of the lower wheels. When the parts are reversed, pushing the upper wheels toward the rear and drawing the lower wheels frontward, the link 276 rocks about its two pivots and the upper tooth 291 allows the upper transfer pawl to drop down to operative position, whereas the lower tooth 291 cams the transfer pawl 284 downward to inactive position withdrawing the latch 280 from engagement. This leaves the transfer entirely under control of the upper wheels.

In the upper set of transfer devices, the pawl 288 of highest order operates a device similar to a latch 286, but made in the form of a bell-crank, whose horizontal arm 292 has a pin underlying an arm 293 fast on a transverse rock shaft 294. As shown in broken lines in Fig. 14, this shaft at its right-hand end has another arm underlying a pin on a similar bell-crank which, when the highest wheel passes from 9 to 0, withdraws the latch 286 from the right-hand lever 275, permitting the units wheels to move upward and subtract "1." Similar devices are included in the lower transfer devices. This is the fugitive one mechanism enabling negative totals to be registered in their true amounts.

It may be mentioned at this point that one of these totalizers can be set on either one of the cross bars 254, 255 (Figs. 3 and 14) in any desired position across the machine, so that its wheels may be operated by any desired succession of the racks 195. To this end the bars 254, 255 are each made of dove-tailed cross-section and each of the frame plates 256 has a cutout, the rear edge of which fits this cross-section, as shown in the drawings. At its forward edge the support bar is engaged by a block 295, through which pass two bolts 296, one secured to each frame plate 256. The block is clamped against the bar by nuts 297. The construction is such that by removing this block, the totalizer may be lifted off the support or by loosening the nuts, the totalizer may be slid along the bar to any desired location. It will be understood that at any desired position across the machine two totalizers may be mounted one above the other, as shown in Fig. 14, said totalizers actuated by the same racks 195, and this arrangement may be used in any one of the variety of ways familiar to those skilled in the art. In the present machine the mechanism is arranged so that normally all numbers recorded in the zone appropriate to a pair of these totalizers, will be either added or subtracted on both totalizers alike. The total taking mechanism is so arranged that on a sub-total change of designation the total will be taken from the lower totalizers, and grand totals will be taken on a different change of designation from the upper totalizers. However, in any given field or zone, either totalizer may be omitted, if desired. In short, the arrangement is quite flexible, it being very easy in assembling each machine to set it up in accordance with the requirements of the particular user for whom the machine is intended.

The means for placing the levers 275 under spring-tension to predispose these levers to transferring operations and for relieving that tension at appropriate times to allow the transfer mechanism to drop back to normal position, are as follows:

As best shown in Fig. 24, each of the upper levers 275 is prolonged forward of its pivot 264 and has pivoted thereto at 300 a bell-crank 301, whose depending arm is connected by a spring 302 with the forward end of the lever 275, tending to rock said bell-crank clockwise until arrested by an ear 303 formed off from the lever 275. It will be perceived that if the forward end of said bell-crank be pressed downward, as shown in Fig. 24, the spring 302 will tend to rock the lever 275 counter-clockwise, but, if the forward end of the bell-crank be allowed to rise until arrested by shoulder 303, this tendency will disappear entirely. The forward end of each said bell-crank carries a roller 304 lying beneath a cross bar 305, which bar is moved up and down in order to perform the functions described. As best shown in Figs. 3, 6, and 23, there are two of these bars 305, one for the upper and the other for the lower series of totalizers, and at each end these two bars are connected by upright pieces 306 into a rigid rectangular frame. At each of its ends this frame is carried by an upper and a lower rock arm 307, said arms being parallel so as to guide the frame for up and down movement, the right-hand pair of arms being pivoted to the main frame piece 180 and the left-hand pair to the main frame piece 182. Springs 308 tend to hold this frame in its upper position. Each of the lower arms 307 carries a follower roller 310 pressed by the spring 308 upward against a cam 311 fast on the drive shaft 185. This cam consists of high and low concentric portions connected by inclines, so as to maintain the bars 305 downward substantially during the time when the totalizers are in engagement with the racks in computing operations, and, when the totalizers are withdrawn from the racks to relieve the tension so as to allow any levers 275 which have been raised for transferring, to drop back to normal position.

*Engaging and disengaging the totalizers and actuators*

The means for moving the totalizers into and out of engagement with the racks and for shifting from addition to subtraction have been simplified somewhat over the disclosure in the Lasker and Mueller patent insofar as they affect the lower totalizers, but these means have been changed hardly at all as for the upper totalizers. Referring to Fig. 14, the right-hand upper and lower auxiliary frame plates 265 of each totalizer have pivoted thereto at 312 an upper push link 313 and a lower push link 314, respectively. Normally the upper link rests on a lug of the lower link. The two are drawn together by a spring 315, but can be spread apart upon occasion. The upper link is made with a shoulder 316 and the lower link with a shoulder 317 for alternative engagement by a pin 318 on a lever arm 320 fast on a transverse rock shaft 321 which is journaled near its ends in the man frame members 180 and 182. The totalizer is pushed into engagement by a clockwise rocking of this shaft, the pin 318 acting on the shoulder 317 for addition and on the shoulder 316 for subtraction. Preparatory to the latter operation, the links are swung downward as will presently be explained. Preferably the arm 320 is double (Fig. 15), the links 313 and 314 lying between its two layers and preferably also the pin 318 consists of a plunger which can be withdrawn by hand, if desired, in which event this particular totalizer will be disabled. If the links 313 and 314 be swung downward for subtraction, then when the shaft 321 is rocked, the first part of its motion will consist in pushing the link 313 and the upper frame plates 265 rearward rocking the block 263 clockwise about its pivot 262, thus advancing the upper register wheels and withdrawing the lower ones, so that the actuation will be by the former wheels. In this movement, the relative motion of the upper and lower frame plates is limited by two lugs 319 projecting downward from the upper frame plate 265, and another lug projecting upward from the lower frame plate 265 (Fig. 14).

Referring to Fig. 24, the register wheels when disengaged are held against turning by detents 323 consisting of long levers each pivoted at 324 to the appropriate wheel carrying lever 275 and pressed by a spring 325 against the upper wheel 273. At the time when the upper wheels are moved rearward and the lower wheels moved forward, therefore, the upper wheels are held stationary and the lower wheels rolls under them. As soon as the relative motion of the two plates 265 is completed, the further rocking of the pin 318 forces the two auxiliary frames to move rearward together. In these operations, of course, the bell-cranks 260 and 261 and the links 271 swing about their respective pivotal centers 258 and 272. In order to prevent the two frames from moving rearward bodily before the relative motion of the two frames is completed, a latch 326 (see the lower totalizer, Fig. 14) pivoted at 327 to the right-hand stationary plate 256, engages over the forwardly extending arm of the bell-crank 260 and prevents it from rotating. This latch is released by a push link 328 connected with the lever arm 334 by pin and slot 330. The lost motion in the slot is so regulated as to trip and pawl just about the time that the setting for subtraction is completed. When changing from subtraction to addition, the operation is the converse of that described. The upper totalizer has the same latch operated by the arm 320.

At the proper time in the cycle of the machine the shaft 321 is rocked counter-clockwise to normal position, whereupon the totalizer is withdrawn from the racks by means of a spring 331 (Fig. 24) connected to the bell-crank 261.

Beginning with the parts in the position shown in Fig. 14, if the operation is one of addition, the pin 318 will move idly up to the shoulder 317 and its additional movement will cause the totalizer to engage the racks.

In order to avoid too fine timing in the release of the latch 326 and also to prevent injury to the parts in case a tooth of a totalizer wheel should be mischance collide with the end of a tooth of the rack, each of the push links 313 and 314 is made of two pieces side by side and connected by pin and slot and a spring 332 tending to extend this compound link. In case the advance of the link is obstructed in any way, this spring can stretch and prevent injury.

The lower totalizers are identical in every respect with the upper ones and are moved into and out of engagement and reversed for addition and subtraction in the same way as above described, except that the motions are effected from a lower rock shaft 333 having for each lower totalizer an arm 334 fast thereon and like the arm 320 except that it hangs downward instead of standing upward and the shaft turns counter-clockwise instead of clockwise. This necessitates a slight change in the dimensions of the push link 328 but otherwise the mechanism and mode of operation are the same.

When the totalizer moves into engagement with the racks the detents 323 (Fig. 24) are released as follows: Each of these detents has a forwardly directed arm lying beneath and normally some distance from a bail bar 335 whose arms 336 are fast on a rock shaft 337 journaled in upwardly extending ears of the upper auxiliary plates 265. One of the arms 336 is extended forwardly from its pivot and is connected by a link 338 with the horizontal arm of the bell-crank 261. As this bell-crank rocks clockwise in Fig. 24, to move the wheels into engagement, it rocks the bail bar 335 downward and at the last part of this movement, the bail bar 335 strikes the detent levers 323 and moves them out of engagement with the pinions. They are moved into engagement at the first part of the return motion of the totalizer.

*Subtraction control*

Subtraction is controlled as follows: In each computing field, two of the rack and type bars at the right of the one engaged by the totalizer wheels of lowest order are utilized to print letters to characterize the several operations of the machine. One of these bars, preferably the one immediately at the right of units position, has its lower edge engaged by a roller 340 (Fig. 14) on the end of a spring pressed bell-crank 341, pivoted at 342 to the right-hand stationary frame plate 256 of the lower totalizer. This lever is guided and limited in its motion by a headed pin 343 fast in the frame plate and passing through a hole in the bell-crank of greater diameter than the shank of the pin. The depending arm of the bell-crank 341 is connected by a link 344 to a guide link 345 pivoted on the stationary axis 327 above described. Also pivoted to this same guide lever or link is a link 346 extending upward and forward and pivoted at 347 to a lever 348 loosely pivoted on a stationary transverse rod 350 supported in the end frame pieces 180 and 182 (Figs. 14, 32, and 34). An assembly such as is about to be described is mounted on this rod in front of each pair of totalizers. Fast on the rod 350 at the left of the lever 348 is an arm 351, connected with the arm 348 by a tension spring 352 tending to rock said lever 348 clockwise, and the follower lever 341 counter-clockwise. To the right of the lever 348 (Fig. 34) there is fast on the rod 350 the hub 353 of an arm 354, a pin 355 on which anchors a pair of springs 356. Loosely pivoted on the hub 353 are a right-hand lever 357 and a left-hand lever 358, said levers drawn upward by the springs 356. At its free end the lever 357 (Fig. 30) has a pin 360 playing in a slot in the lower end of a link 361, the upper end of which is pivoted to the lower push bar 314 of the upper totalizer. A spring 362 connecting the link 361 with the pin 360 tends to cause the push bar 314 to move up and down in unison with the lever 357, but, in case the push bar is held up forcibly, the arm 357 can rock downward stretching the spring.

The free end of the left-hand lever 358 (Fig. 31) carries a pin 363 which passes through a slot in the upper part of a link 364 the lower end of which is pivoted to the lower push bar 314 of the lower totalizer. A spring 365 tends to hold the pin 363 in the upper end of its slot. The construction is such that when the levers 357 and 358 are swung downward, they will set the upper and lower totalizers for subtraction. The spring 365 can yield in case the motion is sufficiently resisted. Both totalizers are normally held at addition by the tension of the springs 356. The lever 348 has a pin 366 lying across the upper edges of both levers 357 and 358, so that, if the lever 348 is rocked clockwise, both upper and lower totalizers will be set for subtraction. Said lever 348 is normally held retracted by its linkage connection to the follower lever 341, which is forcibly held down by the designation type bar 195. The parts are so proportioned as to set the totalizer for subtraction by upward motion of the type bar a distance equal to say four type spaces, but the bar may rise more than that. The translator may, for example, be so wired that a special hole for subtraction will cause the bar to rise fifteen spaces which, as will be noted from Fig. 18, will cause the letter C to be printed by this type bar. According to the code the type bar would be arrested at that point by the elevation of the A and E code bars 235. In practice, some positions on the card are set aside for holes to designate subtraction in the various computing units, one hole space being reserved for this purpose as to each computing unit. The translator is equipped with Y-wire Bowden cables for these positions and they are led to the appropriate designation positions relative to the several computing columns. The arrangement is such that, if it is desired that any item be subtracted in any particular computing unit, the appropriate hole is punched in the card, with the result that the designation bar immediately at the right of that unit will be allowed to move up to its C position, and the two totalizers will be set for subtraction as described, and the item will be characterized by printing "C." It will be noted that any unit, consisting of an upper and a lower totalizer if both are present, can be set for subtraction independently of any other by appropriately punching the card.

*Totalizer timing*

Figure 7:
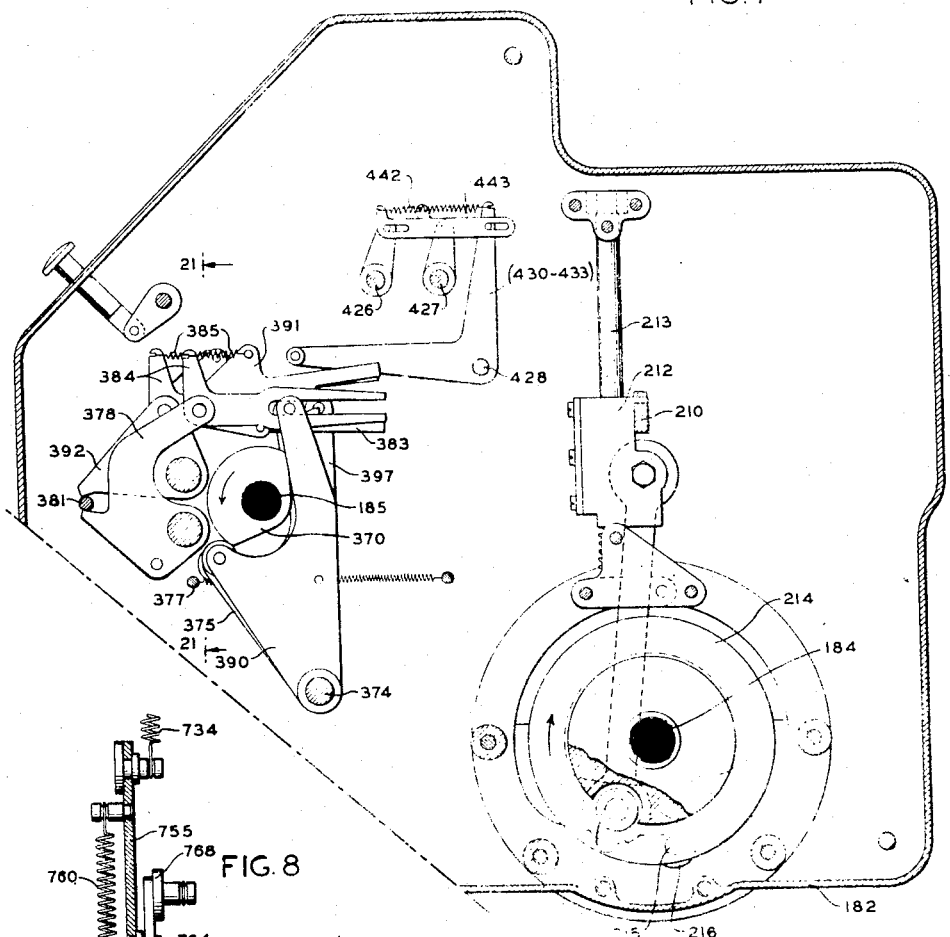
Fig. 7 is a view from the right in section just outside the left-hand frame plate.

Means for moving the totalizer into and out of engagement with the racks in proper timing for computing operations and for total and grand total operations comprises four cams 370, 371, 372, and 373, fast on the left-hand end part of the drive shaft 185, at the left of the web of the frame member 182, as shown in Figs. 7 and 23. These cams and their respective associated devices are shown separately in Figs. 35, 36, 37, and 38. These cams operate respectively four follower levers pivoted side by side on a post 374 projecting leftward from the frame member 182 below the shaft 185. As will be understood from Fig. 23, each of these levers is made double and its follower roller is between the two layers of the lever. The timing of these cams is shown in the time chart (Figs. 88 and 89).

Addition on the lower totalizer is controlled by cam 371 (Fig. 36) which may be called the lower add cam. Its follower lever 375 has its roller 376 engaging the lower part of the cam forward of the shaft 185, said lever being pressed against the cam by a spring 377.

Fast on the rock shaft 333 which controls the lower totalizer is a double arm 378 shown in rear elevation in Fig. 21, said arm being drawn clockwise by a spring 380 (Fig. 36) until arrested by a fixed post 381. It will be recalled (Fig. 14) that in this position the lower totalizers are out of engagement with the racks. At its top the two layers of arm 378 are connected by a post 382 to the left-hand end of which are pivoted the add pawl 383 for the lower totalizers and an anchor 384 for a spring 385. The anchor piece 384 has a rearwardly directed arm forked to embrace a pin or post 386 joining the two strata or layers of the follower lever 375, so that in all relative positions of the parts said arm is held in a substantially horizontal position. The spring 385 tends to turn the pawl 383 counter-clockwise until arrested by a pin 387 thereon striking the underside of the anchor piece 384. The pawl 383 extends rearward below the post 386 and it has a tooth 388 projecting upward from its lower branch, said tooth having an inclined forward edge and an abrupt rear edge, so that it can act on the post 386 like a pawl. The parts are shown in the drawings in the positions they occupy after a grand total taking operation, which operation leaves all totalizers out of engagement with the racks. At the end of an ordinary computing cycle, the totalizers would be in engagement as will hereinafter appear. Beginning with the position shown in Fig. 36, when the shaft 185 makes a rotation, the lever 375 will soon after the beginning of the cycle swing rearward due to the roller 376 running on to the low part of the cam. In this motion, the post 386 will first deflect the operating piece 383 downward and said piece will then snap back with the tooth 388 in front of the post 386. At the proper time near mid-cycle, the roller will run up again to the high part of the cam, forcing the lever 375 to rock counter-clockwise pushing frontward on the piece 383 and rocking the shaft 333 counter-clockwise to press the lower totalizers into engagement with the racks as hereinbefore described. The post 386 will remain behind and in operative connection with the tooth 388 as long as tabulating operations are continued. It will be disengaged as will presently be explained at a total taking cycle.

It will be perceived that addition (or subtraction) on the lower totalizers can be prevented on any cycle by swinging the add pawl 383 clockwise until its tooth 388 is out of control of the post 386.

The mechanism for controlling total taking from the lower totalizers is shown in Fig. 35. The group total cam 370 controls a follower lever 380, similar in all respects to the lever 375. The cam 370, however, is about the reverse of the cam 371 as to timing, being so designed as to rock the shaft 333 clockwise at about mid-cycle, and to restore it counter-clockwise near the end of the cycle. The post 382 of the lever 378 has pivoted to the right-hand end thereof (the left-hand end, Fig. 21), the group total pawl 391 which is urged counter-clockwise (Fig. 35) by a spring 385 and anchor piece 384 exactly like those above described. Pawl 391, however, has its tooth 392 above the post 386 and normally held out of engagement with it by the spring 385. The construction is such that normally this pawl is inactive, but in the latter part of the blank cycle preceding a total cycle it is pressed downward into engagement with the post 386. The lever 390 is then swung counter-clockwise by its cam 370, and said post acting on the dog 391, holds the shaft 333 in its totalizer engaging position during the first half of the total cycle, and releases it at about mid-cycle, permitting the totalizers to move out of engagement. As will appear hereinafter, the pawl 391 returns to its inactive position before the cam 370 again swings the lever 390 counter-clockwise leaving the shaft 333 in its totalizer disengaging position as shown in Fig. 35. It will be perceived, therefore, that, in order to take a total from the lower totalizers, the two operating members 383 and 391 should both be depressed, the first to disable the adding timing lever 375 and the second to enable the total timing lever 390.

The timing mechanism for addition on the upper totalizer is shown in Fig. 37. These totalizers are moved into engagement with the racks by clockwise rotation of the shaft 321, as has been explained. Fast on the left-hand end of this shaft is a double arm 392 (Fig. 21), the two layers of which are connected by a post 393. This lever is urged by a spring 394 counter-clockwise in Fig. 37, until arrested by the post 381. On the left-hand end of the post 393 (the right-hand end in Fig. 21) there is pivoted an upper add pawl, 395, which, in this instance, is in the nature of a pawl-like pull link held in its normal upper position by a spring 385 and anchor piece 384. The free end of the member 395 is forked like the member 383, but its tooth 396 has its forward end abrupt and its rear edge inclined, as it is necessary to pull rearward on this link. The follower lever 397 for the upper add cam 372 is a straight lever, its roller engaging the rear edge of the cam against which it is drawn by one of the springs 377. This lever (Fig. 23) is made double and the follower roller and pin 398 at its upper end are between the two layers of the lever. Beginning with the position of Fig. 37 as soon as the shaft 185 begins to rotate the lever 397 will swing counter-clockwise until the tooth 396 engages behind the post 398. At about mid-cycle, the cam will force the lever clockwise pulling the member 395 with it and rocking the shaft 321 clockwise (Fig. 37) and throwing the upper totalizers into engagement for the second half cycle. This mechanism can be disabled to set the upper totalizers at non-add by depressing the member 395.

The timing mechanism for taking totals from the upper totalizers, which in the set-up adopted, in the present instance, would be grand totals, is shown in Fig. 38. The grand total cam 373 operates a follower lever 400 which (Fig. 23) is made double and which, in fact, is a duplicate of the lever 397. The post 401 at its upper end cooperates with the upper total pawl 402, which is normally swung counter-clockwise by one of the anchor pieces 384 and springs 385, and which is pivoted to the right-hand end of the post 393 of the lever 392. The member 402 has a pawl-like tooth 403 normally held by a spring 385 above and out of engagement with the post 401, but depressible into engagement therewith. The tooth 403 is abrupt on its forward edge and inclined on its rear edge. The outline of the cam 373 is such as to maintain the lever 400 in its rear position during the first half cycle and in its forward position during the second half cycle of the shaft 185.

All of this totalizer timing mechanism as just described is identical with that described and claimed in the Lasker and Mueller patent. As pointed out in that patent, the construction lends itself to quite a variety of timings. The lower totalizer can be set at non-add at any cycle by depressing the member 383 and the upper totalizer by depressing the member 395 and totals can be taken from the lower totalizers by depressing the member 391, and from the upper totalizers by depressing the member 402. Obviously, various means can be provided for depressing these four operating members according to a suitable program so as to give quite a variety of modes of operation of the machine. One particular set-up will be briefly described hereinafter.

*Characterizing printed totals*

In order to print signs to characterize different kinds of totals, means are provided in the nature of an improvement on those described in the Lasker and Mueller patent. In that case four stops were attached, two to each upper and two to each lower totalizer, adapted to cooperate with lugs 405 and 406 (Fig. 14) respectively, on the type bar 195 immediately following the units type bar of each computing zone. The four different kinds of totals were distinguished by four special characters in order to print which four regular types were removed from that particular type bar and special types substituted. This had the disadvantage that that particular type bar could not be used for ordinary alphabet printing. By the present improvement stops are arranged on the totalizers in such a way that they result in the printing from the two type bars at the right of the computing bars, of characters, preferably letters of the alphabet, suitable to distinguish the different totals, each such letter occupying its ordinary position in the type bar. No change whatever is made in these characterizing type bars and they can, therefore, be used on occasion for printing text the same as and in conjunction with the other type bars. It will be recalled that the totalizers can be disabled by withdrawing the plunger pins 318 (Figs. 14, 15) so that the entire width of the machine can be used for printing text consisting of words or of words and numbers.

As shown in Fig. 14, each of the lower totalizers, which in the present set-up are used for taking group or sub totals, has mounted on its right-hand lower auxiliary frame plate 265 a stop 407 extending rearward in such a position that, when the totalizer is set for addition, and is moved into engagement with the racks, this stop stands in the path of the lower lug 406 on the first type bar at the right of units position. This stop is nine type spaces above the lug 406 so that on taking a positive sub-total, the letter "T" will be printed by the type bar next following that in units place (see Fig. 18). When the stop 407 moves rearward to arresting position, a pin 409 thereon enters an interdental space in the next type bar to the right, and prevents it from rising.

Attached to the upper right-hand auxiliary frame plate 265 of each lower totalizer are two stops 408 and 410, the former adapted, when the totalizer is set for subtraction and is in engagement with the racks, to project into the path of the lug 406 of the second type bar at the right of units position, so as to cause this second type bar to print a "T." The stop 410 projects into the path of the lug 406 of the first characterizing type bar and it is spaced from said lug fifteen type spaces, which, as will be perceived from Fig. 18, will result in the printing of the letter "C" on taking a negative total from this totalizer. Therefore, the letters CT will be printed after the total, signifying a credit sub-total.

The lower right-hand auxiliary frame plate 265 of the upper or grand total totalizer has a stop 411 adapted on taking a positive grand total to be projected into the path of the lug 405 to arrest the first designating type bar at a rise of eleven type spaces to print the letter G to designate a positive grand total. This stop also carries a pin 409 to lock the second characterizing bar 195.

The upper right-hand auxiliary frame plate 265 of the upper totalizer has two stops, one, 412, adapted on the taking of a negative grand total to arrest the second characterizing type bar at the letter G and a second stop 413 in position to arrest the first characterizing type bar at fifteen type spaces to print the letter C. A negative grand total will, therefore, be followed by the letters CG.

Preferably, each of these six stops is pivoted to the frame plate at 414 and is urged counter-clockwise by a spring 415 until arrested in its normal active position by a pin 416. The construction is such that if by any chance one of the lugs 405 or 406 gets above its cooperating stops, then, when the type bar is forcibly drawn down to normal position, it will cause the latter to rock clockwise out of the path of the lug and snap back to normal position without doing any harm.

As will appear hereinafter, means are provided settable by hand to free these characterizing type bars to rise on each total and grand total cycle, and the mechanism is ordinarily set that way. However, it need not be so set, if, for any reason, the characterizing characters are not wanted. Means are also provided, so settable, if desired, that the characters will not be printed on idle total and grand total cycles; that is to say, when the totalizer is already clear and, therefore, no total is printed.

It will be recalled that the bell-crank 341 (Fig. 14) senses the first of these characterizing type bars to set the mechanism for subtracting items and that a subtraction setting is effected by causing this type bar to rise to print the letter "C." This letter by itself, therefore, signifies a subtracted item.

It may be remarked that, when printing positive totals, the rise of the first characterizing type bar frees the bellcrank 341 and the linkage connected therewith tends to pull the bars 314 down to subtracting position. At this time, however, the totalizer is already in mesh with the racks, being so held by the pin 318 acting on the shoulder 317. The resulting friction is much too great to be overcome by the weak spring 362 or 365 (Figs. 30 and 31) and the parts are not disturbed.

It is possible, as by inverted Y-wires, to control this character type bar both from a subtraction hole in one part of the card and also from regular code holes in another part. However, usually computing in columns and printing text across the page, are done with different translators, one wired for one sort of work and the other for the other sort.

Detecting change of designation

Figure 17:
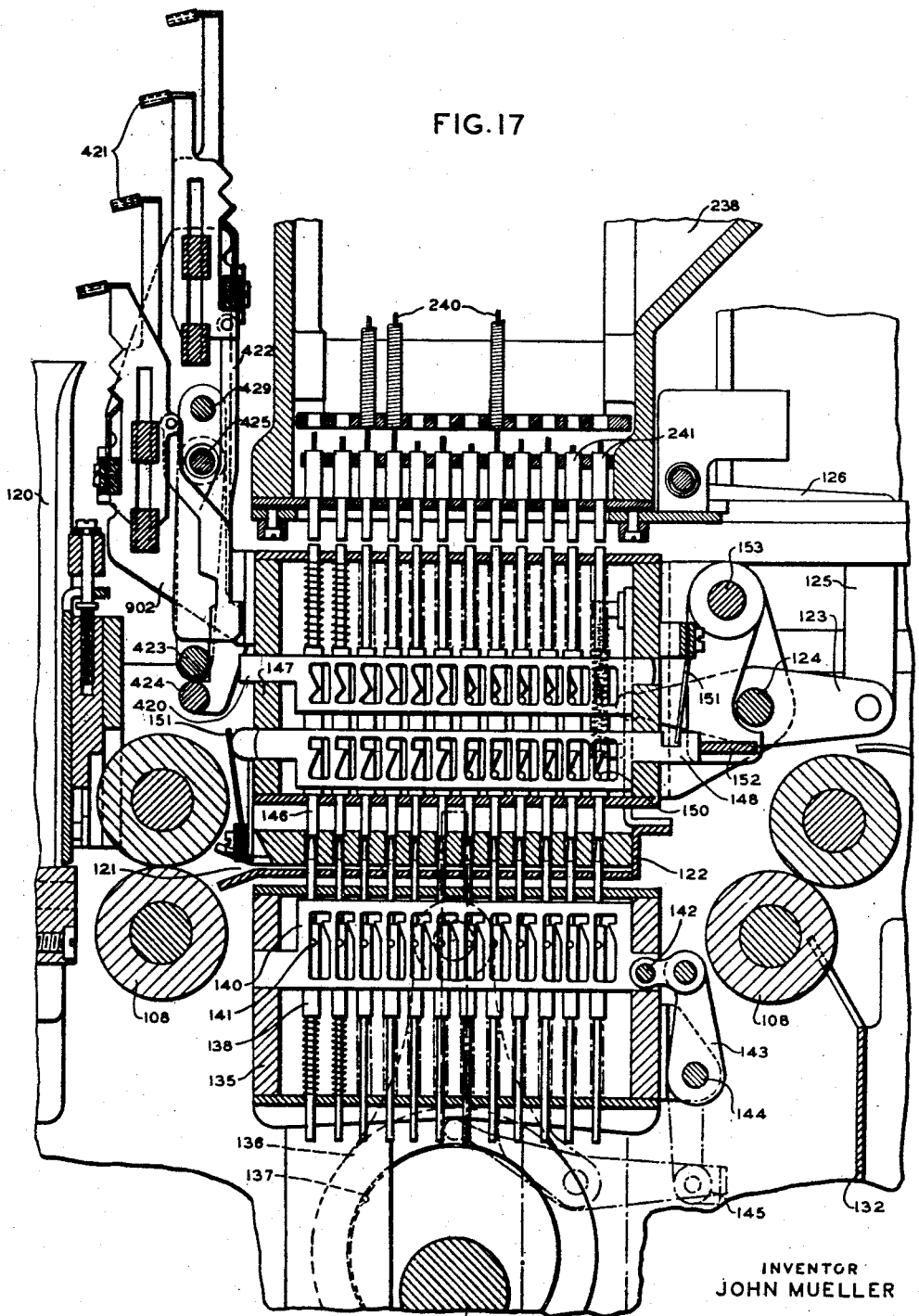
Fig. 17 is a partial sectional view showing the card analyzing and change of designation mechanisms.

In order to detect changes of designation, any suitable means may be provided as far as the present invention is concerned. That shown in Fig. 17 is fully described in certain prior applications, and as it has been in use in the well known Powers tabulator for several years, a brief description will suffice herein. At each row of set pins 146 there are two detecting slides 420 in the form of the usual grid bars provided with noses to be pushed aside by pins or lugs propecting from the sides of the set pins. One of these two bars has noses for the rear six set pins and the other for the forward six set pins. Mounted in a frame attached to the upper pin box are four rows of depressible keys 421, each having pivoted thereto an interponent 422, there being ninety such keys and interponents, one for each of the slides 420. Said interponents, when the keys are in their upper normal position are out of the range of the detecting bars 420. If one of these keys be depressed one notch, its lower end will be interposed between one of said detector bars and a bail bar 423 which when swung leftward in Fig. 17 will initiate a total taking operation. If one of the keys be depressed two steps, its interponent 422 will be interposed between its appropriate detector bar 420 and a second bail bar 424 adapted when pushed leftward to initiate a grand total taking operation. Bar 423 is hung by two arms from a rock shaft 425 and the bar 424 from a rock shaft 429. These shafts project rightward from the frame to which they are pivoted, where they carry arms adapted when rocked, to cause engagement of two clutches.

Total taking

The total taking mechanism of the machine includes two rock shafts, viz., a total shaft 426 and a grand total shaft 427, shown in nearly all of the first several figures of the drawings. These shafts are arranged above the upper totalizers, are journaled in the two side frames 180 and 182, and project into the boxlike portions of both of said frames. A total taking cycle results from the rocking of the shaft 426 counter-clockwise in these figures and a grand total taking cycle from a like rocking of the shaft 427. The means for rocking these shafts at appropriate times is fully described in the Lasker and Mueller patent and will be briefly described hereinafter. Referring to the Figures 7, 23, and 35-38, on a stud 428 projecting leftward from the left-hand frame member 182 are four bell-cranks 430, 431, 432, and 433. Said bell-cranks are shown in front view in Fig. 23. The bell-crank 430 (Fig. 35) is connected by pin and slot 434 and a tension spring 435 with a link 436, whose forward end is pivoted to an arm 437 fast on the total shaft 426. When this shaft is rocked counter-clockwise, the bell-crank 430 is rocked in the same direction unless prevented by some force sufficient to overcome the spring 435. The horizontal arm of this bell-crank carries a roller 438 overlying the upper edge of the operating member 391 which, when depressed, as above described, causes the cam 370 to rock the shaft 333 with the timing to cause a total taking operation from the lower totalizers.

The bell-crank 431 (Fig. 36) has on its horizontal arm a roller 440 which when said bell-crank is rocked counterclockwise, depresses the member 383, which, when in its normal position, causes the cam 371 to rock the shaft 333 on the timing appropriate for addition. Said bell-crank 431 is connected by a pin and slot connection 441 and spring 442 with a link 443, which is itself connected by a pin and slot connection 444 with an arm fast on the total shaft 426. When said total shaft is rocked counter-clockwise, it rocks the bell-crank 431 and depresses the adding-connecting pawl 383 to ineffective position.

The bell-crank 432 (Fig. 37) is in the present machine, although not necessarily, operatively connected with the bell-crank 431 by means of a cross pin 446 and both of these bell-cranks are rocked together whenever either the total shaft 426 or the grand total shaft 427 is operated, or "pulled" as it is usually expressed. The spring 442 and link 443 are common to the two bell-cranks and also to the two shafts, said link 443 being operatively connected not only to shaft 426, as above described, but also by pin and slot connection 447 with an arm fast on the grand total shaft 427. The pin and slot connections 444 and 447 enable either one of the shafts to operate link 443 without affecting the other shaft. A roller 448 on the bell-crank 432 is adapted to depress the coupler 395, which, when in its normal position, enables the cam 372 to time the upper totalizers for addition. It will be perceived that both of these adding cams 371 and 372 are simultaneously disabled by either one of the total shafts 426 or 427. One of them is disabled in order to allow the totalizer to take a total and the other to prevent that total from being added into the other totalizer. Where it was desired to transfer totals from one totalizer to the other, the bellcranks 431 and 432 would, of course, be operated independently.

The bell-crank 433 (Fig. 38) has its roller 450 in position to depress the coupler 402, which when depressed enables the cam 373 to time the upper totalizers for a total taking operation as hereinbefore described. The mechanism just above described, including the two shafts 426 and 427 and the means whereby said shafts when rocked change the timing of the machine, are fully described and explained in the Lasker and Mueller patent.

In this machine a total taking operation comprises two cycles, namely, a blank or preparatory cycle and a total taking cycle; and a grand total operation comprises three cycles, namely, a blank cycle, a total taking cycle and a grand total taking cycle. These two or three cycles are controlled by a total control unit 451 mounted (Fig. 2) on the right-hand main frame member of the base section 100 of the machine. This control unit is fully described and claimed in the Lasker and Mueller patent. It resembles generally the total control unit which has been in use in Powers tabulators for a number of years. Fig. 22 is a horizontal section of the main parts of this unit, said section being taken through the axes of the two cam assemblies, namely, the total cam assembly 452 and grand total cam assembly 453. The stationary boxlike frame member 454 of this unit has secured therein two stationary bearing sleeves, one 455 for the grand total assembly and the other 456 for the total assembly. Journaled on the right-hand end of the latter sleeve is a worm wheel 457 driven by a vertical worm shaft 458, which is journaled in a depending tubular part 460 (Fig. 2) of the frame, and which at its lower end carries a worm wheel 461 driven by the worm shaft 104. The gear ratio is such that the worm wheel 457 makes one rotation to two rotations of the drive shafts 112, 184 and 185. Journaled inside of the bearing sleeve 456 is a shaft 462 having integral therewith a grooved wheel 463 having a clutch tooth adapted when the shaft 462 is slid to the left in Fig. 22 to clutch said wheel with the worm wheel 457 to cause the shaft to make one complete rotation at the end of which it is released. The total cam assembly 452 comprises a sleeve 464 journaled on the outside of the bearing sleeve 456 and having fast thereon a series of cams which will presently be described. The outer one of these cams 473 carries a leftwardly directed pin 465 (Fig. 44) which projects loosely into a block 466 fast on the shaft 462. The construction is such as to permit said shaft to move lengthwise in order to clutch it to and unclutch it from the worm wheel 457, but to cause the cam assembly to rotate with the shaft. In short, it amounts to a spline.

The second bearing sleeve 455 (Fig. 22) has journaled on its right-hand end a worm wheel 468 also driven by the worm shaft 458 but so proportioned as to make one rotation to three rotations of the drive shafts of the machine. Journaled in said sleeve is a shaft 470 having on its outer end a grooved disc 471 acting as a clutch member in the same way as the disc 463, said shaft having a block 472 mounted on its end and splined by a pin 469 to the grand total cam assembly 453. The latter comprises a sleeve 474 journaled on the bearing sleeve 455 and carrying the several cams needed for controlling a grand total operation, as will be presently described.

Means are provided whereby when the total bail bar 423 and its shaft 425 are rocked by a change of group designation, certain devices will be tripped which will release the wheel 463 and shaft 462 to be slid leftward by a spring. Also means are provided whereby a rocking of the grand total bail 424 and its shaft 429 by a change of grand group designation will similarly trip the wheel 471 and shaft 470 and permit the grand total cam to make a rotation. This tripping means is fully described in the Lasker and Mueller patent. The one actually used in the specific machine shown in the drawings is identical with that which has been in use in Powers machines for a number of years. It is partially shown in Figs. 22, 45, 46, and 47. Arms 922 and 923 fast respectively on shafts 425 and 429, are articulated with arms 940 and 941 whose hubs are journaled on posts mounted on a frame plate 942 secured to the front face of the unit 451, so that a rocking of one of said shafts will rock its associate arm 940 and 941 clockwise in Fig. 47. Fast on the hub of the arm 940 is a latch 943 engaging an ear of a lever 944 pivoted at 945 to the frame plate 942. An offset in a slot 946 in said lever serves normally to hold up a pin 947 on a horizontal arm 948 fast on a rock shaft 950 which (Fig. 22) is journaled in the frame 454 of the total control unit. This shaft extends about halfway across said unit and has fast on it arms 951 carrying pins lying in the peripheral groove of the wheel 463. The shaft 950 is urged counter-clockwise (Fig. 47) by a spring 952 acting on an upright arm 953 fast on the shaft. When the shaft 425 is rocked, the latch 943 releases the arm 944 which yields to the pressure of the pin 947 and permits the shaft 950 to rock, its arms 951 sliding wheel 463 and shaft 462 leftward (Fig. 22), closing the clutch and initiating a total taking operation.

The grand total sleeve is set into action in much the same way. Its wheel 471 is engaged by pins on arms 954 fast on a rock shaft 955 co-axial with shaft 950 and projecting through the rear wall of the frame 454, where it has fast on it an arm 956 (Fig. 46) articulated at 957 with an arm 958 fast on a rock shaft 960. The latter extends through the frame 454 and has fast on its front end an arm 961 (Fig. 47), acted on by a spring 962 tending to rock it clockwise. Such motion is transmitted through arms 958 and 957 to rock shaft 955 counter-clockwise and engages the clutch to initiate a grand total operation. The arm 961 has a pin normally engaging a shoulder on a retaining lever 963 which is normally held by a latch 964 fast on the hub of the arm 941. When the shaft 429 is rocked, the latch 964 is released, permitting lever 963 to yield and the clutch to be closed.

In order to prevent both clutches from being closed at the same time, the spring 962 is made stronger than the spring 952. An arm 965 fast on shaft 960 has pivoted thereto a link 966 having a slot 967 engaged by a pin 968 on the arm 953. Said pin normally stands at a certain distance from the left-hand end of the slot such that a rocking of either shaft 950 or 960 would bring the pin to the end of the slot. If both the total and grand total mechanisms are tripped at the same time, the stronger spring 962 will prevail and force the shaft 950 to remain in its normal position. As this total taking mechanism is known, it is believed that this partial description and illustration of it will suffice.

In Figs. 39–44 the cams in the total assembly and in the grand total assembly are shown in the order in which they occur, the upper pair of cams being the right-hand pair in Fig. 22. The follower levers are pivoted on fixed posts 480 and 481. The left-hand pair of cams, namely, the cams 473 of the total assembly and 474 of the grand total assembly, control the card feed and card stop. Each of the cams 473 and 474 has a concentric high part occupying all of its periphery except a short depression at a point normally engaged by follower rollers 475 on levers 478 and 482. The follower lever 482 of the grand total set overlies a pin on the lever 478 of the sub-total set, so that when either shaft is set into rotation the lever 482 is immediately rocked clockwise and is held in that position until the end of the total taking or grand total taking operation. Said lever operates a push link 483 which (Fig. 11) extends into the base of the machine, where it rocks counter-clockwise a bell-crank 484 connected by a horizontal link 485 with an arm 486 fast on a transverse rock shaft 487, which at its left-hand end has fast thereon a hook 488 adapted when the shaft 487 is rocked by the cam 473 or 474, to drop into a notch in the link 116 which is part of the mechanism for operating the card picker. At that part of the cycle the card picker is in its forward position shown in Fig. 11 and these cams lock it there and retain it throughout the total or grand total taking operation so that, during that time, no cards are fed from the hopper. Also a link 490 connects the horizontal arm of the bell-crank 484 with an arm 491 fast on the rock shaft 124, which controls the card stop 122, rocking this shaft clockwise in Fig. 11 (counter-clockwise in Fig. 17) and holding the card stop closed through the two or three cycles of the operation.

The cams 491 of the total assembly and 492 of the grand total assembly (Fig. 40) are the total cams. These actuate follower levers 493 and 494, respectively, the latter also actuating the former which is connected by a link 495 (Fig. 51) with one of a pair of arms 496 pivoted on a stud fast on to the right-hand main frame piece 180, said arms being connected together by a sleeve 499 (Fig. 5) and the second arm being connected by a link 497 to a three-armed lever 498 pivoted on a stud 500. Said three-armed lever is connected by a link 501 to an arm depending from the total shaft 426, so as to rock the latter counter-clockwise in Fig. 51. Cam 491 has a low concentric part and a high concentric part connected by inclines and is so designed as to rock the lever 493 to pull the total shaft in the latter part of the blank cycle and to maintain it pulled substantially throughout the second or total taking cycle. The cam 492 also consists of two concentric parts connected by inclines and so designed as to pull the total shaft for the second of the three cycles determined by the grand total unit, leaving said shaft in its normal position throughout most of the blank stroke and throughout the third or grand total stroke.

The grand total cam 502 (Fig. 41) of the grand total assembly controls a follower lever 503, which, in turn, rocks a lever 504 to pull down on a link 505 which (Fig. 54) rocks a pair of parallel arms 506 fast on a sleeve 509 (Fig. 5) pivoted on a stud on the right-hand main frame. The other arm of the pair pulls a link 507 which rocks a three-armed lever 508 on the stud 500, said lever 508 being connected by a link 510 with an arm depending from the grand total shaft 427 so as to rock said shaft counter-clockwise. The cam 502 is so designed as to pull the grand total shaft in the latter part of the second or total cycle and to hold it pulled until the latter part of the grand total cycle. There is, of course, no corresponding cam in the total cam assembly.

It is to be understood, of course, that the pulling of the total shaft 426 results in the taking of totals from the lower tier of totalizers and the pulling of grand total shaft 427 results in the taking of totals from the upper tier of totalizers as hereinbefore described.

Credit balance

Means herein called the credit balance mechanism are provided for automatically setting to subtract condition any totalizer which at the time of taking totals registers a negative balance. This function is performed under control of the second pair of cams in the total control unit (Fig. 43) namely, the cam 511 in the total assembly and the cam 512 in the grand total assembly. The former actuates a follower lever 513 and the latter a follower lever 514, which, in turn, also rocks the lever 513. These cams are both so designed as to rock their respective levers immediately after the cam assembly begins to rotate and to hold them in rocked position until near the end of the total taking operation. The rocking of these levers results in the pulling of a link 515 which (Fig. 53) rocks a bell-crank 516 which is pivoted on a stud, and which operates a push link 517, which, in turn, rocks a pair of arms 518 fast on a common sleeve pivoted in a stud 519, and pulls a link 520 pivoted to an arm fast on a rock shaft 521 just above and parallel with the pivot rod 350 hereinbefore described. The construction is such that the shaft 521 is rocked clockwise at the beginning of every total or grand total operation, and is maintained so rocked until about the end of the operation. Means are provided whereby in case any individual totalizer registers a negative total the rocking of this shaft will set that particular totalizer for subtraction.

The means for detecting the presence of a negative balance is fully described and explained in the Lasher and Mueller patent. A brief explanation of it is as follows (Fig. 14). As hereinbefore explained and as best shown in Fig. 24, each register wheel is mounted on the rear end of a rock lever 275, there being two of these levers in each denomination. These two levers in the denomination of lowest order, that is to say, the two which carry the units register wheels, are slightly modified in shape so that each one of them has fast thereon a pin 522 (Fig. 14) projecting to the right beyond the plane of the right-hand auxiliary frame plates 265. Pivoted at 523 on the hight-hand stationary frame plate 256 of the totalizer is a three-armed lever 524 adapted to be rocked to two alternative positions by the pins 522 and to be retained in these two positions by a notched detent plate 525 pivoted at its lower end of the plate 256. In Fig. 14 the lever 524 of the upper totalizer is shown in position to signify a negative total and that in the lower totalizer in position to signify a positive total. The lever 524 has at its upper end a horizontal finger 526 which stands just above the path normally followed by the upper pin 522 as the totalizer is moved into and out of engagement with the racks. The lower end of the lever 524 stands similarly just above the horizontal path of the lower pin 522. In Fig. 14 the upper totalizer is set for addition and it contains a negative total as shown by the position of the lever 524. If now a number is added large enough to change the total to positive, the operation is as follows: The lower totalizer wheels are moved rearward into mesh wtih the racks and the pins 522 move with them, carrying the upper pin just beyond the end of the finger 526. When the total passes through zero the fugitive one mechanism causes a transfer to the units wheels, the levers 275 and pins 522 moving upward, bringing the upper pin just behind the end of the finger 526. When the totalizer is withdrawn from engagement, the forward motion of the pin will swing the lever 524 counter-clockwise to signify a positive total. The lower pin 522 also moves forward, but it is too far to the rear to affect the lever 524. When at another time a subtracted number changes the sign of the total to negative, the operation is similar, but at that time the upper register wheels and the upper pin 522 occupy their rear positions and the lower wheels and pin their forward positions. When now the transfer occurs the lower pin 522 moves up just back of the lower end of lever 524. The upper pin also moves up, but is too far rearward to affect said lever. When now the totalizer is pulled forward out of engagement, the lower pin 522 will swing the lever 524 clockwise to signify a negative total. The parts described operate in the same way in the lower totalizers. The construction is such that whenever a totalizer contains a positive total its lever 524 will stand as shown on the lower totalizer in Fig. 14 and whenever it contains a negative total said lever will stand as shown on the upper totalizer.

Pivoted to the lower end of the lever 524 of each upper totalizer is a link 527 extending forward, where it is pivoted to a guide link 528, which is pivoted on the stud 327 hereinbefore described. Also pivoted to the link 528 is another link 530 which at its forward end is pivoted to a link 531, the lower end of which is pivoted to the arm 357, which controls addition and subtraction in the upper totalizer, (see Fig. 30, where the upper totalizer mechanism is shown separately from that for the lower totalizer which latter is shown in Fig. 31). The forward end of the link 530 is made with a square corner which, when the upper totalizer shows a negative total, as in Fig. 14, stands just beneath a pin 532 projecting from an arm 533 fast on the rock shaft 521; but when the upper totalizer registers a positive total, the end of the link 530 is out of the path of this pin 532. As has been explained hereinbefore, shaft 521 is rocked clockwise at the very beginning of every total and grand total taking operation. If any upper totalizer shows a negative total at the time, the pin 532 will depress the links 530 and 531 and the lever 357, which as hereinbefore explained, will set the mechanism for operation negatively. The totalizer under consideration will, therefore, be set for subtraction during the blank stroke. It is mainly in order to make this setting that the blank stroke is provided. The cams in the total control unit hold the shaft 521 in operated position and maintain this particular totalizer in subtract position throughout the grand total taking operation and so that the negative total will be printed as hereinbefore explained.

The lever 524, the link 527, and guide link 528 in the lower totalizer are all identical with those in the upper totalizer. However, to the said guide link 528 there is pivoted another link 529 more clearly shown in Fig. 31, said link being pivoted to the lower end of a two-armed lever 539, which is pivoted at its middle to the lever 358, which controls subtraction in the lower totalizers. The upper end of this lever 539 stands in the position shown in Figs. 14 and 31, when the lower totalizer shows a positive total, that is to say, the squared upper end is just forward of the pin 532, which pin is long enough to act on this lever as well as on the link 530 above described. When the total becomes negative, clockwise rocking of the lever 524 pushes the links 527 and 529 forward and rocks the lever 539 to a position where its end stands beneath the pin 532. If it stands in that position at the time of a total taking operation, the rocking of the shaft 521 will push the lever 539 downward, rocking the lever 358 downward and setting that particular lower totalizer for subtraction so as to print the negative total registered on it. If a grand total be taken with the parts in the positions shown in Fig. 14, the lower totalizer will print a positive total and the upper totalizer a negative grand total.

The mechanism just above described works on the same general plan as the corresponding mechanism described and claimed in the Lasker and Mueller patent, but the controlling means have been simplified from the mechanism of that patent. In that patent, the rod 350 and rock shaft 521 were associated solely with the upper tier of totalizers, and there was beneath them a similar pair of shafts, namely, a pivot rod for pretty much the same purpose as the rod 350 and a credit balance shaft operated like the shaft 521. This lower rock shaft was operatively connected with the shaft 521 by linkage so that the two shafts rocked in unison. The lower totalizers were controlled solely from this lower pair of shafts. In the present machine, said lower pair has been removed entirely and the mechanism for controlling the lower totalizers has been carried upward to the shaft 521 and the devices mounted on the rod 350 as hereinbefore described. The means for controlling subtraction or credit items has also been simplified and improved. The claims on this mechanism in the present application cover the distinctions between the mechanism above described and that of the Lasker and Mueller patent.

*"Slam bail" or holding pawl mechanism*

The third pair of cams in the total control unit, (Fig. 42) act on the so-called "slam bail" or "holding pawl" mechanism. They include a cam 535 in the total assembly and a cam 536 in the grand total assembly, the former rocking a follower lever 537 and the latter a follower lever 538 which when rocked also rocks the lever 537. This lever 537 pulls a link 540 which (Fig. 52) rocks one arm of an assembly consisting of parallel arms 541 (Fig. 5) fast on a sleeve 539 which is journaled on a stud, the other arm of which assembly pulls a link 542 which rocks a bell-crank 543 pivoted on the stud 500. This bell-crank pulls a link 544 to rock an arm depending from the slam bail shaft 545. This is a shaft similar to the total shaft 426 and grand total shaft 427 being mounted a little in front of the former. This same shaft is also sometimes rocked by other means and the mechanism associated with it will now be described.

Figure 20:
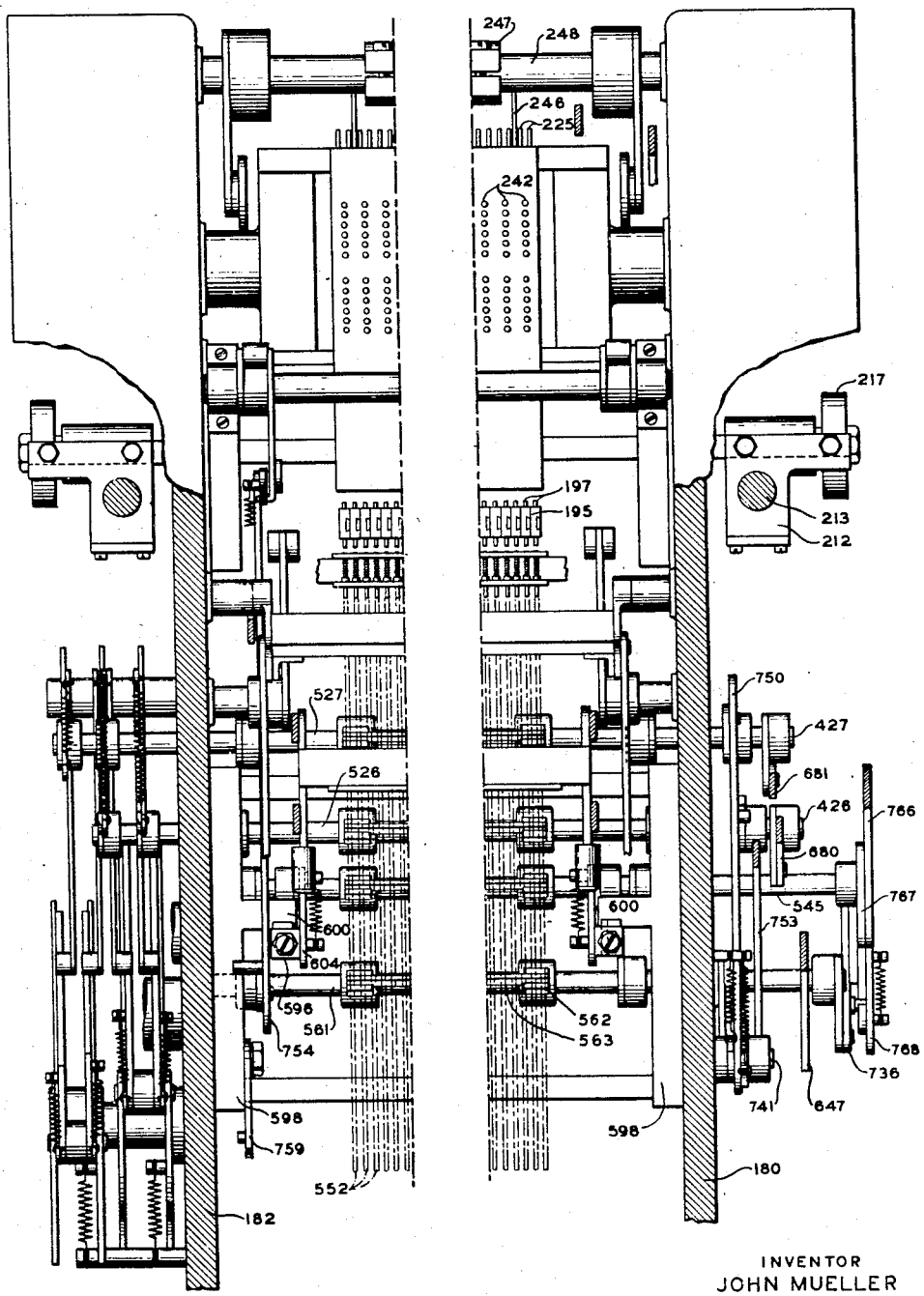
Fig. 20 is a horizontal plan view, in section on the line 20—20 of Fig. 6.

The "slam bail" mechanism of the machine consists essentially of a series of pawls 546 (Fig. 12) and mechanism for controlling them. There is one of these pawls for each type and rack bar 195 and they cooperate with the rack teeth 198 pawl and ratchet fashion so that when one of them is engaged as shown in Fig. 12, it will permit downward motion of the rack bar, but will not permit upward motion of it. The pawls are pivoted on rods 547 carried by pivot blocks 548 set in a groove in a transverse bar 550. Each of the pawls has at its upper end a tension spring 551 connecting it with a control bar 552 in such fashion as to draw the upper arm of the pawl into contact with the end of the control bar. Said bars are supported for fore and aft sliding movement in a rear comb plate 553 and a forward comb plate 554, the former mounted on a fixed transverse frame bar 555 and the latter on a fixed transverse frame bar 556. Each control bar 552 is drawn rearward by a spring 557 connected to its projecting forward end. When this spring is free to act, it forces the control bar rearward and said bar at its rear end rocks the slam bail pawl 546 clockwise out of engagement with the teeth 198, leaving the rack bar 195 free to rise if otherwise permitted to do so. Various ways are provided for moving this control bar 552 so as to provide various modes of operation and functions in the machine. Each of said bars has pivoted thereto at its forward end a hand-operated latch 558, which can be yieldingly held in either of its two positions by a spring-pressed detent 560. In Fig. 12, this latch is shown in its latched position, but the bar 552 is also held forward by other means. The operator of the machine has pulled the control bar to its forward position and fastened it there by hooking the latch 558 over the upper edge of the comb plate 554. This places the slam bail pawl permanently into engagement with the uppermost tooth of its rack bar 195 and prevents any rising of this rack bar. There is a fourth rock shaft 561 similar to the shafts 426, 427, and 545 and situated in front of the latter and called the designation rock shaft. Its connections will be explained hereinafter. As shown in Figs. 12, 20, and 23, each of these four rock shafts has mounted thereon several arms 562 carrying between them a transverse blade 563, the upper edge of which is just below the series of control bars 552.

On each control bar 552 there are pivoted at 564 three connectors, 565, 566, and 567. The connectors 565 and 566 are each hand-settable to an active and an inactive position, being retained by any suitable spring detent 568. In Fig. 12, the bar 552 is shown held in its active (type bar locking) position by the shaft 561, which is in its rocked (counter-clockwise) position, through coupler 567. If latch 558 were released, then the type bar shown would rise only on cycles in which the shaft 561 was rocked clockwise. This connector 567 is drawn clockwise about its pivot by a spring 570, and is controlled by a differential detent 571 pivoted to the bar 552. This detent has three V-shaped notches 572 at different distances from its pivot, said notches cooperating with a V-nose on the connector. By rocking the detent clockwise by hand, the second notch would be turned to said nose, and the spring 570 would turn the connector 567 to its neutral position, free of plate 563 of shaft 561. If the detent be turned still further, said spring will drawn the nose into the third notch, rocking the connector to a position where its rear end is in position to be operated by the flange 563 of the slam bail shaft 545. Connector 566 is shown active, so as to be operated by the total shaft 426. It can be made inactive by rocking it counter-clockwise. Connector 565, shown inactive, can be rocked clockwise to active position where it places the bar 552 under control of the grand total shaft 427. It will be seen that by the settings of the three connectors the bar 552 and pawl 546 may be placed at will under control of any one or more of the shafts 427, 426, 545 and 561, or freed from all of them. The connectors 565 and 566 and the detent 571 are shown with holes 573, into which a tool consisting of a wire with a suitably bent end can be inserted for conveniently manipulating them. In setting up the machine for a particular run of cards, each differential bar 195 may be controlled as desired by suitable settings of its associate couplers. The latch 558 is, of course, set active only when it is desired to put a bar out of use entirely for the time being. In every unit in which totals are being accumulated and printed the connectors 567 will be set so as to cooperate with the slam bail shaft 545 (Fig. 74). The operation of that shaft will be understood from a consideration of Fig. 42. It is pulled by the slam bail cams 535 of the total cam assembly and 536 of the grand total cam assembly. The cam 535 has such an outline as to leave the slam bail shaft 545 normally in the position shown in Fig. 12, but, when a total operation is initiated, the cam immediately rocks the lever 537 and pulls the slam bail shaft, that is to say, it rocks said shaft counter-clockwise in Fig. 12, throwing the pawls 546 into engagement and preventing the bars 195 from rising. This condition continues throughout the blank stroke so that nothing is printed in computing fields during that stroke. The cam then permits the lever to return to its normal position so that the bars 195 can rise during the first half of the total stroke, at which time the register wheels are in engagement with the racks. At about mid cycle the register wheels are withdrawn from engagement with the racks, and, unless means are taken to prevent it, all of the said racks would jump or slam to their uppermost positions. Just prior to the withdrawal of the register wheels, the cam 535 again pulls the slam bail shaft 545 and throws the pawls 546 into engagement where they remain until near the end of the cycle. As explained above, these pawls permit downward motion of the racks, but do not permit upward movement of them and they thus prevent the slamming action referred to.

The cam 536 of the grand total assembly has three high parts for pulling the slam bail shaft 545, namely, it pulls said shaft during the blank stroke, then allows it to return to normal position during the first half of the total stroke, pulls it again in the middle of the total stroke to prevent the slamming action of the racks, releases it again during the first half of the grand total stroke to permit the racks again to rise and is again pulled for the last half of the grand total stroke so as to prevent the slamming action of the type bars.

The sixth pair of cams in the total and grand total cam assemblies of the total control unit (Fig. 39), namely, the cam 580 in the sub total assembly and 581 in the grand total assembly, control, respectively, follower levers 582 and 583 in such a way as to throw out the clutches, which had set the cam assemblies into operation and thus to bring the total taking operation or the grand total operation to an end, at the end of the second or third cycle. The mechanism by which this is done is, or may be, identical with that which has been in use in the Powers machine for a number of years. For this reason and because the details of this mechanism form no part of the present invention, it is not deemed necessary to illustrate this mechanism and to describe it in detail. It is shown and described in detail in the Lasker and Mueller patent.

The slam bail mechanism as thus far described, including the control of it by the total control unit through the slam bail shaft 545, is substantially identical with that described in the Lasker and Mueller patent except for a slight change in the shape of the pawls 546, the occasion for which will presently be described.

Aligning device

In order to improve the alignment of the printed totals, the following mechanism is provided which mechanism is not in the machine described in the Lasker and Mueller patent. When type bars rise in item printing operation, they are arrested by the stops 225 with a sufficient degree of accuracy to give good alignment, but when taking a total the bars are arrested by the transfer pawls of the totalizer (Fig. 24). These pawls 284 and 288 must, when the register wheels are brought, by process of addition or subtraction, to register zero, drop down readily and with certainty behind the transfer teeth 285 or 290, and there is, therefore, usually a certain amount of lost motion between the transfer pawl and this tooth when they are used to arrest the upward motion of the type bar in total taking. Also, the teeth of the rack bar and of the register wheel have inclined edges and, unless they are brought into engagement exactly on the pitch line, there is likely to be lost motion at that point. It requires very fine adjustment to get these several sources of lost motion so that they are uniform. When printing totals, therefore, one type bar is likely to go a little higher than another and the numerals may not be in as good alignment as is desirable.

In the Lasker and Mueller patent, the pawls 546 (Fig. 12) were pivoted on a fixed cross bar. In the present machine the cross bar 550 is capable of a slight up and down movement. As shown in Fig. 6, the ends of the bar 550 are rigidly secured to upright bars 585, each of which at its upper end is guided by a substantially horizontal guide arm 586 pivoted to frame member 180 or 182.

The lower end of each bar 585 is pivoted at 587 to a stiff lever 588 of the first order pivoted at 590 in such fashion that the rear arm of the lever 588 is parallel with and about equal to the arm 586. By rocking these levers 588 the bar 550 can be moved a short distance up and down and to this end each of said levers is prolonged toward the front of the machine where it carries a follower roller 591 adapted to be operated by a cam 592 fast on the drive shaft 185. It will be recalled that in a total or grand total cycle, the slam bail pawls are out of engagement during the time when the rack bars are rising and at a suitable time are thrown into engagement by the rocking of slam bail shaft 545 and that they remain in engagement during the downward motion of the racks in the second half cycle. The cam 592 comprises a low concentric dwell and a high concentric dwell connected by inclines.

In order to fix accurately the position to which the bar 550 is depressed, the front end of each lever 588 is made as a separate piece carrying the roller 591 and pivoted to the main body of the lever at 593. At the rear of the pivot 593 said piece has an ear 594 formed off therefrom and through which is threaded an adjusting screw 595 contacting with the upper edge of the main section of the lever 588. With the roller 591 resting on the high part of the cam 592, the exact position of the bar 550 can be adjusted with precision by turning this screw.

It is preferred that the bar 550 shall not go through the slight reciprocation described, but shall remain stationary in its normal low position during item tabulating cycles of the machine. To this end, there is pivoted to each of the levers 588 a link 596, in the nature of a hook adapted to be hooked over a fixed part of the machine, to hold the front arm of the lever in its upper position. The transverse frame bar 556 hereinbefore described and another similar frame bar 597 are supported on two frame bars 598, each bolted to the inner face of one of the frame members 180, 182. As best shown in Fig. 20, each of these frame bars has a lug 600 projecting inward therefrom, and it is over this lug that the hook link 596 is caught, as best shown in Fig. 3. In order to secure a fine adjustment, the link 596 is made in two parts connected together by clamp screws passing through slots in one of said parts and screwed into the other. In Fig. 23, the main body of the link is marked 596 and the adjustable section of it 601 and the exact relative position of these two sections can be regulated by an adjusting screw 602. As will be understood from Fig. 23, the hook-like shoulder 603 (Fig. 3) by which this link hooks over the lug 600 is on this adjustable member 601. The normal position of the bar 500 in tabulating cycles can be regulated by turning these two screws 602. It will be noted that Figs. 3 and 6 show the parts in a tabulating cycle with the hook link 596 caught over the lugs 600 and the follower rollers 591 held up out of contact with the low parts of the cams 592. The engagement of the hooks 596 is controlled by the slam bail shaft 545, arms on which have links 604 pivoted thereto and connected with said hooks by pin and slot and spring. When the shaft 545 is pulled counter-clockwise (Figs. 3 and 6) the hooks are released. The mode of operation of the aligning mechanism just described, will be understood by reference to the timing chart (Figs. 88 and 89). During item cycles, the slam bail pawl-carrying bar 550 is held in its depressed position by the hooks 596. On a total or grand total operation, the slam bail shaft 546 is pulled quite early in the blank cycle, and the links 604 trip off the hooks 596, permitting the follower rollers 591 to drop down into contact with cams 592, where they remain throughout the two or three cycles of the operation. As shown on the timing diagram, these cams have a rise from about 108° to about 158° of the cycle, a high dwell from 158° to 180°, and a downward incline from 180° to 360°. The rise and fall of the followers 591 during the blank cycle, are idle movements. During the period from 158 to 180°, when the rollers are on the high parts of the cams, the slam bail shaft is still pulled, so that the hooks 596 do not re-latch. At the beginning of the total cycle, the slam bail pawls are out of engagement with the racks and the bar 550 is in its highest position (rolls 591 on low dwells of cams 592). The type bars rising reach their 9 positions at about 86° and their Z positions at about 136°, the restoring bar 210 reaching its highest point at about 158°. The slam bail cams 535 and 536 (Fig. 42) of the total control unit have been changed to pull the shaft in the total and grand total cycles earlier than in the Lasker and Mueller patent, the pawls 546 being now fully engaged with the racks at about 108°, which is permissible because in these cycles the type bars used for printing totals never rise above their 9 positions. At about that time, the cams 592 begin to move the pawls downward to their depressed and correct positions, where they are standing at 170° when the printing hammers fired. In the total cycle, the followers 591 begin to run down their cams before the slam-bail shaft returns to normal, so that the hooks 596 do not latch. After the hammers are fired and the totalizers are withdrawn, the slam bail pawls remain in engagement to prevent the slamming of the type bars. They are withdrawn when the follower 537 drops to the low part of the cam 535 toward the end of the cycle (Fig. 42).

To recapitulate the timing, at the beginning of the total stroke the bar 550 is in its high position, with the pawls out of engagement with the racks. After the latter have risen to their nine positions, said pawls are moved into engagement, being fully engaged at about 108°, when the bar 550 begins to move downward, reaching its lowest position before 170°, when the printing hammers act. From 180° to 360°, the bar is rising; and, when the slam bail shaft is reset to normal and releases its control of the hooks 596, it is in a high position. In the next cycle, it again moves down and said hooks move up and snap over the lugs 600, holding the bar stationary in a low position until the next total taking, unless said next cycle is a grand total cycle. In that event, the slam bail shaft is again operated, preventing the hooks from re-engaging, and the bar 550 goes through the same movements as on the total cycle.

In the course of a total taking operation, the aligning pawls 546 first move up, then move into engagement with the teeth of the type bars and then move down to align the type bars.

In order to leave the bars 195 free to rise during total taking cycles, the stops 225 (Fig. 16) are locked in inactive position. It will be recalled that they are retracted by the rocking of the two shafts 248 at the rear of the stop section of the machine, which shafts are rocked by links connected to two follower bell-cranks 252 (Figs. 3 and 6), one at each side of the machine. As shown in Figs. 3, 51, and 54, each of the levers 498 and 508, which are rocked respectively by the total and grand total cams in the total control unit, has a third arm connected by pin and slot with one of two links 605, both of which links are pivoted to a bell-crank 606, which by link 607 operates a latch 608 in the form of a bell-crank adapted to engage over a pin 610 on the bell-crank 252.

On the left-hand side of the machine (Fig. 6) the total and grand total shafts have depending arms connected by links with levers 611 which are connected by links 612 with a bell-crank 613 connected to a second latch 614 for the left-hand bell-crank 252. The construction is such that, when either a total shaft or a grand total shaft is pulled the bell-cranks 252 are locked in their depressed positions, holding the stops 225 retracted throughout the cycle. This mechanism is the same as in the Lasker and Mueller patent.

*Printing hammer mechanism*

The printing hammer section per se of the machine, that is to say, the devices immediately associated with the hammers and controlling their operation, has been changed entirely from the construction shown in the Lasker and Mueller patent. In front of the platen 208 is a stationary cross bar 615 (Fig. 12) having its ends secured detachably to the main frame members 180 and 182. Two plates 616 carried by this bar have mounted therein spring restored firing pins 617, each in direct alignment with that one of the types 197 which is at printing position at the time.

A second cross bar 618 just below the bar 615, is also detachably secured to the main frame members and it has the type hammers 620 pivoted thereto. Preferably these hammers are pivoted in a succession of pivot blocks 621 which may conveniently be of a length to support ten hammers each, each block being slotted and having a pivot rod 622 inserted therein, as shown in Fig. 12. A succession of these blocks are secured to the underside of the bar 618, and extending across the machine so as to furnish a full complement of type hammers.

The hammer firing mechanism is supported by a third cross frame bar 623, also detachably secured at its ends to the frame members 180 and 182. Secured to the rear face of the bar 623 is a series of comb pivot blocks 624 similar to the blocks 621, having pivot rods 625 for a succession of hammer latches 626. A common spring 627 acts to throw the type hammer against the firing pin 617 and also to retain the latch 626 in latching position. To each of said latches there is pivoted a release link 628 lying horizontally and urged to turn clockwise about its pivot by a spring 630. Forward of its pivot each releasing link has a shoulder 631 adapted to be moved by the spring 630 into the path of movement of a flange 632 projecting downward from a transverse releasing bar or universal print bar 633, which at a suitable time is reciprocated rearward and back so as to actuate any of the links 628 that may be in engagement with the flange 632. This bar 633, as shown in Figs. 3 and 6 is secured at each end to a plate or bar 634 extending front and back of the machine and supported by two vertical parallel links 635 hung from two brackets 636, one projecting forward and the other rearward from the frame bar 623. One of the links 635 is prolonged upward and connected with a restoring spring 637 to hold the bar normally in its forward position. These plates 634 support a rod 659 to limit the downward movements of the links 628.

In order to operate the hammer mechanism, a rock shaft 640 journalled at its ends in the main frame pieces 180 and 182, is rocked by cams on the drive shaft 185 as shown in Figs. 2 and 23. A follower lever 641 pivoted at 642 to the outside face of the frame member 180, has a cutout to embrace the projecting end of the shaft 185 and it carries two follower rollers, namely, a roller 643 engaging the underside of a cam 644, to depress the lever 641 and a second follower roller 645, engaging another cam 646 to restore said lever. This lever 641 is connected by a link 647 with an arm 648 fast on the end of the shaft 640. The construction is such that said shaft 640 is rocked counter-clockwise and back in the mid-part of each cycle of the machine.

Each of the bars 634 which carry the releasing bar, 633, has its forward end made into a sort of anvil 650 (see Figs. 6 and 23), which is struck by the end of a screw 651 adjustably mounted in an arm 652 fast on the rock shaft 640. By this means the releasing bar 633 is given a short movement toward the rear of the machine at the proper time, and it is immediately returned by its springs 637.

The type hammers 620 are restored after firing by a bail bar 653 mounted at its ends on arms 654 pivoted to the frame members 180 and 182 (Figs. 3 and 6). At each end of the machine, as best shown in Fig. 3, the rock shaft 640 has fast thereon an arm 655 connected by a link 656 with the bail arm 654 so that the bail 653 is normally held nearly in its forward position with the type hammers retracted, but, when the shaft 640 is rocked, it swings clockwise out of the way and then back to restore any operated hammers.

The release links 628 are controlled in part from the type bars 195, as shown in Fig. 12. The frame bar 555 has a succession of pivot blocks 657 secured thereto and in which, at 658, are pivoted a succession of levers 660, each of which has its rear end normally held down by a shoulder consisting of the lower end of the upper section 196 of the type bar. This lever is free to rock counter-clockwise a limited distance whenever its associated type bar rises. The forward end of the lever is connected with a forked push link 661 whose upper end engages a pin on the rear arm of the associate release link 628 and holds the link with its shoulder 631 out of the path of the flange 632 so that, unless the type bar rises, this release link will not be operated by the releasing bar 633.

Figure 9:
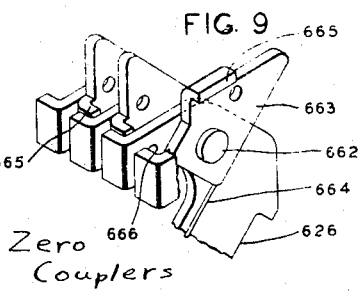
Fig. 9 is a detail isometric view of the zero couplers.

The latches 626 are equipped with settable connectors 663 for the printing of significant zeros. In Fig. 9, the two connectors at the left are set active and the one at the right has been turned about its pivot 662 to inactive position. This member is yieldingly held in either of said positions by a detent spring 664. When one of these connectors is in its active position an ear 665 thereon stands just behind an ear 666 formed off from the next latch to the right of it so that, if one latch is operated by the firing bar 633, its motion will be communicated to those at the right of it as far as these connectors are set in active position. This connection may be split at any point by turning one of them to inactive position where its ear 665 is out of engagement with the ear 666 of the next latch. As the topmost, or zero type stands normally at printing position, it can be printed only by the action of the connectors 663. For this reason, when numbers occur in the text to be printed, the letter "O" is punched in the card in place of a zero.

In order to prevent printing under certain conditions, such, for example, as in non-list tabulating, where it is desired to print only totals and not items, a non-print shaft 667 is journaled in the frame members 180, 182 above the hammer mechanism. This shaft may be rocked to two positions, namely, clockwise to a non-print position shown in Fig. 12 and counter-clockwise to a printing position shown in Fig. 13. As best shown in Figs. 12, 3, and 6, this shaft 667 has at each side of the machine a depending arm connected by a horizontal link 668 with an arm 670 of a bail bar 671 extending across the whole set of printing devices (see Fig. 23). The arms 670 are pivoted to the brackets 636 of the frame bar 623.

Associated with each printing hammer or with its firing link 628 is a control lever 672 (Fig. 12) pivoted at 673 in a slotted pivot block secured to the front face of the stationary bar 623. Each of the levers 672 has at its lower end a pin 674 adapted to overlie the front end of the associated release link 628 so as to hold it out of engagement with flange 632 on the releasing bar 633 even though the corresponding type bar may rise and free the link from the control lever 660; but the levers 672 can be swung clockwise to the position shown in Fig. 13, where they do not affect the release links. Each of said levers has a two-armed hook 675 pivoted to its upper end and retained in either of two hand-set positions by a detent spring 676. In Figs. 12 and 13, these hooks occupy their forward position where they engage in a groove in the bar 671. All of the levers 672, that are thus connected with that bar, will prevent the action of the releasing links 628 and their associated printing hammers when said bar is in the position shown in Fig. 12, but, if the print shaft be rocked counter-clockwise (Fig. 13) bar 671 will be moved toward the rear of the machine, all of these levers will have their pins 674 moved away from the links 628 and printing will occur as hereinbefore described.

In order to make the printing or non-printing by any desired type bar independent of the non-print shaft 667 and bail 671, the hooks 675 have each a rear arm having two notches 669, either of which may be hooked over a sheet metal flange 678 secured to the top of the stationary bar 623, as shown in Fig. 56. When the forward one of these notches is thus engaged, the control lever 672 has its stud 674 set out of the way of the releasing link 628 leaving said link active, and when the other notch is so engaged said stud is set in the path of said link and renders the latter inactive, so that the hammer cannot be tripped by its own releasing link, regardless of the setting of the non-print shaft 667 and bail 671.

In order to secure the mode of operation known as non-list, that is to say, to prevent the printing of items during tabulating cycles, and to bring about printing of amounts only on total and grand total taking cycles, the shaft 67 is connected operatively with the total and grand total shafts 426 and 427, respectively, by two links 680 and 681 (Fig. 2), each pivoted at its upper end to an arm on the shaft 667 and said links at their lower ends connected respectively to arms on the total and grand-total shafts 426 and 427 by pin and slot. Thus, either of the shafts when operated may rock the non-print shaft counter-clockwise, that is to say, from its non-print to its print position.

The shaft 667 is normally held in non-print position by a suitable spring but it can, however, be hand-set and fixed in printing position as follows: At the left-hand side of the machine (Figs. 6, 23, and 58) an arm 682 projects forward from the shaft 667 and it has on its forward end a plunger 683 which can be set by hand in a withdrawn or in a projected position. When it is desired to print items, the shaft 667 may be rocked counter-clockwise by hand and the plunger projected to engage beneath a fixed lug 684 to hold it in that position (Figs. 23 and 13). This retains in ineffective position all levers 672 that are coupled to bar 671, permitting the type hammers to be fired in all positions and in all cycles in which the type bars rise.

*Changing zero set-up*

In most set-ups of the machine, some zone or several zones of the printing mechanism are used for numbers, and in these zones the zero-print connectors 663 are set active. But it is sometimes desirable to print one or more lines of text, or partial lines of text, such, for example, as the name and address of the customer, on the same paper as the ordinary data, and in that event it is needful to suppress temporarily the printing of zeros, or of some of them and to restore such printing after the text has been printed. Means are provided for doing this automatically. In the present instance and preferably it is done under card control. A special hole in a card causes the zero-print connectors, or any selected ones of such connectors, to be disabled during the cycle controlled by that card, the connectors being restored to their original setting when other cards are analyzed. This mechanism is settable by hand so as to afford a variety of modes of operation and of results.

The mechanism is shown in Figs. 56, 57 and 25-29, inclusive. As there shown, the hammer latches 626 are mounted and act the same as in Fig. 12 and are actuated by the release links 628, which, in turn, are influenced by the control levers 660 and 672, all as before. Each hammer latch has a sector shaped connector 870 pivoted to its right-hand face and a stud 871 projecting from its left-hand face. When a latch is released, its connector if in active position as shown in Fig. 27 or 28, will act on the stud 871 of the next latch to its right to release that also. Means are provided whereby any connector may be rocked about its pivot so as, at the moment of printing, to occupy any one of four positions, A, B, C, and D, illustrated respectively in Figs. 28, 27, 26, and 25, the first two being active positions in register with the stud 871 and the other two inactive positions above said stud. To this end, the connector 870 has pivoted thereto a forked control link 872, the rear branch of which terminates in a finger piece 873 by manipulation of which the coupler may be given at will a hand setting. The forward branch of said forked link has four studs 874 (extrusions in the present case). These forward branches all cooperate with a universal member 875 here shown as a long sleeve (Figs. 56 and 57) surrounding the non-print shaft 667 on which it is loosely journaled at its ends by two collars 876, and having fixed into and projecting rearward therefrom a sheet metal flange 877 having a series of slot-like holes 878, into each of which is inserted the forward branch of one of the links 872. Each hole 878 at its forward part is wide enough to allow said branch and its studs 874 to be moved up and down through the hole, but the rear end of the hole is narrowed so that if the link is moved back into it, the body of the link will be loose in the hole, but the studs will project over and under the metal. In this position with one stud above and the other below the flange, the link is in effect pivoted to the flange. The construction is such that, by manipulation of the finger piece 873, the link may be swung forward and adjusted up and down and then swung rearward into the narrow part of the hole, where the metal of the flange 877 will lie between two adjacent studs. The couplers may thus be set individually and variably as desired each to any one of three positions, A, B, or C, and some in one position and some in another. At certain times in the operation of the machine, the sleeve 875 is rocked counter-clockwise with the effect that all of the couplers will be raised one space, each from whichever one of the three positions it had been set to initially.

Preferably a scale plate 894 is attached to the member 875 to identify the letter space positions to which each link 872 pertains.

In order to provide for making the initial setting of the links 872 and maintaining them in set relation to the flange 877, each link 872 has a retaining member 880 pivoted thereto and standing behind the flange 877. A spring 881 urges this member counter-clockwise (Fig. 56) and presses its upper end against the rear edge of the forward branch of the link. The member 880 is so disposed as to provent the link 872 from swinging forward out of the narrow part of the hole, but the pressure of the spring 881 does not come on the flange 877, leaving the pivotal connection between the link and the flange a perfectly free one. When in setting the parts the operator draws the link forcibly forward into the wide part of the hole, the member 880 presses against the edge of the flange and the spring is stretched. When the operator releases the link, the spring draws it rearward into the narrow part of the slot until the upper end of the member 880 is contacted by the link.

The sleeve 875 may be rocked by hand or by any suitable automatic means, according to the needs of the work. In the present instance, and preferably, it is rocked automatically under control of a special hole in a card. The sleeve 875 has an arm 882 (Figs. 3, 53, and 56) secured to its right-hand end and connected by a link 883 to a bell-crank 884 pivoted on the stud 500. Said bell-crank is connected by a link 885 with a bell-crank 886 pivoted on a stud 887 mounted on the right-hand main frame member 180. Said bell-crank 886 has formed from its horizontal arm an ear 888 lying above a pin 890 slidable in brackets 891 attached to the upper right-hand surface of the translator frame 238, said pin operated by a Bowden wire 892. In the present instance a second Bowden wire actuated pin 893 is mounted in the same brackets in position to actuate a second bell-crank 894 controlling certain other mechanism to be described presently. The construction is such that wherever a piece of work requires the use of the automatic split print mechanism, the translator used for that job will be provided with a wire 892 arranged to be controlled by any predetermined index position of the card. When then a card having such a hole is sensed, the bell-crank 886 will be rocked, rocking the sleeve 875 as described. Each connector 870 which had been set to active position A, will be shifted to position B and still be active; each connector set to active position B will be shifted to inactive position C; and each connector set to inactive position C will be shifted to D and be still inactive for that particular cycle. When a card without the special hole is sensed, the sleeve 875 will rock back to normal position and the connectors will resume the several conditions to which they had been set by hand. In one application of the invention, there would be inserted between two groups of item cards first a total card, then one or more alphabet cards each having the special hole, and then the item cards of the new group punched to print numbers in one or more fields.

If desired, the connectors 870 may be made settable by hand to the position shown in Fig. 29, where said connectors are normally below the stud 871 and are, therefore, adapted for alphabet printing. A card containing the special hole would cause the connectors to be raised to active position for printing a number.

These machines frequently perform a total or grand total taking operation when the totalizers are clear, with the result that nothing is printed in the numerical column, but the characters at the right of that column are printed to designate the sort of operation performed. There are certain classes of work where it is desirable to eliminate this printing of characters unless a total is printed, and the described mechanism may be hand set to have that effect. To this end the hooks 675 for the character type bars are set with their rear notches 669 hooked to the flange 678, thus locking the control levers 672 in position to make the release links 628 inactive. The rising of those character type bars will then not cause the type hammers to be tripped. However, the zero printing connectors 663 or 870 are set active so that the releasing movement of the latch 626 of the units column will be transmitted to the latches in the character columns, and the characters will, therefore, be printed if any total is printed, and not otherwise. It should be remarked, however, that this setting would result in the characterizing type hammers being tripped when printing items, at which time, if the item is positive, the characterizing type bars stand at zero. If it is desired ever to use this setting, the topmost, or zero types, should be substituted by blank types in these two type bars. This would do no harm, for in printing text the card is always punched for the letter O, to represent zero.

*Paper carriage*

The paper carriage is, with an exception that will be mentioned, substantially identical with that of the Lasker and Mueller patent. Each of the main frame members 180 and 182 supports a bracket 685 (Figs. 2, 6, and 58) which brackets, in turn, support a roller bearing rail 686. The carriage comprises a transverse frame bar 687 and, secured thereto, roller bearing rails 688 so that the carriage can be moved to different positions laterally.

The platen 208 is supported in an auxiliary frame which (Fig. 6) comprises a longitudinal bar 690 and right and left end frames 691 in which the platen shaft is journaled. The auxiliary frame normally occupies a rear position shown in the drawings, but, at each printing operation, it is momentarily moved slightly toward the front of the machine to bring it within the range of the types. As best shown in Fig. 2, the main carriage bar 687 has secured thereto at each end a bracket 692 in which is journalled a cross shaft 693 (Fig. 58) which supports at each end an arm or plate 694, which is pivoted at 695 to the end plate 691 of the auxiliary frame. A lever 696 is pivoted to the end of the frame bar 687 and in its forked upper end lies a square block 697 pivoted on a pin 698 projecting from the member 691. A link 700 connects arms of these two plates or levers 694 and 696 so as to cause them to rock in unison. The construction is such that a counter-clockwise turning of the shaft 693 will result in the auxiliary carriage having a parallel motion toward the front of the machine. The construction just described is duplicated at the left-hand end of the machine. All of this is identical with the Lasker and Mueller patent, but in that patent the carriage is normally drawn rearward by springs, and, at the proper time for printing, it is positively moved forward by the power mechanism. This mode of operation is reversed in the present machine, the carriage being driven forward by two springs 701, acting on the levers 696, to rock said levers counter-clockwise. This change results not only in a better operation, but in a more flexible control of the carriage, as will appear hereinafter. The shaft 693 has set into it a longitudinal flange 702 (Figs. 3, 6, and 58), substantially the same as in the Lasker and Mueller patent. The shaft is rocked clockwise by two lever arms 703, one on each side of the machine, said arms fast on a rock shaft 704 suitably journalled in brackets 699 and each arm carrying a roller 705 pressing against the rear or under side of the flange 702, so that by rocking the levers 703 counter-clockwise, the shaft 693 will be rocked clockwise, and the carriage returned to its normal retracted position. The Lasker and Mueller patent shows a similar construction, but the roller engages the front surface of the flange 702. One or the other of the rollers 705 will coact with this flange in any position of the carriage. The left-hand lever 703 (Fig. 6) has a forwardly extending arm to which is pivoted a long pull link 709, the lower end of which is pivoted to a follower lever 706 pivoted on the same stud as the left-hand bell-crank 252. The roller 707 of this lever engages a cam 708 on the rear drive shaft 184. This cam holds the auxiliary carriage in its retracted position except that it permits a momentary forward movement thereof at the time of printing which is near mid-cycle.

In order to provide for non-printing cycles of the machine, a latch 710 is arranged to hook over an ear 711 of the left-hand arm 703, as shown in Figs. 58 and 60 to hold said arm down and the carriage retracted as long as said hook is effective. Said hook is moved to latching position by a spring 712 and various means may be provided for releasing it in order to permit printing. To this end the hook 710 is made in the form of a bell-crank to which is pivoted a link 713 (Fig. 58) connected by pin and slot 714 with an arm 715 extending rearwardly from the non-print shaft 667. Whenever this shaft is swung counterclockwise to permit the operation of such type hammers as are under its control, the link 713 will release the latch 710. Means may be provided to release it whenever any printing is desired and one other means will be described hereinafter. It includes a link 754 (Figs. 6 and 55) operated by an arm 775 on the designation shaft 561. It is sometimes desirable to lock the hook 710 out of action altogether. This may be done by any suitable hand-operated latch, such as the latch 759 pivoted on the stationary frame and adapted to be dropped down behind a pin 7591 on the link 754 to hold the latter in its rear position (Fig. 62).

The line space mechanism shown in Fig. 58 is identical with that of the Lasker and Mueller patent. The platen shaft 716 carries a ratchet 717 operated by a pawl 718 pivoted to a disc 720 pivoted loosely on the platen shaft. Said pawl is operated through a link 721, lever 722, and link 723, by an arm on a transverse rock shaft 724 having a flange 725 engaged by rollers on two arms 726 fast on a transverse rock shaft 727 journaled in the brackets 685. The shaft 724 is journaled in the brackets 692 on the carriage 687. As shown in Fig. 3, an arm at the right-hand end of the shaft 727 is operated by a push link 728 connected to a follower lever 730 whose roller 731 is operated by an eccentric cam 732 on the drive shaft 184. This cam and the train of mechanism just described oscillates the lever 722 which, when it is rocked counter-clockwise by its spring 733 pulls up on the link 721 and swings the pawl 718 in a counter-clockwise orbit around the ratchet 717. On the return stroke the link 721 first pushes the pawl into engagement with the wheel and then rocks it back clockwise, turning the platen. Suitable means not shown herein are provided to regulate the extent of platen feed, and, if desired, to prevent it altogether.

*Designation printing*

Designation printing is controlled primarily by the rock shaft 561 hereinbefore referred to (Figs. 12, 74, 75, and 76). In each designation column the coupler 567 on the bar 552 which controls the slam bail pawls, is coupled to the bar 563 of the shaft 561 as shown in Fig. 75, and in most set-ups, it is so coupled in all columns used for alphabet printing. The hook 558 is set in release position and the couplers 565 and 566 in neutral position as shown. The shaft 561 and the manner of coupling it to the slam bail pawls as just described is the same in effect as in the Lasker and Mueller patent but the means for operating the shaft and its mode of operation have been improved as will now be described.

Figure 8:
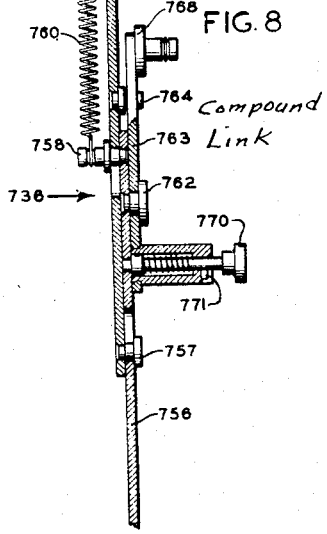
Fig. 8 is a detail view in longitudinal section, of a certain compound link.

The designation shaft 561 is rocked clockwise (to its ineffective position) by a spring 734 (Fig. 2). It is "pulled" counter-clockwise by two means, the first being a compound link 736 (Figs. 2 and 8), connecting an arm of said shaft with a follower lever 737 whose roller 738 is in position to be depressed by the print cam 644 after said cam has depressed the roller 643 to fire the type hammers. The second means for pulling the shaft 561, is from the slam bail shaft 545 through two short links 749, one at each side of the machine (Figs. 3, 6, and 52). These links are connected to the arms of one of the shafts by pin and slot so that shaft 561 cannot pull shaft 545.

When shaft 561 is pulled by the link 736, it is held in its active position by a dog 740, which may be called the locking dog, pivoted on a stud 741 and drawn into engagement by a spring 742 (Fig. 63), said dog engaging an ear 739 of an arm 735 fast on the shaft. The ear 739 is also engageable by a second dog 743, which may be called the check dog, pivoted at 741 and whose shape is best shown in Fig. 58. See also Figs. 59 and 61. This dog 743 is operated through a lever 746 pivoted by its side and connected with it by a spring 745 and limit pin 747. The parts 743 and 746 are in effect one lever except that if necessary the latter can rock counter-clockwise independently of the former by stretching the spring. This compound dog is rocked out of engagement with ear 739 by a spring 748 and into engagement by the "pulling" either of the total shaft 426 or of the grand total shaft 427, by means of a link 750 connected with an arm of one of said shafts by pin and slot 751 and with the other by an arm 752. The dog 740 is pulled out of engagement by the rocking of the non-print shaft 667 to print position by means of a link 753 (Fig. 58) connected to an arm of the shaft by pin and slot. In the non-list setting, said shaft is so rocked by the total shaft 426 and grand total shaft 427 (links 680, 681, Fig. 2). The construction is such that when the mechanism is set for non-list (shaft 667 clockwise as in Fig. 58) the dog 740 will be pulled out of engagement at every total and at every grand total cycle, and when it is set for list (shaft 661 held counter-clockwise as in Fig. 13) said dog is held fixedly out of engagement. It will be noted that there is no direct connection between the dogs 740 and 743.

In the listing set-up, it is not desirable that the cam 644 (Fig. 2) pull the designation shaft momentarily at each cycle, and for this and other reasons, means are provided to disconnect the follower lever 737 from said shaft. The link 736 is made with an upper section 755 and a lower section 756 (Fig. 8), telescopically connected together by two headed pins 757 and 758, each passing through a slot in one of said sections and riveted into the other. To the latter of said headed pins is connected one end of a spring 760, the other end of which is anchored to a pin projecting from the upper section 755 so as normally to hold the two sections in their foreshortened relation. This spring, however, is not strong enough to operate the shaft 561. Pivoted to the lower section 756 at 762 is a hook 763 normally engaging a pin 764 on the upper section of the link so as positively to lock the two sections together and cause them to act as one. This hook, however, is released whenever the non-print shaft 667 occupies its counter-clockwise or print position. Said non-print shaft has an arm 765 connected by a link 766 with a lever 767 loosely pivoted on the slam bail shaft 545. The other arm of this lever has a link 168 pivoted thereto and connected with the hook 763 by pin, slot and spring. The construction is such that when the shaft 667 is rocked counter-clockwise to its print position, the hook 763 is positively moved out of engagement with the pin 764 and when the shaft is again returned to non-print position the hook is reengaged. The spring can yield if the hook is not free to return at the moment. The construction is such that the designation shaft is never pulled by the cam 644 when the machine is set for listing, and on the non-list set-up it is not pulled in total and grand total cycles.

In some runs of cards it is desired to disconnect the shaft 561 from the follower lever 737 altogether. In that event the hook 763 can be released by hand and locked in released position by a plunger 770 slidable in a housing riveted to the lower end of the hook, said plunger being pressed by a compression spring so that its lower end may engage a hole in the lower section 756 of the link 736. This plunger 770 has the usual pin 771 which can descend into a slot when it is desired for the plunger to lock or be turned out over the top of the housing in order to hold the plunger in inactive position. In the described setting, the designation shaft 561 is never pulled counter-clockwise except by the slam bail shaft 545.

*Non-listing operation*

One use of the designation printing mechanism is in non-list tabulating where it is desired to print only totals (not items) and to print the designation of each group only from the first card of the group. In this set-up of the machine the non-print shaft 667 is normally at non-print and in each column included in a computing zone the hammer control arm 672 is coupled to the non-print bar 671, holding the release link 628 out of engagement with the releasing bar 633, as shown in Fig. 12. Numbers will, therefore, not be printed in tabulating cycles. When the total shaft 426 or grand total shaft 427 is pulled preparatory to a total or grand total cycle, the shaft 667 is pulled to print position by the link 680 or 681 (Fig. 2), freeing the release links 628 from the arms 672 and permitting the total to be printed. The first card of the new group is then in the sensing chamber and it is desired that the designation be printed from it on the first cycle following total taking.

In this setting every designating column (and, usually every alphabet column) may be set as shown in Fig. 75. The hook 675 is hooked to the flange 678 so as to hold the control lever 672 fixed inactive and the release link 628 active to cause printing if the type bar rises, irrespective of the non-print bar 671. Where the designations consist of numbers printed in a column, the connectors 663 are set active to print zeros. In alphabet columns they are set inactive.

On the slam bail pawl control bar 552, the latch 558 is released, the coupler 567 is hooked to the designation shaft 561 and the couplers 565 and 566 are inactive, so that the pawl 546 is controlled entirely by the designation shaft 561, all as shown in Fig. 75.

On a non-list run of cards, the controls for the designation shaft 561 are as shown in Fig. 2. The mode of operation is as follows: On tabulating or add cycles, the parts are as shown in Figs. 2, 58, and 63, the shaft 561 pulled and held by the dog 740. Designating type bars, therefore, do not rise nor print. Typebars in computing columns rise and the numbers are added but not printed, as above explained. The hook 710 which controls the carriage (Fig. 58) is in locking position and the platen, therefore, does not move forward. The line space mechanism is set so as to operate only on total and grand total cycles as explained in the Lasker and Mueller patent.

On a total taking operation, the controls for the designation shaft remain as before until the total shaft 426 is pulled late in the blank or idle cycle. This, through link 750 (Figs. 51 and 58) moves dog 743 over lug 739. This also (link 680) rocks the non-print shaft 667 which, by link 753, withdraws dog 740, bringing the parts to the position C shown in Fig. 65. The parts are timed so that dog 743 is pulled in a little before dog 740 is pulled out. During this cycle the shaft 561 is held pulled and designation type bars do not rise. If a grand total is being taken, the grand total shaft 427 is pulled before total shaft 426 is restored and the parts are held in the position of Fig. 65 until near the end of the grand total cycle, so that the designation type bars do not rise in that cycle. The total and grand total shafts 426 and 427 rock back to normal position in the latter parts of their respective cycles, restoring the non-print shaft and the dog 743 to their normal positions. Meanwhile, however, the slam bail shaft 545 was pulled at near mid-cycle and it is not restored until a little later than the total or grand total shaft. When it is pulled, it takes up the lost motion in the slots in the links 749 (Fig. 6) and holds the ear 739 as shown in Fig. 66. As will be understood from that figure, the shoulder of the dog 743 is a little higher than that of the dog 740, and the position to which the slam bail shaft 545 pulls shaft 561 and the ear 739, is between the two, so that in Fig. 66 said ear is a little below the shoulder of dog 743, so that the latter is withdrawn without friction at that point, and a little above the shoulder of dog 740, so that that dog is unable to reengage it. When, therefore, at near the end of the total or grand total cycle, the slam bail shaft returns to normal, the ear 739 escapes from the dogs and it and the shaft 561 swing clockwise to the position shown in Fig. 67, and they are in that position, with the slam bail pawls 546 in designating columns out of engagement with the type bars 195 at the beginning of the first tabulating cycle following total taking. Those type bars rise, therefore, and the designatory and textual matters are printed. The rocking of the shaft 561 to the position shown in Fig. 67, releases the hook 710 by link 754 (Fig. 58) and allows the platen to advance for printing. In this cycle the non-print shaft 667 has been restored to non-print position and numbers in adding colums are, therefore, not printed. In designation columns, however, the control levers 672 are fixed inactive (Fig. 75) and printing does occur. After printing, the cam 644 on front drive shaft 185, depresses roller 738 and restores the designation shaft 561 to the position of Fig. 58. All of the parts concerned are then in their original positions and remain so until the next total taking operation. During the total and grand total cycles the non-print shaft 667 was pulled and, through linkage 766, 767, and 768 (Fig. 2) held the hook 763 away from the pin 764 and thus disconnected the shaft 561 from the follower lever 737 so that the latter did not attempt to rock said shaft from its Fig. 66 to its Figure 68 position. It will be perceived that in this operation the dogs 740 and 743 constitute an escapement to release the designation shaft by an oscillation of the total shaft.

*Listing*

The mode of operation of the designation mechanism in the list adjustment of the machine, is illustrated in Figs. 13 and 69—73. To set the mechanism at list, the line space mechanism is set active in tabulating cycles and the non-print shaft 667 is rocked counter-clockwise by hand and fixed in print position by the locking plunger 683. The rocking of this shaft has two effects on the designation mechanism, viz., by linkage 766, 767, 768 (Fig. 2) it disconnects the hook 763 from the pin 764, disabling the means for pulling shaft 561 by the power shaft 185, and also, through link 753, it withdraws the dog 740 from the ear 739 and fixedly disables this dog, thus permitting the shaft 561 to rock clockwise (Fig. 69) and maintain the designation slam bail pawls 546 normally out of engagement with the racks 195. This rocking of the non-print shaft (link 713, Fig. 58) also releases the hook 710 and allows the platen to advance at the proper time. Both designations (usually including alphabet), and computed numbers, are, therefore, printed at all tabulating cycles. In this setting the slam bail control bars 552 in designation columns are connected to the shaft 561 the same as in Fig. 75, but said shaft is normally rocked clockwise holding the pawls 546 out of engagement. It is immaterial whether the control levers 672 of the hammer mechanism be hooked to the fixed flange 678 as shown in Fig. 75, or whether they be hooked to the non-print bail 671.

In total taking operations, the slam bail shaft 545 is pulled in the idle cycle which, through links 749, pulls the designation shaft (Fig. 70) so that designation type bars do not rise in that cycle. In the latter part of the idle cycle the total shaft 426 is pulled which draws dog 743 by means of link 750 over the ear 739 (Fig. 58). When near the end of the idle cycle, the slam bail shaft 545 returns, this dog holds the shaft 561 pulled into the total cycle (Fig. 71). If there is a grand total cycle the parts will remain in latched position in that cycle also, as will be understood, so that designations are not printed in total cycles. At about the middle of the total and grand total cycles, the slam bail shaft is again pulled and draws the ear 739 slightly away from the shoulder of dog 743 (Fig. 72). When the total or grand total shaft returns to normal in the latter part of the cycle, the dog 743 moves out of engagement (Fig. 72) and when, a moment later, the slam bail shaft is restored, the shaft 561 rocks clockwise (Fig. 73) where it remains during the first and succeeding tabulating cycles. The net result is that designation type bars rise for printing in all tabulating cycles and are held down in idle, total and grand total cycles.

In the Lasker and Mueller patent there was described a designation shaft corresponding in part to the shaft 561 but, both in the list and non-list settings, it stood in its "pulled" (counter-clockwise) position at all times except in total and grand total cycles and in the first half of the first card cycle following total taking. The designation type bars, therefore, rose in total and grand total cycles, but, as no stops were set, they rose to the limit of their travel at which the last type had passed the printing point, and nothing was printed from them. In listing operations, all non-computing type bars from which printing was required at each card cycle, were set to be controlled by the slam bail shaft corresponding to the shaft 545. In the present machine, type bars controlled by the designation shaft 561 never rise in total cycles, and during listing they rise in all card cycles. The present designation shaft is, therefore, better and much more useful than the former one.

List, non-list

It is sometimes desirable to print the items (list) in certain fields and at the same time in one or more computing fields to print totals only (non-list). This operation was possible with the Lasker and Mueller machine but by a set-up somewhat different from that now to be described. In order to operate the present machine in that way (Fig. 87), non-print shaft 667 is set at non-list (Figs. 6, 12, and 73) and the control levers 672 are hooked to it in all columns in which non-list is desired. In all columns in which listing is desired, whether computing or designating columns, the couplers 675 of said control levers are hooked by their inner notches 669 to the flange 678 so as to maintain said levers fixedly inactive, and, therefore, the type hammers active. The slam bail pawl control bars 552 are connected up as usual, that is to say, the connectors 567 are set to be operated by the slam bail shaft 545 in computing columns and by the designation shaft 561 in designatory columns.

With the machine set up as above described, computing type bars 195 will rise in all except idle cycles at which latter time they will be restrained by the slam bail shaft 545. Items will be printed in these computing columns in which the control levers 672 are hooked to the flange 678 and not in those hooked to the non-print bar 671. Designatory type bars will rise only on the first cycle following a total. In order to enable printing of items, the hook 710 (Fig. 55) would be locked out of action by the latch 759.

In this general mode of operation it is, however, usually desired to print designations at all item cycles. To secure this result, the latch 759 is released and the hook 763 which connects the two parts of the compound link 736 is unhooked by hand from the pin 764 and locked in its inactive position by the bolt 770 as indicated in Fig. 87. This prevents the designation shaft 561 from being rocked by the cam 644 and causes said shaft to have the listing mode of operation indicated in Figs. 69–73, the designating type bars being then held down only during idle and total cycles.

In order to illustrate the flexibility of the controls, it may be remarked that it is possible, if desired, to print designatory matter at every item cycle in some fields and in other fields designatory matter only on the first cycle after total taking. For this mode of operation, the hook 763 would be freed from the bolt 770 so as to give the designation shaft 561 the non-list mode of operation, and the hook 710 (Fig. 55) would be locked out of action by the latch 759. In columns where designation is to be printed only on the first cycle after total taking, the control bars 552 would be connected by 567 to the designation shaft 561. In those designatory columns in which printing is desired on all item cycles, the connector 567 would be set to be operated by the slam bail shaft 545 to restrain the type bars in idle cycles and the connectors 566 and 565 would be set active so as to restrain said type bars in total and grand total cycles. These type bars would, therefore, rise only during item cycles.

Automatic stop

Means are provided settable by hand so as to cause the machine to stop automatically at the end of the blank stroke preceding a total stroke or at the end of the total stroke or to stop at both times, or at neither, as desired. As the total cams 491 and 492 act to pull the link 495 (Fig. 40) in the latter part of the blank stroke and to restore said link in the latter part of the total stroke, these cams, or the total shaft 426 operated by them may conveniently be used to operate this mechanism. It will be recalled that when the shaft is pulled it rocks clockwise a lever 611 (Fig. 6) at the left-hand side of the machine. This lever is made with a third arm to which is pivoted a long link 772 extending to the base section of the machine, where it rocks a three-armed lever 773 to which it is connected by a pin, slot, and spring 774 (Fig. 11). When the total shaft is pulled, this link 772 moves downward and rocks the lever 773 in one direction and when the total shaft returns to normal position and the link moves upward, it rocks the lever in the opposite direction but not positively. The mechanism is shown in the right-hand view in Fig. 6 and as viewed from the left in Fig. 11. The base section of the Powers tabulator as ordinarily constructed includes a casting 775 mounted on the left-hand main frame piece of the base. This casting was originally made to accommodate the direct subtraction automatic control mechanism, which is not used in the present machine, but as the casting supports a number of other parts, it is usually retained. The lever 773 is pivotally mounted on a frame plate 776 secured to the casting 775. The swinging member 167, which controls the stopping of the machine, is fast on a rock shaft 168 which is journaled in said casting, and the lever 171, which actually stops the machine has its pivot 172 on a post projecting from this casting. The rocking member 167 is prolonged above its pivot and has mounted thereon a piece 777 of familiar design, settable to two positions relative to the member 167. Said piece is connected with said member by the usual pin and slot 778 and spring 781, and is held in its alternative positions by the usual pin 780 engaged by one or the other of two notches. The piece 777 constitutes in effect a settable arm of the lever 167. It has a pin 784 engaging in a slot in a link 785 connected at 789 by pin and slot and spring with an upwardly directed arm of the lever 773. When the piece 777 is set as shown in Fig. 11 the downward motion of the link 772 will rock the swinging member 167 clockwise and throw in the interponent 158 and cause the machine to stop at the end of the cycle. The total shaft is pulled in the latter part of the blank cycle of the machine and before the end of that cycle. Consequently, with the parts set as shown, the machine would stop automatically at the end of a blank cycle. However, if the piece 777 is set in its alternative position, the pin 784 will occupy the upper end of the slot in the link 785 and said link will then be inoperative to swing the member 167 and the machine will not be stopped.

In order to provide for stopping the machine at the end of the total cycle, a third and downwardly directed arm of the lever 773 has pivoted thereto at 786 two sheet metal pieces 787 and 788, which, below the pivot 786 are connected by a tension spring 790 tending to rock the two levers in opposite directions. Relative motion under the tension of this spring is limited by an ear formed off from one of the members in position to engage an edge of the other, so that the two members 787 and 788 normally rock as one about the pivot 786. They are urged clockwise in Fig. 11 by a spring 792. Pivoted to the lever 171 and the link 173 at 793 is an interponent member 794, said member being free to turn about said pivot to an extent limited by a pin 795 on said link and held in either of its two positions by a spring 796 anchored to said pin and to a pin on the member 794 in such a way that in shifting said member from one position to the other, said spring swings from one side of the pivot 793 to the other. When the member 794 is in its active position, shown in Fig. 11, a shelf 797 formed off therefrom stands beneath the end of the member 787 and limits its rocking motion about the pivot 786. The link 173 occupies two positions, namely, a low position when the machine is standing still (Fig. 6) and an upper position (Fig. 11) when the machine is running. In its upper position, the interponent 794 holds the member 787 counter-clockwise in Fig. 11, causing the free end of the member 788 to be pressed against a pin 198 projecting from the member 167. This pin, arresting the motion of the part 788, stretches the spring 790 until in the latter part of the blank stroke, the lever 773 swings clockwise and moves the member 788 to the left until a hook shoulder 800 thereon is caused by the spring 790 to engage the pin 798. The parts remain in this position until the return of the total shaft pulls the link 772 upward and the member 788 rightward, rocking the member 167, and throwing in the interponent 158 a little before the end of the total stroke with the result that the machine is automatically stopped by forcing the link 173 downward. This allows the members 787, 788 to be rocked clockwise by spring 792, releasing hook shoulder 800 from the pin 798 and allowing the interponent 158 to return to its inactive position. When, therefore, the machine is again started by pushing the button 162, this mechanism will not stop it again until the next total taking operation. When the interponent 797 is turned down to its alternative position, its shelf is away from the member 787 and this operation does not occur.

The whole construction is such that with the parts in position shown in Fig. 11 on every change of designation the link 785 will stop the machine at the end of the blank stroke, and a total will not be taken until the operator starts the machine again by pressing the button 162. It will then make another cycle, namely, the total cycle, and stop a second time. However, if the settable piece 777 be set to its alternative position, then the machine will stop only at the end of the total stroke and not at the blank stroke. If, on the other hand, the member 777 be set active and the member 794 inactive, then the machine will stop at the end of the blank stroke, but not at the end of the total stroke. If both pieces are set inactive this automatic stop mechanism will not function.

The automatic stop mechanism is useful in various ways. It is sometimes desired to make some manual adjustment of the paper before printing the total, and the mechanism will then be set to stop at the end of the idle cycle. Also, these machines are sometimes used to post loose-leaf ledgers and, at the end of each group of cards, it is desired to stop the machine in order to insert the next ledger sheet. On this class of work, therefore, the interponent 794 is set in active position and disconnecting device 777 in inactive position so that the machine will be stopped at the end of the total cycle and not at the end of the blank cycle.

The ledger sheets are arranged in serial order but there may not have been transactions in all accounts and the operator, therefore, needs to know the designation of the next following group of cards, the first card of which is at the time in the sensing chamber. To this end the machine can be set up so as during the blank stroke of the operation of taking the total of one group of cards, to print the designation punched in the first card of the next group. As the ledger is to be itemized, the operator will set the print shaft 667 at list position and hook the connector 675 in each designation column to the flange 678. The corresponding control bars 552 are set up as shown in Fig. 76, with the latch 558 unlatched and the connecting device 567 set at neutral so as not to be connected either with the designation shaft or the slam bail shaft; and the connector 566, and also preferably the connector 565, are set active. The result of this setting is that the slam bail pawl 546 is normally disengaged and the type bar 195 will rise in all cycles except total and grand total cycles, during which the connectors 566 and 565 will cause the pawl to be engaged. While the item cards are being listed, the designations will be printed in the ordinary way. During the blank cycle, when all of the other type bars are held down by reason of the fact that their control bars 552 are all connected either with the slam bail shaft 545 or with the designation shaft 561, these designation bars 195 will rise under control of the first card of the new group which is then in the sensing chamber, and the designation will be printed. When the machine stops, therefore, the operator glances at the proper place on the sheet just printed and reads the designation of the next group of cards and selects the appropriate ledger sheet and inserts it in the machine. These designations may, if desired, be printed at the extreme right-hand side of the sheet where they will be inconspicuous. During the blank stroke the designation shaft 667 being set at list, the link 713 (Fig. 55) will hold the carriage hook 710 released, so that printing of the designation will occur. However, it is sometimes desired not only to print the designation on the blank stroke but also to effect the list-non-list mode of operation above described. In that set-up, the print shaft 667 is set at non-list and does not release the hook 710 on the blank cycle. Said hook is, therefore, locked out by the hand latch 759 shown in Fig. 55.

The machine shown in Lasker and Mueller patent was capable of substantially the same setting as that shown in Fig. 76, but in using that machine it was necessary to stop the machine by hand in order to carry out the mode of operation above described. The automatic stop mechanism makes this, in some instances, a very useful mode of operation.

The use of tabulating machines to post loose leaf ledgers, presents a problem. After tabulating the items relating to one account, and before tabulating the next group of cards, the operator of the machine must remove the sheet just printed on, and substitute the right sheet for the new group. It has been proposed, in tabulators having two sensing stations, to cause the first sensing station to set up on a visual indicator the number of the next account, so that the operator may read it and select the new sheet accordingly. According to the present invention, on the blank cycle preceding the total cycle, the mechanism (a) prints the account number from the first card of the new group, then held in the sensing chamber; (b) suppresses printing of all other matter punched in that card and suppresses addition of any amounts so punched. To print and add these things would spoil the work and make the scheme inoperative; and (c) stops the machine so as to permit the operator to change the paper. In this machine, if allowed to run on, the first card would be fully printed and added in about two thirds of a second after the printing of the total.

The means whereby the above principle is effectuated are as follows: (b) In those column positions for numbers to be added, the control bars 552 are set to be operated by the slam bail shaft 545 and those for alphabetic characters by the designation shaft 561, and are thus restrained against rising to print or add on the blank stroke; (a) in the columns for the account number, the bars 552 are freed from said shafts so as to rise to printing position on the blank stroke; and (c) a suitable member operated by the total taking control mechanism during the total stroke (in this instance, the bell crank 611) is connected up to actuate the regular stop control device (167, 158) of the machine.

Naught blocks

The naught block mechanism is so designed that it can readily be applied to the translator 238 (Fig. 16) so as to affect any desired type bars 195, and it is settable by the operator of the machine in various ways so as to give it a variety of functions and modes of operation. This mechanism acts on certain cycles of the machine to block the associate type bars 195 against rising so as to render them, and any totalizers actuated by them, inactive in that cycle. The lowermost stop 227 in each vertical set of type bar stops is adapted to be utilized for this purpose. When in any column this stop is projected it engages a tooth 801 on the guide piece 205 and prevents the bar from rising. This particular stop is not provided with any spring 233 nor pin 244, but is controlled entirely by a bell-crank 802, a series of such bell-cranks being pivoted in comb pivot blocks 803 secured to the frame work of the several stop units. It will be recalled that for convenience the stops 225, etc., are mounted in units of ten tiers each. Each stop 227 projects rearward through a frame bar 232 and is pivoted to the bell-crank 802, being normally held in its retracted position by a spring 804 attached to said bell-crank.

The means for rocking the bell-cranks 802 (Fig. 16) counter-clockwise to lock the type bars is preferably mounted on the rear upper wall of the translator frame 238, so that each translator can be equipped with such naught block operating mechanism as may be required for the sort of work for which that particular translator is arranged. In each denomination where a naught block is required the rear horizontal arm of the bell-crank 802 is adapted to be rocked upward by a lug 805 of a naught stop actuator consisting of a lever 806 pivoted loosely on a rod 807, attached to a bracket 808, secured by screws 810 to the rear wall of the translator. The bracket is made with guide slots for the levers, each of which has an arm projecting through an opening in the bracket and provided with a lug 811 adapted to limit the rocking motion of the lever. Said lever is drawn clockwise (Fig. 80) by a spring 812. These brackets 808 are conveniently made each of a width sufficient to take ten of the levers 806, and are so constructed that if two of them be set end-wise, the levers will follow in regular succession with proper spacing (Fig. 78). Preferably the rear wall of the translator is made with a series of screw holes at the proper distance apart, so that, in making up and wiring a translator, units of these levers 806 may be mounted wherever desired, by simply inserting a few screws. Each of these levers preferably has its lug 805 formed off to the left in Fig. 78, and on its opposite face carries a coupler 814 pivoted thereto and held by a spring 815 in either an active or an inactive position as shown in Fig. 81. Each of these couplers has a lug formed off therefrom so that when any coupler is turned up to its active position its lug lies underneath the lug 805 of the next lever to the left of it (to the right in Fig. 78). The construction is such that if the end one of a series of levers 806 be rocked, its motion will be communicated to all of those to the right of it as far as the couplers 814 are in active position, but the sequence can be split at any point by turning any one of these couplers down to inactive position. It will, of course, be understood that if in any installation this adjustment is not desired, a series of these couplers may be permanently fastened together by any suitable means so that they may be turned as one.

The means for rocking the actuators or levers 806 are mounted on a transverse shaft 816, journaled in brackets 817, secured by screws to the rear wall of the translator frame 238. For co-operation with such means the end lever 806 has a special construction shown in full lines in Fig. 80, that is to say, it projects downward further than the other levers and has at its lower end a pin 820 by which it may be operated, and at its rear end at 821 it has pivoted thereto a depending link 822. The remainder of these levers 806 is not equipped with these parts.

Beneath each set of levers 806 there is mounted on the shaft 816, a pre-assembled unit comprising a sleeve 823 (Fig. 82) which can be slid along the shaft to any position where required and secured fast to the shaft by a set-screw 824. This sleeve has mounted on it an arm or plate 825, which is fastened to it rigidly by a rivet 826. It also has loosely pivoted on it a series of levers held in place by a washer 827 staked onto the end of the sleeve. The first of these from the left in Fig. 82 is a lever 828 whose outline is shown in Fig. 84. This has an ear 830 formed off from its forward end in a position to be operated by a plunger 831 actuated by a Bowden wire 832, said plunger being mounted in a housing 833 which is fastened to a bracket 834 secured to the rear wall of the translator. The plate-like lever 828 cooperates with the second lever 835 (Fig. 85) which has an ear 836 formed off therefrom and adapted to come against an edge of the lever 828 to limit the relative motion of the two levers under the tension of a spring 837 by which they are connected. The construction is such that the two levers 828 and 835 ordinarily rock as one, but the lever 828 can be moved up by the Bowden wire independently of the other lever, if the latter is blocked. Pivoted to the lever 835 is a latch lever 838 connected by a spring 840 with the third lever on the sleeve 823, namely, a bellcrank 841 (Fig. 86). Said bell-crank has an ear 842 adapted to be engaged by the latch lever 838 so as to hold the two levers 841 and 835 in either of two relative positions, the active one of which is shown in full lines in Fig. 80. The latch 838 has a tooth 843, which in the active position stands above the ear 842, but the two levers can be spread apart on their rear end and latched in such positioned by the tooth 843 engaging beneath the ear 842. The parts will then stand in the relative positions shown in dot-dash lines in Fig. 80, with the ear 830 raised out of the range of the plunger 831, and the lever system made inoperative by the Bowden wire. The piece 828 has a pin 839 standing behind the lever 841 to limit the motion of said piece in its adjustment. The lever 841 has an upstanding arm which normally stands just in front of the pin 820 on the end lever 806. With the parts set in the active position, shown in Fig. 80, an operation of the Bowden wire will rock the three levers 828, 835, and 841 together, as one lever, and the upstanding arm of the lever 841 acting on the pin 820 will rock the lever 806 counter-clockwise, and actuate the bell-cranks 802 and set the stops 227 to hold down the type bars as above explained, the motion being communicated from the first levers 806 to the others by the means hereinbefore described.

These units are sometimes made as above described, ending with the piece 841. However, in some uses of the machine it is desirable to have each naught block unit controllable selectively by either one of the two Bowden wires, and those shown are so constructed. The bell-crank 841 is then made in two pieces riveted or welded together face to face (Fig. 82), said pieces identical except that the ears 842 are formed off in opposite directions. Beyond this lever is another lever 828 identically like that above described except that it was made left-handed. It also has an ear 830 formed off therefrom, but in the opposite direction from the first one and adapted to be operated by another Bowden wire 845 (Fig. 78). This second lever 828 is also associated with a lever like the lever 835 having a latch 838, but these parts all being left-handed. The construction is such that either one of the levers 828, if operated by its Bowden wire, will rock the lever 841 and set the naught block, provided both such levers are set in active position; but they can be set to active and inactive positions by means of the latches 838 independently of one another. Thus, by a hand-setting, this unit can be made so that it is operable by either the Bowden wire 832 alone, or by the Bowden wire 845 alone, or by both of them or by neither of them. It is to be understood, of course, that one of these sets of naught block control mechanism may be located at any desired point across the translator, and that one or several of them may be mounted on any translator according to the requirements of the work. For example, two totalizer zones may be controlled from the same card field by Y-wires. In one run of cards, debit items may be added in the left-hand totalizers and credit items in the right-hand totalizers, and each debit card will have a hole to operate the right-hand naught block. In another run of the same cards, debit and credit items may both be run into both zones, but items representing some certain kind of transaction may be excluded from the right-hand column. Transactions may be classed as operating and non-operating transactions, and each card representing a non-operating transaction may have a hole to work the right-hand naught block. In this instance each debit card may be punched with a hole controlling the wire 832 of the right-hand naught block unit, and each non-operating card, whether debit or credit, may have a hole to control the wire 845 of the same unit. On the first run, in the right-hand unit, the lever 828 controlled by the debit hole and wire 832 would be set active and the other lever 828 inactive, and this setting would be reversed on the second run.

One of the principal uses of the naught blocks is in connection with the taking of totals. At a given total taking operation one or more totalizers may be prevented from yielding their totals. To this end, means are provided whereby when required the shaft 816 may be rocked to counterclockwise position at total taking and so that when the shaft is so rocked any desired sets of naught block devices may be operated to prevent total taking in the fields controlled by them. In the present instance, this shaft may be rocked (or not, as required) whether either the total shaft 426 or the grand total shaft 427 of the machine is pulled. Referring to Fig. 6, it will be recalled that when either of these shafts is pulled, a bell-crank 613 is rocked counter-clockwise. This bell-crank (Figs. 77 and 78) is pivoted on a stud 846 projecting from the left-hand main frame piece 182. The hub of the bell-crank has been prolonged and has fast thereon a depending arm 847 which when the lever is rocked counter-clockwise, acts on a pin 848 to thrust a bar 850 rearward and downward. This bar is guided on a pin 851 projecting from the left-hand end wall of the translator 238 and is drawn frontward by a spring 852. On its rear end it is supported by a guide link 853 depending from a lever 854 of the first order pivoted loosely on the end of the shaft 816. Fast on said shaft is a fan-shaped arm 855 having the usual two notches to provide for a relative setting of a lever 856 having a pin 857 adapted to be seated in either of said notches. The shaft 816 passes through a slot in said lever to permit the latter to be drawn lengthwise to withdraw the pin 857 from one of said notches and to set in the other. At its lower end this lever 856 has a pin 858 engaged in a notch 860 cut in the upper edge of the bar 850. When lever 856 is set in its active position, as shown in Fig. 77, the pin 858 is in position to be pressed against the forward shoulder of the notch 860 so that, when the bar 850 is moved rearward by the rocking of a total shaft, the link 853 swings on lever 854 and the lever 856 is rocked counter-clockwise, thus rocking the shaft 816. If, however, the piece 856 be set in its alternative position, it will move the pin 858 to the rear end of the notch, where it will not be affected by the bar 850 and the shaft 816 will, therefore, not be rocked on a total-taking cycle.

It will be noted in Figs. 77 and 78 that the bar 850 is on the translator and the pin 848 stands just behind the arm 847, so that the translator can be removed by sliding it rearward and replaced without any thought being given to the operative connection at this point.

In order to make use of the shaft 816 but to disable said shaft at some particular total-taking cycle, an ear on the forward end of the lever 854 is made operable by a Bowden wire 859, whose housing is secured to bracket 817. This wire may, for example, be operated under the control of a special hole punched in a total or grand total card. The rocking of lever 854 by a Bowden wire lowers the bar 850 out of the path of pin 858 thereby preventing the rocking of shaft 816 on total strokes. In this machine the set pins 146 of the sensing mechanism do not directly operate the stops 225 for the type bars, and said set pins are, therefore, not retracted during total taking operations. Once these pins have been set by the first card of a new group, they remain set until the end of the total or grand total cycle.

Hand settable means are provided whereby the shaft 816 when rocked may be made to operate any desired one or more of the sets of levers 806 to prevent the total from being taken from the associated computing units. To this end, at each of the units mounted on shaft 816, there is a hand-settable piece 861 (Figs. 16, 78, 79, and 83) projecting toward the rear of the machine and mounted on the shaft 816 by means of a slot and drawn frontward by a spring. The forward end of this piece is made of the usual fan-shape with two notches adapted alternatively to embrace a pin 862 projecting from the plate 825, which as above described is fast on the sleeve 823, and, therefore, rocks with the shaft. This hand-piece 861 has a pin 863 lying in a slot in the lower end of the link 822 hereinbefore referred to. When the piece 861 is set in its upper or active position shown in Fig. 16 this pin stands in the top of the slot so that, when the shaft is rocked, the link 822 is pushed upward and rocks the set of levers and sets the naught block stops 227. If, however, the piece 861 be set with its rear end in its lower position (Fig. 83), then, when the shaft rocks, the pin 863 will move idly in the slot and will not operate the naught block. It will be observed that on any particular run of cards, any one or more of the sets of naught blocks with which the machine may be provided, can be rendered operative or inoperative on total taking cycles by setting the piece or pieces 861.

All of these may be set inactive, in case no naught block operation is desired on total cycles, and, therefore, the disabling piece 856 could be dispensed with and the pin 858 mounted on an arm, fast on the shaft 816. This, however, would involve a careful re-setup of the pieces 861 afterwards. The piece 856 makes it possible to dispense with all naught block action on total taking while preserving the setup of the translator.

In this machine at the time of taking an automatic total or grand total, the first card of the next succeeding group is in the sensing chamber of the machine and is being sensed, though ineffectively. It might happen, therefore, that this particular card might have a hole for controlling a Y-wire 832 or 845. In order to prevent this from blocking out a total incorrectly, the plate 825, which is fast on the shaft 816, has a pin 864 (Figs. 16 and 82) normally standing a short distance behind the upstanding arm of the lever 841. When the shaft 816 is rocked counter-clockwise on a total cycle, this pin moves forward against said arm and prevents the latter from rocking. If then a Bowden wire operates one of the levers 828 or 844, it will be unable to communicate its motion to the levers 835 and 841 and it will rock independently, stretching the spring 837.

The naught block mechanism above described is of improved design and construction as compared with those used in prior models of Powers tabulators and in other machines. The specific machine shown in the drawings has a continuous series of one hundred alphabetic and numeric type bars, and totalizers which may be readily set to be operated by any desired succession of said bars. Preferably, the naught block stops 227 and their bell-cranks 802 are provided for all of said bars, and a naught block unit can readily be placed on any translator in position to operate any desired succession of said bell-cranks. In the prior machines the naught block mechanism included for each unit a block of metal cooperating with the zero translator wires of that unit, and it was necessary to make these blocks of different lengths depending on the capacities of the associate totalizers. Also, if it was ever desired to split a totalizer field, two such blocks were provided, with means for operating them together or one at a time. In the present case, the assembler of the translator merely puts in as many of the levers 806 as he needs, and the set can be split by the operator at any time required and at any point required by setting inactive the appropriate one of the couplers 814. In former models, different naught block devices were manufactured for different modes of operation. In the present case, the standard devices can be readily set by the operator of the machine for a great variety of modes of operation. The Bowden wires 832 and 845 or any of them can be controlled by holes in cards, and in any individual run of cards, any one or more of them can be set active or inactive in a few seconds. For total taking, the naught blocks for any desired unit can be made active or inactive as desired by setting the device 861; and if it is desired that no naught blocks be active at some particular total taking operation, a hole in a total card will set the bar 850 to inactive position. If desired, however, the same total card may be punched not only with the hole just mentioned but also with a hole to operate one of the wires 832 or 845, and thus at that operation a unit normally blocked at total taking may be automatically made active and another unit ordinarily yielding its total may be blocked out. These are instances of the variations which may be effected in the mode of operation without the use of any special devices; and the operator may make other variations according to his requirements. Naught block mechanism is usually used in association with totalizer fields, but it can, of course, be used as readily for blocking out type bars not associated with totalizers.

*Optional totals*

Improved means are provided for taking "optional totals," that is to say for taking totals under the control of a total card inserted between groups of item cards instead of by a change of designation. This mechanism is best shown in Figs. 45, 46, and 50. Figs. 45 and 50 are right hand elevations and Fig. 46 a plan view of the same but with the observer at the front of the machine. The device consists of means for rocking the shaft 425 or 429 (Fig. 17), by a Bowden wire in the translator. An assembly unit comprising a supporting frame plate 900 is screwed at 901 to the right hand frame plate 902 of the change of designation mechanism. Two bosses 903, staked in plate 900, serve as bearings for two rock shafts 904 and 905 carrying on their left hand ends (Fig. 46) horizontal arms 906 and 907 respectively, each having an ear 908 extending underneath the cross frame bar 910 at the bottom of the translator. Vertical holes in said bar are occupied by the usual housing for pins 911, 912, operated downward by Bowden wires 913, 914, which actuate the mechanism. The other ends of these wires may be actuated by any desired ones of the set pins 146, so that the special holes may be located at any desired index positions of the card; and one translator may be wired to use holes different from another.

Upright arms 915, 916 are mounted on the right hand ends of the rock shafts 904, 905, and they carry hooks 917, 918 having shoulders 919 to engage ears 920, 921, formed off from arms 922, 923 fast respectively on the rock shafts 425 and 429 of the change of designation mechanism. The construction is such that an actuation of arm 906 by Bowden wire 913 will rock the shaft 425 to initiate a total taking operation, and an actuation of the arm 907 by the wire 914 will rock the shaft 429 to initiate a grand total taking operation in the manner familiar in the Powers machine. The arms 922 and 923 are the usual arms the front ends of which act to trip the total taking unit 451; but they are modified as shown by the provision of up-standing branches from which the ears 920, 921 are formed off. The arms 906 and 907 have their ears lying in such a position that in removing and inserting translators, the translator frame slides over them without interference.

The trip-hooks 917, 918, are constructed and controlled so as to afford the desired mode of operation. Referring to hook 917, it is connected with the arm 915 by a headed stud 924 playing in a slot 925 in the hook, and by a spring 926 so disposed as to tend to rock the hook counter-clockwise (Fig. 50) and also to move the hook rearward, holding the front end of the slot 925 against the stud 924. At its front end the hook has a horizontal lower edge resting on a post 927 fixed in the frame plate 900; and the upward swing of the hook is limited by a similar part 928. A pin 930 on the arm 915, serves for connection of a restoring spring 931, the action of which is limited by a pin 932. The pin 930 normally stands a little forward of the edge of an upstanding ear or branch of the hook 917. The construction is such that when the arm 915 is rocked by action of the Bowden wire 913, the spring 926 first draws the hook 917 rearward, pivoting on stud 924 and sliding horizontally on post 927, and actuating the arm 922 to trip the total taking mechanism. The arm 940 and, consequently, the arm 922, have only a short movement. The slot 925 enables the arm 915 to continue its movement until the pin 930 strikes the upstanding ear of the hook 917. Said pin is well above a line normal to the shoulder 919 and its pressure causes the hook to swing upward out of engagement with the ear 920 as shown in Fig. 50, leaving the arm 922 free to return to its normal position. In this machine, the retract bail 152 is not operated on total taking operations, and the actuated set pins 146 therefore remain in their elevated positions until the first cycle following the total or grand total cycle, which is a blank cycle due to the total card. The hook 917 therefore remains in its elevated position (Fig. 50) until that time. When toward the end of said blank cycle the pin drops down, the hook first swings down until it rests on the ear 920 after which it slides forward to normal position and drops down onto the post 927. These movements do not actuate the arm 922 and do not initiate a second total taking operation. In the column containing the special total taking holes, the keys 421 of the change of designation mechanism, is set inactive. The hook 918 is mounted and actuated the same as the hook 917, the only difference being that the hook itself is shorter.

In explanation of the described device it may be remarked that optional totals can be taken, if necessary, without any special provision, but with certain disadvantages which are obviated by said device. Any index position of the card might be set aside for a total control hole, and the key 421 for that column be set down to active position; and a card with that hole would then initiate a totaling operation; but this would have two disadvantages. First, the remaining holes in that column could not be used for other control purposes, because any one of them would trip the totaling mechanism. In the second place, the total card would not only start a totaling operation when it was sensed, but would also start a second and useless one when it was fed out after totaling and the next item card was sensed. Also, if the hook 917 were merely pivoted to the arm 915, it would rock the arm 922 and hold it rocked, with the result that the total control mechanism would continue to run and the machine would go through a succession of totaling operations indefinitely. This is cured by the peculiar construction described, whereby said hook first trips said arm 922 and then immediately lets go of it.

It will be perceived that the described optional total mechanism does not interfere in any way with the action of the change of designation mechanism, which may be used the same as if the optional mechanism were not present. Totals may be taken in both ways, even in the same run of cards, if desired. In the automatic total taking mechanism described in Patent No. 2,044,119, one column position was modified to be used solely for special holes, including one or more for optional totals. This required that the optional total hole be always in the same position on the card, which position could not be used for any other purpose. The present mechanism does not require any modification of the set pin unit, the total holes can be in any positions desired, and those positions may, when another translator is in the machine, be used for ordinary purposes. Also, the mechanism does not cause a second and idle totaling operation after the completion of the first one.

*Great grand and great great grand totals*

Four kinds of totals can be taken with the described mechanism, partly by the use of total cards. If the two fields defined by the two naught block units shown in Fig. 78 are Y-wired so that all amounts are added in the totalizers of both fields, and it is desired to take totals and grand totals from the left-hand unit and great grand and great great grand totals from the right-hand unit, then, in the left-hand unit the device 861 (Figs. 16 and 83) would be set inactive and that in the right-hand unit active. If totals and grand totals are taken automatically by change of designation, they will then be taken from the left-hand unit only, the right-hand unit being blocked out by the rocking of shaft 816 on total and grand total cycles. When a great grand total is desired, a blank card may be inserted in the stack, followed by a total card which latter is punched with a hole to operate the Bowden wire 913 (Fig. 45) and also with a hole to operate the Bowden wire 859 (Figs. 77 and 78). The blank card will amount to a change of designation and initiate a grand total operation, clearing both the lower and the upper left hand totalizers and also clearing the designation set pins. The total card, by Bowden wire 859, will disable the means for rocking the shaft 816 and, therefore, prevent operation of the naught block, and the Bowden wire 914 will initiate a total operation, taking the great grand total from the lower right-hand totalizer. Nothing will be printed in the left-hand column, because these totalizers have just been cleared. This will leave all totalizers clear except the upper right-hand one, which will retain the total of all items. The great great grand total is finally taken in the same way, except that the total card will be punched with a hole to operate the Bowden wire 914 (Fig. 45), initiating a grand total operation. This will first print the last great grand total from the lower right-hand totalizer and, beneath it, the final total from the right-hand upper totalizer.

It may be remarked that, if desired, a fifth and a sixth total may be taken by a little manipulation, three totalizer fields being Y-wired so that the amounts are added in all of them. In the third unit no naught block need be used but instead on the appropriate slam bail control bars the connectors 566 and 565 (Fig. 12) would be set active, thus restraining the type bars on all total and grand total cycles. At the point in the stack where a fifth total was desired a stop card would be inserted, followed by a great grand total card as above described. When the machine stops, the operator will release the connectors 566 and start the machine, which will take a total from the lower totalizers, including that in the third column, after which said connectors are reset. The final, sixth, total may be taken in a similar way, using a grand total card and first releasing both the connectors 566 and 565.

Progressive totals

A control is provided for taking "progressive totals," that is to say, totals without clearing. For the purpose of illustration this is shown applied to one of the upper or grand totalizers, but it may be adapted to any other totalizer or to any plurality of them, according to the requirements of the user. Card controlled means are provided for causing this control to act or not to act in any desired grand total cycle; and hand set means are also provided for disabling it altogether when its action is not desired.

The shaft 258 (Figs. 14 and 24) which is in the totalizer and the rocking of which moves the totalizer wheels into and out of mesh with the racks, is made in two pieces, one inserted from each side of the totalizer frame, and a clamp block 980 is tightened about both pieces to connect them rigidly. In any totalizer where progressive totals are desired, this block has secured thereto a bracket arm 981 (Figs. 48, 49) adapted to be engaged by a retaining device or latch 982 loosely pivoted on one of the bolts 257 and acting when so engaged to prevent the totalizer from moving out of mesh when, at the mid-part of a total cycle, the shaft 321 returns to normal position. A link 983 pivoted to an arm of said latch has at its upper end a slot 984 engaged by a pin 985 on an arm 986 fast on a rock shaft 987 journaled at its ends in the frame plates 180 and 182. One or more arms 986 may be mounted on this shaft one in front of any totalizer equipped for progressive totals. A spring 988 normally holds the pin 985 in the bottom of the slot 984. Near its right hand end the shaft 987 has fast thereon a hub 990 which is part of a structure including an arm 991 having a pin 992, engaging in a slot 993 in the upper end of a long link 994 which at its lower end is pivoted to a bell-crank 995 loosely pivoted on the stud 519 (Figs. 3 and 54). In operation the arm 991 is fast on the shaft, but it is settable to an operative and to an inoperative position as will be described presently. The link 507 through which the grand total shaft 426 is pulled, is operated by an arm 506 which, for the present purposes is prolonged forward into an arm 996 which operates a push link 997 having a slot engaged by a pin 998 on the bell-crank 995. A spring 1000 draws the pin 998 into the forward end of the slot. In operation, when, in the latter part of the total cycle the grand total shaft is pulled, the described connections will rock the shaft 987 clockwise and throw the latch 982 into contact with the arm 981, stretching the spring 988. When an instant later the totalizer is moved into engagement, said spring snaps the hook 982 under the arm 981, locking the totalizer in engaging position.

The grand total shaft is restored to normal at a point in the cycle earlier than that at which it is desirable to release the latch 982, and means are therefore provided to retain said latch and to release it under the control of a part which acts later in the cycle, the credit balance shaft 521 being utilized in the present instance. Fast on the hub 990, is an upright arm 1001, Figs. 4, 48, and 49, having an ear 1002 adapted to be engaged by the shoulder of a latch 1003 and thereby retained in its operated position, holding the latch 982 in engagement. A link 1004 (see also Fig. 53) pivoted to the latch 1003, has a slot engaged by a pin 1005 on an arm 1006 fast on the credit balance shaft. A spring 1007 (Fig. 3) draws the pin to the upper end of the slot. On a grand total operation the credit balance shaft is rocked clockwise, drawing the latch 1003 against the flange 1002 and stretching the spring 1007. When the shaft 987 is rocked, the latch snaps into retaining position. At toward the end of the grand total cycle, the return motion of the shaft 521 lifts the latch 1003 out of engagement where it remains until the next total taking operation. This releases the shaft 987 which is rocked counter-clockwise to normal by a suitable spring 1008, releasing the latch 982 and allowing the spring 331 (Fig. 24) to draw the totalizer out of engagement.

It is highly desirable that it be possible so to govern the mechanism that some totals (or, as in the present instance, grand totals) be progressive and others with clearing. This function may be controlled either by hand or by some automatic control according to the requirements of the work. In the present instance it is controlled automatically by a special hole in an optional grand total card. A second latch 1010 (Figs. 49 and 52) is pivoted beside the latch 1003 and, when active, it engages the ear 1002 and positively holds the shaft 987 in normal position with the latch 982 out of engagement. If now the grand total shaft be pulled it will only stretch the spring 1000 and the total will be with clearing. A spring 1017 normally holds the latch 1010 active as shown in Fig. 49 and the totals are normally clearing totals. Said latch has pivoted thereto a link 1011 pivoted to a bell-crank 1012 (Figs. 3 and 52) loosely pivoted on the rod 350 and which is connected by a link 1013 with the bell-crank 894 hereinbefore mentioned (Fig. 56). Said bell-crank has an ear 1014 and any of the interchangeable translators may have a pin 893 to operate said ear and the bell-crank. A Bowden wire may be connected to operate this pin and to be operated by any selected one of the set pins 146. The corresponding index position of the card will thus be reserved for the progressive total hole. When a grand total card is sensed having this hole therein, the bell-crank 894 will be rocked, the latch 1010 will be raised, freeing the shaft 987 to be rocked at the proper time to prevent clearing of the totalizer.

Where it is desired that the totals be normally progressive and that clearing totals be taken under the control of the punched card, the mechanism is the same as above described, except that the latch 1010 is replaced by a latch 1015 shown in Fig. 48. This latch lies beneath the ear 1002 and is normally out of engagement. It is pushed upward by a link 1016 the connections of which are identical with those of the link 1011. When the special hole is sensed this latch is pushed up to active position with its shoulder behind the ear 1002 where it prevents the rocking of the shaft 987 and causes the totalizer to be cleared. This mechanism is shown in Fig. 48 at the latter part of a normal operation where the shaft 987 has been rocked to take a progressive total.

It will be perceived that the machine will take a clearing grand total when the shaft 987 is free to be rocked, and a progressive total when said shaft is restrained against rocking, and that therefore the character of the total depends on the position occupied at the time by the restraining latch 1010 or 1015; and also that said restraining latch may be arranged for control by any suitable means according to the requirements of the work.

In order to disable the progressive total mechanism altogether a hand set disabling device is provided as shown in Figs. 48 and 49. To this end the arm 991 is made as part of a disabling lever having a forward arm 1020 and having therein a slot 1021. The arm 1020 is pivotally and slidably mounted on a reduced part of the hub of the arm 1001. Said arm 1001 is extended forward and has two notches in either of which a pin 1022 may be seated and into which said pin is drawn by a spring 1023, the whole construction being of a familiar type. When the lever 1020 is in its counter-clockwise position the pin 992 in the arm 991 occupies approximately the top of the slot 993 in the link 994 so that when said link is pulled down as above described the shaft 987 will be rocked. This is therefore the active setting. In order to disable the mechanism the operator seats the pin in the upper notch as shown in dot-dash lines in Fig. 49. This moves the pins 992 to a normal position below the end of the slot 993 so that the shaft cannot be rocked by the link 994.

In the above specification the mode of operation of each portion of the machine has been explained. One embodiment of the invention has been described in detail, together with some modifications; but it will be obvious that various other modifications of its several features may be made without departing from the invention.

The described improvements in the printing hammer mechanism, including the means for changing the zero set-up, and also the improvements in the carriage mechanism, including the means to control the short movement of the platen toward and from the types when printing, are not claimed herein, but are claimed in a divisional application filed January 26, 1944, Serial No. 519,733.

What I claim as new, and desire to secure by Letters Patent, is:

1. In an adding and printing machine, the combination with adding mechanism, and a series of type bars each having an advance movement to differential printing positions and a return movement, certain of said type bars printing the totals of the added numbers in a total taking operation and certain other of said type bars printing designatory matter in other cycles of the machine, and type hammers associated with said type bars, of a non-print member controlling the type hammers for the adding type bars, said member settable to a print position in which the hammers controlled thereby are active and to a non-print position in which said hammers are inactive, means for restraining the advance movements of said designatory type bars, said means settable to restraining and to non-restraining positions, spring means for moving said restraining means to non-restraining position, power means for setting said restraining means to restraining position, a dog for holding said restraining means in restraining position, and means whereby said dog is moved out of holding position concomitantly with the movement of said non-print member to print position.

2. The combination with a totalizer, its associated actuators and type carriers, means for moving said actuators and type carriers in advance direction under control of said totalizer to position said type carriers for printing a total and for thereafter restoring said type carriers, and means to withdraw said totalizer from said actuators, of a series of pawls one for each actuator and type carrier; means for moving said pawls in the direction of advance of said actuators while out of engagement therewith and for moving said pawls in the contrary direction after such engagement; and means to move said pawls into engagement with said actuators and type carriers and to retain them in engagement each until the return movement of the associate bar has begun.

3. In a machine for tabulating data, the combination of differentially settable type carriers, associated printing hammers, means to operate said hammers during each machine cycle, a non-print member settable to a print position and to a non-print position, devices connectable with and disconnectable from said member and when so connected preventing operation of the associate hammers when said non-print member is in non-print position, a designation member settable to an active and to an inactive position and biased toward its inactive position, devices connectable with said designation member and when so connected blocking the associate type carriers against advance movement when said designation member is in its active position, means to hold said designation member in active position, connecting means to release said holding means when said non-print member is moved to print position, and means to restore said designation member to active position at each cycle of the machine.

4. In a machine for tabulating data contained in successive groups of records and having total taking control means operative after the tabulation of each group, the combination of a plurality of differentially settable type carriers, a designation member having a locking position and a releasing position and means controlled thereby when in locking position to block advance movement of certain of said type carriers, means biasing said designation member to its release position, an escapement to hold said designation member in its locking position and comprising a lock dog and a check dog, means operated by said total taking control means to move said check dog into and said lock dog out of holding position preparatory to a total cycle and to move said check dog out of holding position to release said designation member after total taking, and means to restore said designation member to the control of said escapement after printing in the first cycle after total taking.

5. In a machine for tabulating data contained in successive groups of records and having total taking control means operative after the tabulation of each group, the combination of a plurality of differentially settable type carriers, a designation member having a locking position and a releasing position and means controlled thereby when in locking position to block advance of certain of said type carriers, means biasing said designation member to its release position, an escapement to hold said designation member in its locking position and comprising a lock dog and a check dog, a plurality of printing hammers and means to operate said hammers during each machine cycle, a non-print member settable to a print position and to a non-print position, devices operated by said non-print member and presettable to an active position in which they do and to an inactive position in which they do not disable their associate hammers under the control of said non-print member, a connection whereby said non-print member moves said lock pawl out of holding position when said non-print member moves to print position, means comprised in said total taking control means to move said non-print member into and afterward out of print position and said lock pawl out of and into holding position, and means comprised in said total taking control means to move said check pawl into holding position preparatory to a total cycle and to move said check pawl out of holding position after total taking, and means to restore said designation member to the control of said escapement after printing in the first cycle after total taking.

6. In a machine for tabulating data contained in successive groups of records and having total taking control means operative after the tabulation of each group, the combination of a plurality of differentially settable type carriers, a designation member having a locking position and a releasing position and means controlled thereby when in locking position to block advance of certain of said type carriers, means biasing said designation member to its release position, an escapement to hold said designation member in its locking position and comprising a lock dog and a check dog, a plurality of printing hammers and means to operate said hammers during each machine cycle, a non-print member settable to a print position and to a non-print position, devices operated by said non-print member and presettable to an active position in which they do and to an inactive position in which they do not disable their associate hammers under the control of said non-print member, a connection whereby said non-print member moves said lock pawl out of holding position when said non-print member moves to print position, means comprised in said total taking control means to move said non-print member into and afterward out of print position and said lock pawl out of and into holding position, and means comprised in said total taking control means to move said check pawl into holding position preparatory to a total cycle and to move said check pawl out of holding position after total taking, means to restore said designation member to the control of said escapement after printing in the first cycle after total taking, and means to preset said non-print member fixedly in print position.

7. In a machine for tabulating data contained in records and having differentially settable type carriers and associated printing hammers and means to operate said hammers during each machine cycle; the combination of a non-print member to control printing hammers, said member being settable to a print position and to a non-print position; a designation member and means controlled thereby to lock type carriers against advance movement and said member being settable to a locking position and to a releasing position; spring means biasing said designation member to its releasing position; means to restore said designation member to its locking position at each cycle of the machine; and connections from said non-print member to disable said restoring means when said non-print member moves to its print position.

8. In a machine for tabulating data contained in records and having differentially settable type carriers and associated printing hammers and means to operate said hammers during each machine cycle, the combination of a non-print member to control printing hammers, said member being settable to a print position and to a non-print position, a designation member and means controlled thereby to lock type carriers against advance movement and said member being settable to a locking position and to a releasing position; spring means biasing said designation member to its releasing position; means to restore said designation member to its locking position at each cycle of the machine; connections from said non-print member to disable said restoring means when said non-print member moves to its print position, and total taking control mechanism, including means to set said designation member at locking position in total taking operations.

9. In a machine for tabulating data contained in records and having differentially settable type carriers and associated printing hammers and means to operate said hammers during each machine cycle, the combination of a non-print member to control printing hammers, said member being settable to a print position and to a non-print position; a designation member and means controlled thereby to lock type carriers against advance movement and said member being settable to a locking position and to a releasing position; spring means biasing said designation member to its releasing position; means to restore said designation member to its locking position at each cycle of the machine, a dog to hold said designation member in its locking position; and connections from said non-print member to disable said dog when said non-print member moves to its print position.

10. In a machine for tabulating data contained in successive groups of records and having total taking control means operative after the tabulation of each group, and having differentially settable type carriers and associated printing hammers and means to operate said hammers during each machine cycle, the combination of a non-print member to control printing hammers, said member being settable to a print position and to a non-print position; a designation member and means controlled thereby to lock type carriers against advance movement and said member being settable to a locking position and to a releasing position; spring means biasing said designation member to its releasing position; means to restore said designation member to its locking position at each cycle of the machine; a dog to hold said designation member in its locking position; connections from said total taking control means to set said non-print member to print position preparatory to printing a total; connections from said non-print member to disable said dog when said non-print member moves to its print position, and a second dog moved by said total taking control means to position to retain said designation member in non-print position when released from the first mentioned dog, said second dog itself being moved to release said member after total taking.

11. In a machine of the class described, the combination with a set of type bars having advance and return movements; type hammers coordinated to said type bars; means to fire said hammers; and two means to inhibit printing, viz., a non-print member which controls the firing means pertaining to certain of said type bars and is movable to a print position to enable and to a non-print position to disable the said firing means that pertain to the said certain type bars, and means to restrain advance movements of certain other of said type bars; and a designation member to which said restraining means are connected; of spring means to move said designation member to non-restraining position, power means to move said designation member to restraining position; and means whereby said power means is disabled concomitantly with the movement of said non-print member to print position; whereby, when said non-print member is in non-print position, the type bars the printing from which is controlled by said member, rise but without printing, and those type bars that are controlled by said designation member are restrained from unnecessary movements and do not print, whereas, when said non-print member is set in print position both the type bars to which it pertains and those controlled by the designation member may rise and print.

12. In a motor driven tabulating machine having a drive disengaging mechanism and operating continuously through a succession of cycles, the combination of total taking control mechanism including a part displaced in the course of a cycle preceding a total cycle and restored in the course of the total cycle, a device settable to actuate said drive disengaging mechanism at the end of a cycle, means settable at will to connect said device to said part so as to be set by the displacing movement thereof in order to cause the machine to stop before the total cycle, and means settable at will to connect said device to said part so as to be set by the restoring movement thereof in order to cause the machine to stop after the total cycle.

13. In a motor driven card-controlled tabulating machine having drive disengaging mechanism and differential type carriers and operating continuously through a succession of cycles, the combination with means to feed and sense record cards, and total taking control mechanism brought into action on a change of group designation of the cards and causing the machine to operate through a blank cycle and then through a total cycle, and said control mechanism having means to stop the card feed with the first card of the new group in position to be sensed and having also one or more members actuated on the blank cycles and further members actuated on the total cycles, of means connectable at will with the first recited member or members for restraining selected type carriers against advancing on the blank cycle, type carriers not so restrained advancing to printing position on the blank cycle under control of said first card of the new group; and control means for said disengaging mechanism settable at will for actuation by said further members for stopping the machine after completion of printing on the blank cycle by said unrestrained type carriers under control of said first card of the new group and before tabulating on the first succeeding item cycle said first card of the new group.

14. In a machine of the class described having a continuous motor drive, a machine controlled drive disengaging mechanism, and a member movable to a position where it will actuate said drive disengaging mechanism at the end of a cycle; stop control means for moving said member comprising a normally idle structure mounted for an advance and a return stroke, a device settable to an active and to an inactive position and when in the former position operated by said structure on the advance movement thereof to move said member to stopping position, a second device settable to an active and to an inactive position and when in the former position operated by said structure on the return movement thereof to move said member to stopping position, and mechanism acting to advance said structure in a predetermined type of cycle in the operation of the machine and to return said structure at another predetermined type of cycle, whereby, by appropriate settings of said devices the machine may be caused to stop automatically at different predetermined times.

JOHN MUELLER.